(12) United States Patent
Harth et al.

(10) Patent No.: US 11,976,153 B2
(45) Date of Patent: May 7, 2024

(54) FLUORINATED POLYMERIZATION CATALYSTS AND METHODS OF MAKING AND USING THE SAME

(71) Applicant: UNIVERSITY OF HOUSTON SYSTEM, Houston, TX (US)

(72) Inventors: Eva Harth, Houston, TX (US); Huong Dau, Batavia, OH (US)

(73) Assignee: University of Houston System, Houston, TX (US)

( * ) Notice: Subject to any disclaimer, the term of this patent is extended or adjusted under 35 U.S.C. 154(b) by 0 days.

(21) Appl. No.: 18/320,101

(22) Filed: May 18, 2023

(65) Prior Publication Data

US 2023/0374171 A1 Nov. 23, 2023

Related U.S. Application Data

(60) Provisional application No. 63/343,301, filed on May 18, 2022.

(51) Int. Cl.
*C08F 4/70* (2006.01)
*C08F 2/38* (2006.01)
(Continued)

(52) U.S. Cl.
CPC ............... *C08F 4/70* (2013.01); *C08F 2/38* (2013.01); *C08F 10/02* (2013.01); *C08F 10/14* (2013.01);
(Continued)

(58) Field of Classification Search
USPC .......................................... 556/137; 526/171
See application file for complete search history.

(56) References Cited

U.S. PATENT DOCUMENTS 6,136,743 A 10/2000 Sugimura et al.
6,586,358 B2 7/2003 Llatas et al.
(Continued)

FOREIGN PATENT DOCUMENTS

CN 114149528 A 3/2022
JP 11092521 A 4/1999
(Continued)

OTHER PUBLICATIONS

Mundil, et al., "Nickel and palladium complexes with fluorinated alkyl substituted alpha-diimine ligands for living/controlled olefin polymerization," Polymer Chemistry, 2018, 9, 1254-1248. (Year: 2018).*

(Continued)

*Primary Examiner* — Fred M Teskin
(74) *Attorney, Agent, or Firm* — Blank Rome LLP

(57) ABSTRACT

Described herein are polymerization catalysts having a structure according to formula (1):

wherein (Continued)

is a diimine ligand, A⁻ is a counter anion, and $R^2$ is a fluorinated alkane, alkene or alkyne, a fluorinated aromatic, a fluorinated cycloalkane or cylcoalkene, a fluorinated heteroaromatic, or a fluorinated heterocyclic. Also described herein are polymers having a terminus having a structure according to Formula (3):

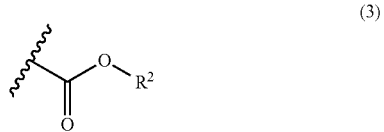

(3)

wherein $R^2$ is a fluorinated alkane, alkene or alkyne, a fluorinated aromatic, a fluorinated cycloalkane or cylcoalkene, a fluorinated heteroaromatic, or a fluorinated heterocyclic.

21 Claims, 29 Drawing Sheets

(51) Int. Cl.
| | |
|---|---|
| C08F 10/02 | (2006.01) |
| C08F 10/14 | (2006.01) |
| C08F 212/08 | (2006.01) |
| C08F 220/18 | (2006.01) |
| C08F 293/00 | (2006.01) |

(52) U.S. Cl.
CPC ...... *C08F 212/08* (2013.01); *C08F 220/1804* (2020.02); *C08F 293/005* (2013.01); *C08F 2438/02* (2013.01); *C08F 2438/03* (2013.01); *C08F 2810/40* (2013.01)

(56) References Cited

U.S. PATENT DOCUMENTS

| | | | |
|---|---|---|---|
| 6,916,893 | B2 | 7/2005 | Rieger et al. |
| 8,993,680 | B2 | 3/2015 | Yang et al. |
| 2008/0306229 | A1 | 12/2008 | Guan et al. |
| 2009/0253878 | A1 | 10/2009 | Ye et al. |
| 2017/0335022 | A1 | 11/2017 | Small et al. |
| 2020/0181295 | A1 | 6/2020 | Ho et al. |

FOREIGN PATENT DOCUMENTS

| | | |
|---|---|---|
| WO | 9813400 | 4/1998 |
| WO | 2017201304 A1 | 11/2017 |
| WO | 2019217930 A1 | 11/2019 |

OTHER PUBLICATIONS

International Search Report and Written Opinion issued Oct. 6, 2023, in corresponding International Application No. PCT/US2023/022762.
Alberoni, Chiara et al. "Tunable 'In-Chain' and 'At the End of Branches' Methyl Acrylate Incorporations in the Polyolefin Skeleton through Pd(II) Catalysis." ACS Catalysis, vol. 12, No. 6, Mar. 2, 2022, https://doi.org/10.1021/acscatal.1c053296, pp. 3430-3443.
Dau, Huong et al. "One-For-All Polyolefin Functionalization: Active Ester as Gateway to Combine Insertion Polymerization with ROP, NMP, and RAFT." Angew. Chem. Int. Ed., vol. 61, 2022, published online May 19, 2022, publication e202205931. https://doi.org/10.1002/anie.202205931, pp. 1-10.
Dau, Huong et al., "Dual Polymerization Pathway for Polyolefin-Polar Block Copolymer Synthesis via MILRad: Mechanism and Scope." J. Am. Chem. Soc, 2020, vol. 142, 21469-21483.
Keyes, Anthony et al., "Tandem Living Insertion and Controlled Radical Polymerization for Polyolefin-Polyvinyl Block Copolymers." Angew. Chem. Int. Ed., 2022, vol. 61, Issue 10, e202112742 (9 pages).
PubChem., "15-N,16-N-bis[2,6-di(propan-2-yl)phenyl]tetracyclo[6.6.2.02,7.09,14]hexadeca-2,4,6,9,11,13- hexaene-15,16-diimine; methylbutanoate;palladium(2+);tetrakis[3,5-bis(trifluoromethyl)phenyl]boranuide", https://pubchem.ncbi.nlm.nih.gov/compound/139050688, retrieved May 5, 2022.
Ye, Jianding et al. ""Living" Polymerization of Ethylene and 1-Hexene Using Novel Binuclear Pd-Diimine Catalysts." Polymers, 2017, 9, 282; doi:10.3390/polym9070282 (21 pages).
Hill, Anstar R. et al., "Ring Opening Metathesis Polymerization (ROMP) of Five- to Eight-Membered Cyclic Olefins: Computational, Thermodynamic, and Experimental Approach.", Journal of Polymer Science, PartA: Polymer Chemistry, 2017, 55, 3137-3145.
Gies, Anthony P. et al., "Analytical Insights into the Microstructures and Reaction Mechanisms of Cationic Pd(II) α-Diimine-Catalyzed Polyolefins.", Macromolecules, 2021, 54, 10814-10829.
Choinopoulos, Ioannis, "Grubbs' and Schrock's Catalysts, Ring Opening Metathesis Polymerization and Molecular Brushes—Synthesis, Characterization, Properties and Applications.", Polymer, 2019, 11, 298, doi: 10.3390/polym11020298 (31 pages).

\* cited by examiner

FLUORINATED POLYMERIZATION CATALYSTS AND METHODS OF MAKING AND USING THE SAME

CROSS REFERENCE TO RELATED APPLICATION

This application claims the benefit of U.S. Provisional No. 63/343,301 filed May 18, 2022, the entire contents of which are incorporated by reference herein.

FIELD OF THE INVENTION

The present invention relates to fluorinated polymerization catalysts. More specifically, the present invention relates to polymerization catalysts having fluorinated ester chelates and the use of such catalysts for the formation of homo-, di-, tri- or higher order multiblock block copolymers.

BACKGROUND OF THE DISCLOSURE

In the search for functionalized polyolefins with enhanced surface properties, block copolymers comprising polyolefins and polar polymers stand out as one of the most desirable materials. This is due to their ability to embody a substantial number of functionalities while conserving the advantageous thermal and mechanical features of their constituent homopolymers. While a variety of olefinic block copolymers have been readily accessible via the advancement in metal-catalyzed living polymerization, synthetic platforms for polyolefin-polar block copolymers remain scarce due to the tremendous difference in reactivity between the two monomer classes. The major drawbacks of the traditional method relying on anionic polymerization involve multiple stepwise syntheses, stringent experimental conditions, and limited monomer types. The development of late transition catalysts has greatly facilitated the exploration of functionalized polyolefins owing to their functional group tolerance. However, the polymers generated via the sole coordination-insertion technique are limited to random architectures. Hence, end-functionalized polyolefins attained via post-polymerization remain the dominant approach for the preparation of polyolefin-polar block copolymers by combined polymerization techniques.

One of the applied approaches is catalytic chain transfer polymerization (CCTP), which offers a pathway to introduce functional groups derived from the chain transfer agents (CTA). Mecking et al. (*Macromolecules* 2020, 53, 2362-2368) reported a catalytic chain transfer polymerization of ethylene using Pd(II) α-diimine catalyst and TIPNO-functionalized silanes as the CTAs. Subsequent chain extensions with styrene or n-butyl acrylate via nitroxide mediated polymerization (NMP) yielded diblock copolymers. While the study successfully bridged insertion and controlled radical polymerization, the limitations include laborious synthesis for the alkoxyamine-CTA, as well as the excess number of CTAs (100 equivalents) needed for a sufficiently high degree of functionalization (80%). Additionally, high CTA loading resulted in the high dispersity and loss of livingness during insertion polymerization.

Metal-organic insertion light initiated radical (MILRad) functionalization, a strategy that allows the transformation of insertion polymerization to controlled radical polymerization under mild conditions and light-assisted process, has also been pursued. This technique relies on the susceptibility of the Pd-alkyl bond to homolytic cleavage under blue light irradiation. Thus, the growing polyolefin chains can be captured by radical/spin trapping agents to produce corresponding macroinitiators that are capable of chain extension with styrene, isoprene, and acrylic monomers to produce di- and tri-block copolymers. However, the polar functionalities of nitroxide trapping agents promoted chain transfer side reactions during the light cycle and resulted in the formation of unfunctionalized PE at the ratio of 20-50% in the polyolefin precursors.

Functionalized catalysts that are capable of polymerizing ethylene in a living manner require selective introduction of functional groups at the polymer chain ends. Previous work by Ye et al. (*Macromolecules* 2008, 41, 640-649) demonstrated the preparation of diblock copolymers containing PE and PS/P(n-BA) through tandem coordination-insertion polymerization (CIP) and ATRP. The synthesis employed a Brookhart's type palladium diimine chelate functionalized with a 2-bromoisobutyryl end-group that can polymerize ethylene in a living fashion. However, the catalyst productivity remains low (TOF=154/h), and a discrepancy in molecular weight calculated by GPC analysis and gravimetrically method was observed, which was attributed to an incomplete catalyst activation.

The limitations of these aforementioned strategies emphasize the need for an alternative synthetic protocol that accomplishes functionalized polyolefins with high uniformity in quantitative yields with targetable molecular weight.

SUMMARY OF THE INVENTION

In this accordance with various aspects of the disclosure, novel organometallic α-diimine $Pd^{II}$ catalysts complexes are provided herein. Novel organometallic diimine catalyst complexes according to various aspects of the disclosure exhibit a diimine ligand and fluorinated ester chelates that form six- (of five-) membered rings with the active $Pd^{II}$ center. Herein, fluorinated ester chelated palladium catalysts according to various aspects of the disclosure allow for the preparation of polyethylenes, polyolefins and polyethylene/olefin copolymers that are terminally functionalized with the fluorinated group originally present as part of the fluorinated ester chelate of initial organometallic α-diimine $Pd^{II}$ catalysts. The lability of the fluorinated terminal unit facilitates subsequent modifications to obtain polymer blocks having various macroinitiators that can be chain extended via different polymerization techniques in subsequent living/controlled polymerization techniques including ring-opening polymerization (ROP), ring-opening metathesis polymerization (ROMP), nitroxide-mediated polymerization (NMP), and photoiniferter reversible addition-fragmentation chain transfer (PI-RAFT), yielding low dispersity multiblock copolymers. As the livingness is maintained during both polymerization methods, this technique potentially serves as a versatile platform for the preparation of novel polyethylene- and/or polyolefin-containing di-, tri- or higher order multiblock copolymers with a high degree of flexibility in molecular weight and composition.

In accordance with various aspects of the disclosure, a first embodiment is directed to a polymerization catalyst having a structure according to formula (1):

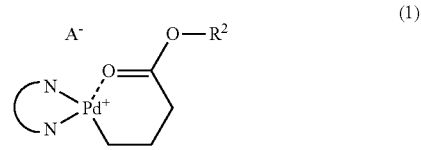

wherein

is a diimine ligand, A⁻ is a counter anion, and $R^2$ is a fluorinated alkane, alkene or alkyne, a fluorinated aromatic, a fluorinated cycloalkane or cylcoalkene, a fluorinated heteroaromatic, or a fluorinated heterocyclic.

In accordance with various aspects of the disclosure, a second embodiment is directed to a polymerization catalyst according to the first embodiment, wherein the diimine ligand has a structure comprising any one of a 1,4-diaza-1,3-butadiene backbone, a 2,2'-bipyridine backbone, a 2,2-bipyrimindine backbone, a 2,2'-bipyrazine backbone, 2,2-bibenzimidazole backbone, a bis(iminoacenaphthene) backbone, a 1,10-phenanthroline backbone, a dipyridoquinoxaline backbone, a 1,1'-biisoquinoline backbone, and a 2-(2-pyridyl)benzimidazole backbone.

In accordance with various aspects of the disclosure, a third embodiment is directed to a polymerization catalyst according to the first embodiment, wherein the diimine ligand has a structure according to Formula (2):

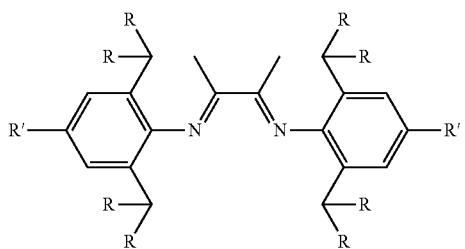

(2)

where R is an alkane, an alkene, an alkyne, an aromatic, a cycloalkane, a cylcoalkene, a heteroaromatic, or a heterocyclic group, and R' is —H or an alkyl group.

In accordance with various aspects of the disclosure, a fourth embodiment is directed to a polymerization catalyst according to the third embodiment, wherein each R is —CH₃, or each R' is —H.

In accordance with various aspects of the disclosure, a fifth embodiment is directed to a polymerization catalyst according to the third embodiment, wherein R is —CH₃ and R' is —H.

In accordance with various aspects of the disclosure, a sixth embodiment is directed to a polymerization catalyst according to any one of the first through fifth embodiments, wherein $R^2$ is selected from the group consisting of —CH₂CF₃, —CH₂CF₂CF₃, CH₂CF₂CHFCF₃, —CH₂(CF₂)₅CHF₂, —(CH₂)₂(CF₂)₅CF₃, —(CH₂)₂(CF₂)₇CF₃, —(CH₂)₂(CF₂)₉CF₃.

In accordance with various aspects of the disclosure, a seventh embodiment is directed to a polymerization catalyst according to any one of the first through fifth embodiments, wherein $R^2$ is —CH(CF₃)₂.

In accordance with various aspects of the disclosure, an eighth embodiment is directed to a polymerization catalyst according to any one of the first through fifth embodiments, wherein $R^2$ is selected from the group consisting of —C₆F₅ and —CH₂—C₆F₅.

In accordance with various aspects of the disclosure, a ninth embodiment is directed to a polymerization catalyst according to any one of the first through fifth embodiments, wherein $R^2$ is —C₆F₅.

In accordance with various aspects of the disclosure, a tenth embodiment is directed to a polymerization catalyst according to any one of the first through ninth embodiments, wherein $R^2$ is A⁻ is ⁻BArF (tetrakis[3,5-bis(trifluoromethyl)phenyl]-borate).

In accordance with various aspects of the disclosure, an eleventh embodiment is directed to a method of preparing a polyethylene homopolymer or a polyolefin homopolymer, comprising reacting ethylene or olefin monomers with a polymerization catalyst according to any one of the first through tenth embodiments to form the polyethylene homopolymer or the polyolefin homopolymer, wherein a terminus of the prepared homopolymer has a structure according to Formula (3):

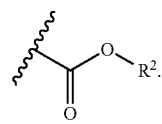

(3)

In accordance with various aspects of the disclosure, a twelfth embodiment is directed to a method according to the eleventh embodiment, wherein the polyolefin is a polypropylene, a polybutene, a polypentene, a polyhexene, a polyheptene, a polydecene or a polyoctene, a polyisoprene, a poly(1,3-butadiene), a polyisobutylene, a poly(4-methyl-1-pentene).

In accordance with various aspects of the disclosure, a thirteenth embodiment is directed to a method according to the eleventh embodiment, wherein the polyolefin is a polyhexene.

In accordance with various aspects of the disclosure, a fourteenth embodiment is directed to a method of preparing a polyethylene/olefin copolymer (P(E-co-O)), comprising reacting ethylene and one or more olefin monomers with a polymerization catalyst according to any one of the first through tenth embodiments to form the P(E-co-O) copolymer, wherein a terminus of the prepared copolymer has a structure according to Formula (3):

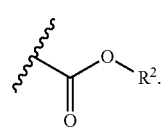

(3)

In accordance with various aspects of the disclosure, a fifteenth embodiment is directed to a method according to the fourteenth embodiment, wherein the olefin monomers are selected from group consisting of propylene, 1-butene, 1-pentene, 1-hexene, 1-octene, 1-decene, and 1,3-butadiene, isoprene, isobutylene and 4-methyl-1-pentene.

In accordance with various aspects of the disclosure, a sixteenth embodiment is directed to a method of preparing a multiblock copolymer, wherein a first block of the multiblock copolymer is a polyethylene block, a polyolefin block, or a P(E-co-O) block having a terminus with a structure according to Formula (3):

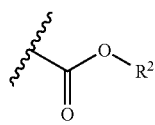

(3)

wherein $R^2$ is a fluorinated alkane, alkene or alkyne, a fluorinated aromatic, a fluorinated cycloalkane or cylcoalkene, a fluorinated heteroaromatic, or a fluorinated heterocyclic, the method comprising reacting polymer monomers with the polyethylene block, the polyolefin block, or the P(E-co-O) block having the terminus with a structure according to Formula (3) to form a second block of the multiblock copolymer, wherein the terminus of the second block opposite the first block has the structure according to Formula (3).

In accordance with various aspects of the disclosure, a seventeenth embodiment is directed to a method according to the sixteenth embodiment, wherein the polymer monomers are ethylene, one or more olefins, or ethylene and one or more olefins.

In accordance with various aspects of the disclosure, an eighteenth embodiment is directed to method a of preparing a multiblock copolymer, wherein a first block of the multiblock copolymer is a polyethylene block, a polyolefin block, or a P(E-co-O) block having a terminus with a structure according to Formula (3):

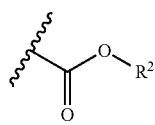

(3)

wherein $R^2$ is a fluorinated alkane, alkene or alkyne, a fluorinated aromatic, a fluorinated cycloalkane or cylcoalkene, a fluorinated heteroaromatic, or a fluorinated heterocyclic, the method comprising a) subjecting the formula (3) terminus structure to a chemical reaction to form a modified terminus structure; and b) reacting polymer monomers with the polyethylene block, the polyolefin block, or the P(E-co-O) block having the modified terminus structure to form a second block of the multiblock copolymer.

In accordance with various aspects of the disclosure, a nineteenth embodiment is directed to a method according to the eighteenth embodiment, wherein the first block is a polyethylene block.

In accordance with various aspects of the disclosure, a twentieth embodiment is directed to a method according to the eighteenth embodiment, wherein the first block is a polyolefin block.

In accordance with various aspects of the disclosure, a twenty-first embodiment is directed to a method according to the eighteenth embodiment, wherein the first block is a P(E-co-O) block.

In accordance with various aspects of the disclosure, a twenty-second embodiment is directed to a method according to any one of the eighteenth through twenty-first embodiments, wherein subjecting the Formula (3) terminus structure to a chemical reaction to form a modified terminus structure comprises reacting the Formula (3) terminus structure with 4-hydroxy-TEMPO or 4-amino-2,2,6,6-tetramethylpiperidine-1-oxyl and the resulting modified terminus structure comprises a TEMPO functional group.

In accordance with various aspects of the disclosure, a twenty-third embodiment is directed to a method according to the twenty-second embodiment, wherein the polymer monomers used to form the second block are selected from the group consisting of vinyl monomers, vinyl ether monomers, N-vinylpyrrolidone, vinyl acetate, acrylate monomers, methacrylate monomers, and any combination thereof.

In accordance with various aspects of the disclosure, a twenty-fourth embodiment is directed to a method according to any one of the eighteenth through twenty-first embodiments, wherein subjecting the Formula (3) terminus structure to a chemical reaction to form a modified terminus structure comprises reacting the Formula (3) terminus structure with a trithiocarbonate compound and the resulting modified terminus structure comprises a trithiocarbonate functional group.

In accordance with various aspects of the disclosure, a twenty-fifth embodiment is directed to a method according to the twenty-fourth embodiment, wherein the polymer monomers used to form the second block are selected from the group consisting of acrylate monomers, methacrylate monomers, acrylamide monomers and any combination thereof.

In accordance with various aspects of the disclosure, a twenty-sixth embodiment is directed to a method according to any one of the eighteenth through twenty-first embodiments, wherein subjecting the Formula (3) terminus structure to a chemical reaction to form a modified terminus structure comprises reacting the Formula (3) terminus structure with an alkanolamine and the resulting modified terminus structure comprises a hydroxyl functional group.

In accordance with various aspects of the disclosure, a twenty-seventh embodiment is directed to a method according the twenty-sixth embodiment, wherein the polymer monomers used to form the second block are selected from the group consisting of lactones, 3,6-dimethyl-1,4-dioxane-2,5-dione, glycolide and any combination thereof.

In accordance with various aspects of the disclosure, a twenty-eighth embodiment is directed to a method according to any one of the eighteenth through twenty-first embodiments, wherein subjecting the Formula (3) terminus structure to a chemical reaction to form a modified terminus structure comprises reacting the Formula (3) terminus structure with a polyalkanolamine and the resulting modified terminus structure comprises a polyhydroxyl functional group.

In accordance with various aspects of the disclosure, a twenty-ninth embodiment is directed to a method according to the twenty-eighth embodiment, wherein the polymer monomers used to form the second block are selected from the group consisting of lactones, 3,6-dimethyl-1,4-dioxane-2,5-dione, glycolide and any combination thereof.

In accordance with various aspects of the disclosure, a thirtieth embodiment is directed to a method according to any one of the eighteenth through twenty-ninth embodiments, wherein the method further comprises c) reacting second polymer monomers with a terminus of the second block to form a third block of the multiblock copolymer.

In accordance with various aspects of the disclosure, a thirty-first embodiment is directed to a method according to the thirtieth embodiment, wherein the second polymer monomers are selected from the group consisting of vinyl monomers, vinyl ether monomers, N-vinylpyrrolidone, vinyl acetate, acrylate monomers, methacrylate monomers, acrylamide monomer, lactones, 3,6-dimethyl-1,4-dioxane-2,5-dione, glycolide and any combination thereof.

In accordance with various aspects of the disclosure, a thirty-second embodiment is directed to a method according to any one of the eighteenth through thirty-first embodiments, wherein the chemical reaction for step a) is a transesterification reaction.

In accordance with various aspects of the disclosure, a thirty-third embodiment is directed to a method according to any one of the eighteenth through thirty-first embodiments, wherein the chemical reaction for step a) is an aminolysis reaction.

In accordance with various aspects of the disclosure, a thirty-fourth embodiment is directed to a method according to any one of the eighteenth through twenty-first embodiments, wherein subjecting the formula (3) terminus structure to a chemical reaction to form a modified terminus structure comprises reacting the formula (3) terminus structure with a cycloalkene and the resulting modified terminus structure comprises a cycloalkene functional group.

In In accordance with various aspects of the disclosure, a thirty-fifth embodiment is directed to a method according to the thirty-fourth embodiment, wherein the cycloalkene is a cyclopentene, a cyclohexene, or a norbornene.

In accordance with various aspects of the disclosure, a thirty-sixth embodiment is directed to a method of preparing a cycloalkene-terminated polymer, the method comprising providing a polyethylene polymer, a polyolefin polymer, or a P(E-co-O) copolymer having a terminus with a structure according to Formula (3):

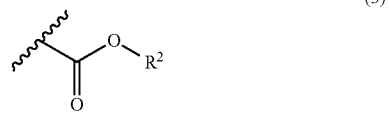

(3)

wherein $R^2$ is a fluorinated alkane, alkene or alkyne, a fluorinated aromatic, a fluorinated cycloalkane or cylcoalkene, a fluorinated heteroaromatic, or a fluorinated heterocyclic, and reacting the Formula (3) terminus structure with a cycloalkene-containing reagent to form a cycloalkene terminus structure.

In accordance with various aspects of the disclosure, a thirty-seventh embodiment is directed to a method according to the thirty-sixth embodiment, wherein $R^2$ is a fluorinated alkane, or a fluorinated aromatic.

In accordance with various aspects of the disclosure, a thirty-eighth embodiment is directed to a method according to the thirty-sixth or thirty-seventh embodiment, wherein the cycloalkene terminus structure comprises a cyclopentene, a cyclohexene, or a norbornene.

In accordance with various aspects of the disclosure, a thirty-ninth embodiment is directed to a method according to the thirty-sixth or thirty-seventh embodiment, wherein the cycloalkene terminus structure comprises a norbornene.

In accordance with various aspects of the disclosure, a fortieth embodiment is directed to a method according to any one of the thirty-sixth through thirty-ninth embodiments, wherein the chemical reaction for step a) is an aminolysis reaction.

In accordance with various aspects of the disclosure, a forty-first embodiment is directed to a method according to the fortieth embodiment, wherein the cycloalkene-containing reagent is 5-norbornene-2-methylamine.

In accordance with various aspects of the disclosure, a forty-second embodiment is directed to a method according to any one of the thirty-sixth through thirty-ninth embodiments, wherein the chemical reaction for step a) is a transesterification reaction.

In accordance with various aspects of the disclosure, a forty-third embodiment is directed to a method according to the forty-second embodiment, wherein the cycloalkene-containing reagent is 5-norbornene-2-methanol, 3-cyclopenten-1-ol or 3-cyclohexene-1-methanol.

In accordance with various aspects of the disclosure, a forty-fourth embodiment is directed to a method of forming a bottlebrush copolymer, the method comprising reacting a cycloalkene-terminated polymer formed according to by a method according to the thirty-ninth embodiment with a Grubbs catalyst to form the bottlebrush copolymer.

In accordance with various aspects of the disclosure, a forty-fifth embodiment is a polymer, the polymer having one or more polyethylene blocks, and/or one or more polyolefin blocks, and/or one or more P(E-co-O) blocks and a terminus having a structure according to formula (3):

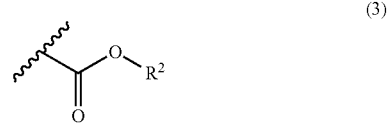

(3)

wherein $R^2$ is a fluorinated alkane, alkene or alkyne, a fluorinated aromatic, a fluorinated cycloalkane or cylcoalkene, a fluorinated heteroaromatic, or a fluorinated heterocyclic.

In accordance with various aspects of the disclosure, a forty-sixth embodiment is a polymer according to the forty-fifth embodiment, wherein $R^2$ is selected from the group consisting of $-CH_2CF_3$, $-CH_2CF_2CF_3$, $-CH(CF_3)_2$, $-CH_2CF_2CHFCF_3$, $-CH_2(CF_2)_5CHF_2$, $-(CH_2)_2(CF_2)_5CF_3$, $-(CH_2)_2(CF_2)_7CF_3$, $-(CH_2)_2(CF_2)_9CF_3$.

In accordance with various aspects of the disclosure, a forty-seventh embodiment is a polymer according to the forty-fifth embodiment, wherein $R^2$ is $-CH(CF_3)_2$.

In accordance with various aspects of the disclosure, a forty-eighth embodiment is a polymer according to the forty-fifth embodiment, wherein $R^2$ is selected from the group consisting of $-C_6F_5$ and $-CH_2-C_6F_5$.

In accordance with various aspects of the disclosure, a forty-ninth embodiment is a polymer according to the forty-fifth embodiment, wherein $R^2$ is $-C_6F_5$.

DETAILED DESCRIPTION

Figure 1:
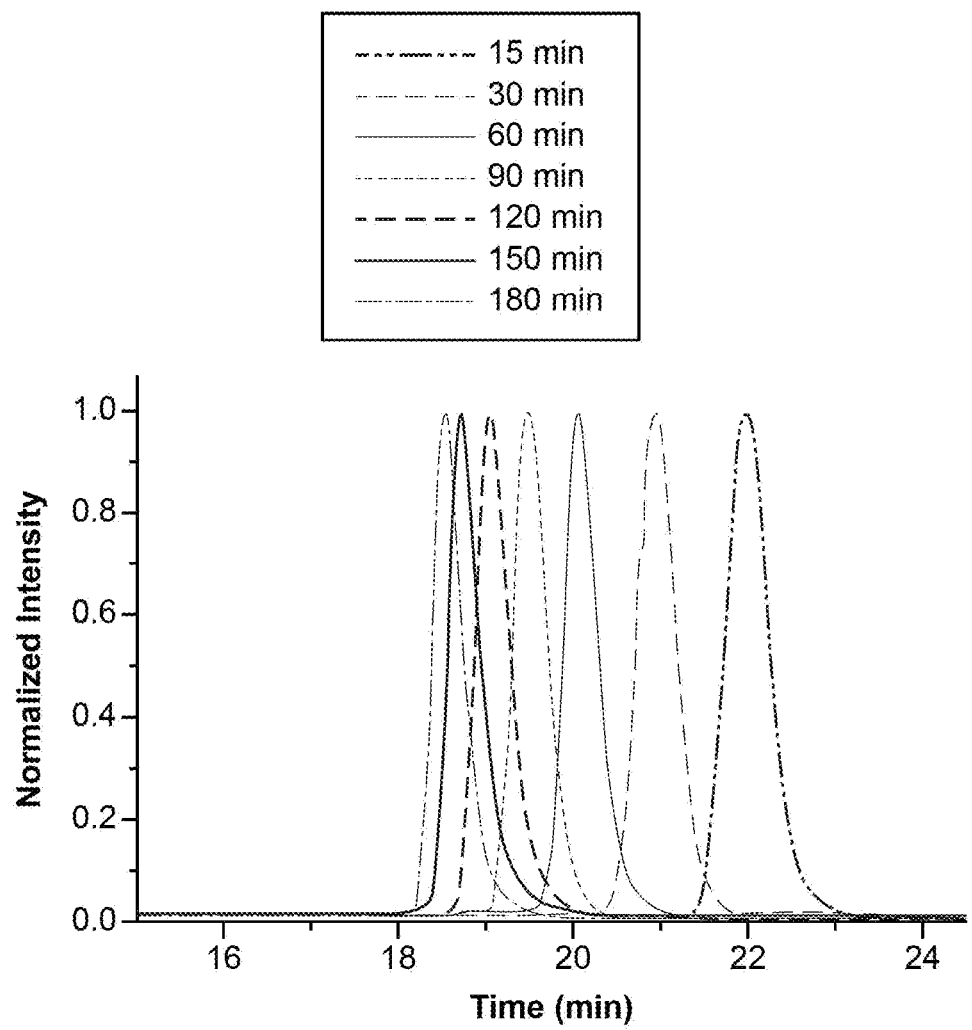
FIG. 1 is a graphical display of GPC traces showing the evolution of the molecular weight of polyethylene produced, using a fluorinated polymerization catalyst according to various aspects of the disclosure, over time in Example 1.

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, alternatively ±1 percent, alternatively ±0.5 percent, and alternatively ±0.1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

Presented herein are novel and unique organometallic diimine-palladium catalysts for ethylene and olefin polymerization reactions. In accordance with various aspects of the disclosure, the novel and inventive polymerization catalysts described herein have a general structure according to Formula (1):

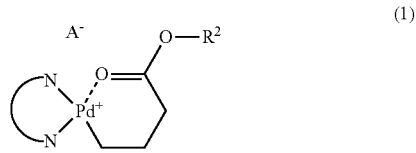

wherein

is a diimine ligand, A$^-$ is a counter anion, and R$^2$ is a fluorinated alkane, alkene or alkyne, a fluorinated aromatic, a fluorinated cycloalkane or fluorinated cylcoalkene, a fluorinated heteroaromatic, or a fluorinated heterocyclic.

In accordance with various aspects of the disclosure, the polymerization catalysts according to formula 1 includes a diimine ligand such as a ligands having a 1,4-diaza-1,3- butadiene backbone, a 2,2'-bipyridine backbone, a 2,2-bipyrimindine backbone, a 2,2'-bipyrazine backbone, 2,2-bibenzimidazole backbone, a bis(iminoacenaphthene) backbone, a 1,10-phenanthroline backbone, a dipyridoquinoxaline backbone, a 1,1'-biisoquinoline backbone, 2-(2-pyridyl)benzimidazole backbone.

In some instances, the diimine ligand is preferably has a 1,4-diaza-1,3-butadiene backbone. In some instances, the diimine ligand preferably a structure according to formula (2):

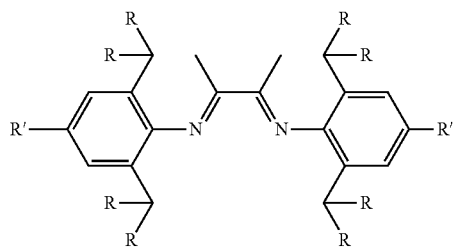

where R is an alkane, an alkene, an alkyne, an aromatic, a cycloalkane, a cylcoalkene, a heteroaromatic, or a heterocyclic group, and R' is —H or an alkyl group. In some instances, each R is —$CH_3$. In some instances, each R' is —H. In some instances, each R is —$CH_3$ and each R' is —H.

In accordance with various aspects of the disclosure, the polymerization catalysts according to formula 1 includes a fluorinated group $R^2$ which can be any one a fluorinated alkane, alkene or alkyne, a fluorinated aromatic, a fluorinated cycloalkane or fluorinated cylcoalkene, a fluorinated heteroaromatic, or a fluorinated heterocyclic. In some instances, the use of a fluorinated alkane for the $R^2$ group is preferred. Suitable fluorinated alkanes include, but are not limited to —$CH_2CF_3$, —$CH_2CF_2CF_3$, —$CH(CF_3)_2$, —$CH_2CF_2CHFCF_3$, —$CH_2(CF_2)_5CHF_2$, —$(CH_2)_2(CF_2)_5CF_3$, —$(CH_2)_2(CF_2)_7CF_3$, —$(CH_2)_2(CF_2)_9CF_3$. In some instances, —$CH(CF_3)_2$ is a particularly preferred fluorinated alkane $R^2$ group. In some instances, the use of a fluorinated aromatic for the $R^2$ group is preferred. Suitable fluorinated aromatics include, but are not limited to, —$C_6F_5$ and —$CH_2$—$C_6F_5$. In some instances, —$C_6F_5$ is a preferred fluorinated aromatic $R^2$ group.

Counter ion $A^-$ is obtained from a salt that promotes the catalyst's function, but the counter ion will not coordinate to the metal center of the catalyst or otherwise interfere with the catalytic cycle. Suitable examples of counter ion $A^-$ include, but are not limited to, tetrakis[3,5-bis(trifluoromethyl)phenyl]borate ion ($^-$BArF) and tetrakis(pentafluorophenyl)borate. In some instances, the use of $^-$BArF as counter ion $A^-$ is preferred.

Catalysts according to formula (1) can be synthesized by reacting an organometallic palladium diimine precursor complex in the presence of a fluorinated acrylate according to exemplary Equation 1:

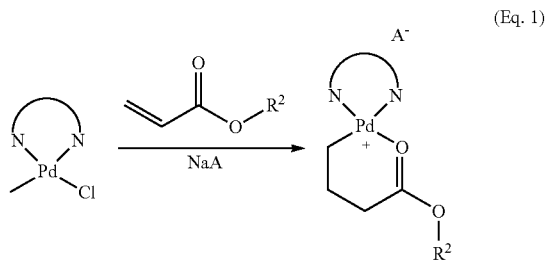

In exemplary equation 1, the formation of a catalyst according to formula 1 occurs via single insertion of the fluorinated acrylate to the Pd-alkyl (here, methyl) bond of the palladium diimine precursor complex. The formation of the six-membered ring chelate (including the Pd atom) via 2,1-insertion exhibits high regioselectivity. In some instances, a minor product, a five-membered chelate, is also formed via a 1,2-insertion reaction pathway. In some instances, a five-membered chelate variant of a catalyst according to Formula (1) may also be useful in various catalytic reactions. Reactions according to Equation 1 generally take place in a water-free and inert environment with an organic solvent at room or slightly elevated (e.g., 25 to 60° C.) temperature. The product may be purified, isolated and characterized using various techniques such FT-IR, $^1H$ NMR, $^{13}C$ NMR, and $^{19}F$ NMR.

In accordance with various aspects of the disclosure, the inventors have surprisingly discovered that the use of catalysts according to Formula (1) in ethylene and olefin polymerizations results in polyethylene homopolymers, polyolefin homopolymers and polyethylene/olefin copolymer having a terminus with a structure according to Formula (3):

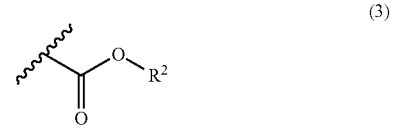

where $R^2$ is a fluorinated group as described above. Catalysts according to Formula (1) can be used in the polymerization of ethylene to form polyethylene (PE) homopolymers with a terminus as described above, (PE)-C(=O)—O—$R^2$. In accordance with various aspects of the disclosure, catalysts according to Formula (1) can be used in the polymerization of higher order olefins to form corresponding polyolefin (PO) homopolymers with a terminus as described above, (PO)—C(=O)—O—$R^2$. Olefins that may be polymerized by catalysts according to Formula 1 may have a linear or branched structure. Linear higher order olefins that may be polymerized by catalysts according to Formula (1) may include, but are not necessarily limited to, propylene, 1-butene, 1-pentene, 1-hexene, 1-octene, and 1,3-butadiene. Branched higher order olefins that may be polymerized by catalysts according to Formula (1) may include, but are not necessarily limited to, isoprene, isobutylene and 4-methyl-1-pentene. In some instances, linear or branched olefins can be used alone to form corresponding homopolymers. In some instances, ethylene and one or more olefins may be copolymerized to form ethylene/olefin (P(E-co-O)) copolymers with a terminus as described above, P(E-co-O)—C(=O)—O—$R^2$ and having varying physical and/or chemical properties.

PE, PO and P(E-co-O) polymers having a terminus with a structure according to Formula (3) are also particularly advantageous as the fluorinated $R^2$ group is easily reacted with other additional ethylene or olefin monomers to form diblock copolymers. Synthesis of the second block can be accomplished either in a "one-pot" reaction system where the first block is formed in a reaction vessel, as described above, followed by injection of the second block monomers into the reaction vessel and polymerization of the second block monomers to form the second block of the di. In some instances, the first block can be synthesized, isolated and purified prior to synthesis of the second block to form the diblock copolymer by reacting the first block, second block monomers a catalyst. In preferred embodiments, formation of a diblock copolymer is accomplished in a one-pot reaction system. In either reaction strategy, catalysts according to Formula (1) can be used to form both the first and second block of the diblock copolymer. Upon formation of the second block, the fluorinated $R^2$ group will be located at the terminus of the second block opposite the first block. As such, the resulting diblock copolymer can serve as the basis for the formation triblock or higher order multiblock copolymers by polymerization of new ethylene and/or olefin monomers to form a third block, optionally new ethylene and/or olefin monomers to form a fourth block, and so one, where each block is made of one of PE homopolymer block, a PO homopolymer block, or a P(E-co-O) copolymer block.

PE, PO, P(E-co-O) polymers, di-, tri- or higher ethylene/olefin multiblock copolymers having a terminus with a structure according to Formula (3) are also particularly advantageous as the fluorinated $R^2$ group is easily reacted with other reagents to form various different terminally functionalized polymers which, in turn, may serve as the basis for reaction with new monomers to form di-, tri- or higher order multiblock copolymers with diverse chemical polymer blocks.

For example, a polymer having a terminus with a structure according to Formula (3) can be reacted with 4-hydroxy-2,2,6,6-tetramethylpiperidine-1-oxyl (4-hydroxy-TEMPO) in a transesterification, or with 4-amino-2,2,6,6-tetramethylpiperidine-1-oxyl (4-amino-TEMPO) in an aminolysis reaction, to for a polymer having a TEMPO-terminated block for use in the formation of subsequent polymer blocks by nitroxide mediate radical polymerization. TEMPO-terminated polymers may be useful in the addition of polymer blocks formed from vinyl monomers such as, for example, styrene and derivatives thereof (for example, 4-(trifluoromethyl)styrene, 4-vinylbenzyl chloride, N,N-dimethylvinylbenzylamine, 3-nitrostyrene, 3-chlorostyrene, 4-chlorostyrene, 4-bromostyrene, and methyl 4-vinylbenzoate), vinyl ethers (for example, ethyl vinyl ether, butyl vinyl ether, isobutyl vinyl ether, tertbutyl vinyl ether, propyl vinyl ether, cyclohexyl vinyl ether, dodecyl vinyl ether, phenyl vinyl ether, ethylene glycol vinyl ether, 2-ethylhexyl vinyl ether, 2-chloroethyl vinyl ether, isooctyl vinyl ether, hexadecyl vinyl ether, vinyl propionate, and vinyl decanoate), N-vinylpyrrolidone, vinyl acetate, acrylates (for example, isoprene, methyl acrylate, ethyl acrylate, n-butyl acrylate, isobutyl acrylate, tert-butyl acrylate, benzyl acrylate, propgaryl acrylate, pentafluorophenyl acrylate, pentabromobenzyl acrylate, pentabromophenyl acrylate, 2-ethylhexyl acrylate, 2-(methoxyethyl) acrylate, isobornyl acrylate, ethylene glycol phenyl ether acrylate, 2-(dimethylamino)ethyl acrylate, 2-(diethylamino)ethyl acrylate, 3-(dimethylamino)propyl acrylate, 4-hydroxybutyl acrylate, 2-hydroxypropyl acrylate, di(ethylene glycol) ethyl ether acrylate, hydroxypropyl acrylate, ethylene glycol dicyclopentenyl ether acrylate, 2-chloroethyl acrylate, 2-tetrahydropyranyl acrylate, 2-naphthyl acrylate, 9-anthracenylmethyl acrylate, 2,2,3,3,4,4,5,5,6,6,7,7-dodecafluoroheptyl acrylate, 3,5,5-trimethylhexyl acrylate, 2,2,3,3,4,4,4-heptafluorobutyl acrylate, 2,2,3,4,4,4-hexafluorobutyl acrylate, 2,2,2-trifluoroethyl acrylate, 2,2,3,3,3-pentafluoropropyl acrylate, 2-hydroxy-3-phenoxypropyl acrylate, allyl acrylate, and 2,3-dibromopropyl acrylate) and methacrylates (for examples, methyl methacrylate, ethyl, methacrylate, propyl methacrylate, butyl methacrylate, tert-butyl methacrylate, sec-butyl methacrylate, isobutyl methacrylate, pentafluorophenyl methacrylate, tetrahydrofurfuryl methacrylate, furfuryl methacrylate, hexyl methacrylate, cyclohexyl methacrylate, propgaryl methacrylate, isobornyl methacrylate, phenyl methacrylate, benzyl methacrylate 2-hydroxyethyl methacrylate, 2-(dimethylamino)ethyl methacrylate, 2-(diethylamino)ethyl methacrylate, ethylene glycol methyl ether methacrylate, ethylene glycol phenyl ether methacrylate, diethylene glycol methyl ether methacrylate, diethylene glycol butyl ether methacrylate, 2-ethoxyethyl methacrylate, 1-pyrenemethyl methacrylate, pentabromophenyl methacrylate, pentabromobenzyl methacrylate, hydroxypropyl methacrylate, hydroxybutyl methacrylate, solketal methacrylate, 3,3'-diethoxypropyl methacrylate, 2,2,2-trifluoroethyl methacrylate, 2,2,3,3-tetrafluoropropyl methacrylate, 2,2,3,3,3-pentafluoropropyl methacrylate, 2,2,3,3,4,4,4-heptafluorobutyl methacrylate, 2,2,3,4,4,4-hexafluorobutyl methacrylate, 9-fluorenyl methacrylate, ethylene glycol dicyclopentenyl ether methacrylate, 2-naphthyl methacrylate, 9-anthracenylmethyl methacrylate, (2-Boc-amino)ethyl methacrylate, 2-(diisopropylamino)ethyl methacrylate, 2-ethylhexyl methacrylate, 2-N-morpholinoethyl methacrylate, 2-(methylthio) ethyl methacrylate, 2-(tert-butylamino)ethyl methacrylate, and 3-chloro-2-hydroxypropyl methacrylate).

Also for example, a polymer having a terminus with a structure according to Formula (3) can be reacted with a suitable trithiocarbonate, such 4-cyano-4-[(dodecylsulfanylthiocarbonyl)sulfanyl]pentanol, via a transesterification reaction, to form a trithiocarbonate-terminated block for use in the formation of subsequent polymer blocks by RAFT polymerization. trithiocarbonate-terminated polymers may be useful in the addition of polymer blocks formed from acrylate monomers (for example, isoprene, methyl acrylate, ethyl acrylate, n-butyl acrylate, isobutyl acrylate, tert-butyl acrylate, benzyl acrylate, propgaryl acrylate, pentafluorophenyl acrylate, pentabromobenzyl acrylate, pentabromophenyl acrylate, 2-ethylhexyl acrylate, 2-(methoxyethyl) acrylate, isobornyl acrylate, ethylene glycol phenyl ether acrylate, 2-(dimethylamino)ethyl acrylate, 2-(diethylamino) ethyl acrylate, 3-(dimethylamino)propyl acrylate, 4-hydroxybutyl acrylate, 2-hydroxypropyl acrylate, di(ethylene glycol) ethyl ether acrylate, hydroxypropyl acrylate, ethylene glycol dicyclopentenyl ether acrylate, 2-chloroethyl acrylate, 2-tetrahydropyranyl acrylate, 2-naphthyl acrylate, 9-anthracenylmethyl acrylate, 2,2,3,3,4,4,5,5,6,6,7,7-dodecafluoroheptyl acrylate, 3,5,5-trimethylhexyl acrylate, 2,2,3,3,4,4,4-heptafluorobutyl acrylate, 2,2,3,4,4,4-hexafluorobutyl acrylate, 2,2,2-trifluoroethyl acrylate, 2,2,3,3,3-pentafluoropropyl acrylate, 2-hydroxy-3-phenoxypropyl acrylate, allyl acrylate, and 2,3-dibromopropyl acrylate) and methacrylates (for examples, methyl methacrylate, ethyl, methacrylate, propyl methacrylate, butyl methacrylate, tert-butyl methacrylate, sec-butyl methacrylate, isobutyl methacrylate, pentafluorophenyl methacrylate, tetrahydrofurfuryl methacrylate, furfuryl methacrylate, hexyl methacrylate, cyclohexyl methacrylate, propgaryl methacrylate, isobornyl methacrylate, phenyl methacrylate, benzyl methacrylate 2-hydroxyethyl methacrylate, 2-(dimethylamino)ethyl methacrylate, 2-(diethylamino)ethyl methacrylate, ethylene glycol methyl ether methacrylate, ethylene glycol phenyl ether methacrylate, diethylene glycol methyl ether methacrylate, diethylene glycol butyl ether methacrylate, 2-ethoxyethyl methacrylate, 1-pyrenemethyl methacrylate, pentabromophenyl methacrylate, pentabromobenzyl methacrylate, hydroxypropyl methacrylate, hydroxybutyl methacrylate, solketal methacrylate, 3,3'-diethoxypropyl methacrylate, 2,2,2-trifluoroethyl methacrylate, 2,2,3,3-tetrafluoropropyl methacrylate, 2,2,3,3,3-pentafluoropropyl methacrylate, 2,2,3,3,4,4,4-heptafluorobutyl methacrylate, 2,2,3,4,4,4-hexafluorobutyl methacrylate, 9-fluorenyl methacrylate, ethylene glycol dicyclopentenyl ether methacrylate, 2-naphthyl methacrylate, 9-anthracenylmethyl methacrylate, (2-Boc-amino)ethyl methacrylate, 2-(diisopropylamino)ethyl methacrylate, 2-ethylhexyl methacrylate, 2-N-morpholinoethyl methacrylate, 2-(methylthio)ethyl methacrylate, 2-(tert-butylamino)ethyl methacrylate, and 3-chloro-2-hydroxypropyl methacrylate), and acrylamide monomers (for example, acrylamide, N-isopropylmethacrylamide, N-isopropylacrylamide, N-hydroxyethylacrylamide, N-(isobutoxymethyl)acrylamide, N-(3-methoxypropyl)acrylamide N-(hydroxymethyl)acrylamide, N-tertbutylacrylamide, N,N-dimethylacrylamide, N,N-diethylacrylamide N,N-dimethylmethacrylamide, and N,N-diethylmethacrylamide).

Also for example, a polymer having a terminus with a structure according to Formula (3) can be reacted with a suitable alkanolamine, such as ethanolamine via an aminolysis reaction to form a hydroxyl-terminated block for use in the formation of subsequent polymer blocks by Ring Opening Polymerization (ROP) reaction. For example, such hydroxyl terminated block may be uses to open lactones (such as β-propiolactone, γ-butyrolactone 6-valerolactone, ε-caprolactone, and hexadecanolide) to form corresponding polylactone blocks, and open 3,6-dimethyl-1,4-dioxane-2,5-dione and glycolide to form corresponding polylactide and polyglycolide blocks, respectively.

Also for example, a polymer having a terminus with a structure according to formula (3) can be reacted with a suitable polyalkanolamine, such as serinol or tromethamine, via an aminolysis reaction to form a polyhydroxyl-terminated block for use in the formation of subsequent polymer blocks by a Ring Opening Polymerization (ROP) reaction and discussed above.

Also for example, a polymer having a terminus with a structure according to Formula (3) can be reacted with a suitable cycloalkene, such as 5-norbornene-2-methanol, 3-cyclopenten-1-ol and 3-cyclohexene-1-methanol, via a transesterification reaction to form a cycloalkene-terminated block for use in the formation of subsequent polymer blocks by Ring Opening Metathesis Polymerization (ROMP) reaction. Also for example, a polymer having a terminus with a structure according to Formula (3) can be reacted with a suitable cycloalkene, such as 5-norbornene-2-methylamine, via an aminolysis reaction to form a cycloalkene-terminated block for use in the formation of subsequent polymer blocks by Ring Opening Metathesis Polymerization (ROMP) reaction. Norbornene-terminated polymers made in accordance with various aspects of the disclosure may be useful in, for example, the formation bottlebrush polymers having individual polymer brush strands of various types of homopolymers, copolymers, and di-, tri- or higher order multiblock copolymers.

EXAMPLES

General Considerations. All manipulations of palladium complexes were carried out under an inert atmosphere ($N_2$) using glove box or standard Schlenk techniques unless otherwise noted. All glassware was flame dried under a vacuum prior to use.

Materials. Calcium hydride powder (CaH2, ≥90%), diethyl ether anhydrous (≥99.7%), acetonitrile ACS reagent (≥99.5%), toluene (HPLC, 99.9%), 2,3-butanedione (97%), 2,6-dimethylaniline (≥99%), 2-tert-butylaniline (98%), 1,1'-bi-2-naphthol (99%), MgSO4 (≥99.0%), camphor-10-sulfonic acid (β) (98%), chlorobenzene (anhydrous, 99.8%), Luperox® A75 (benzoyl peroxide, 75% remainder water), 4-Cyano-4-[(dodecylsulfanylthiocarbonyl)sulfanyl]pentanol, and 4-amino-TEMPO (≥98%) were purchased from Sigma-Aldrich and used as received unless otherwise noted. 2,6-Diisopropylaniline (90%) were purchased from Oakwood Chemical and used as received. Formic acid (≥98%) was purchased from Millipore Sigma and used as received. Perfluorophenyl acrylate (98%, MEHQ stabilized) was purchased from Ambeed, Inc. Methanol (99%), Methylene chloride (DCM, 99.9%), acetone (99.8%, ExtraDry), and pentane (99.5%) were purchased from Fischer Scientific. Sodium tetrakis[3,5-bis(trifluoromethyl)phenyl]-borate (NaBAr'4, 97%) was purchased from Matrix Scientific and used as received. Chloromethyl(1,5-cyclooctadiene) palladium (II) (99%) was purchased from Stream Chemicals, Inc and used as received. 6-Valerolactone (Sigma-Aldrich, technical grade) and ε-caprolactone (Sigma-Aldrich, 97%) were distilled over calcium hydride under vacuum and cold-stored over molecular sieves (4 Å). 3,6-Dimethyl-1,4-dioxane-2,5-dione (rac-LA, Sigma-Aldrich, 99%) was recrystallized twice from toluene and dried under vacuum. Styrene (Sigma-Aldrich, ReagentPlus®, 4-tert-butylcatechol stabilized, ≥99%) was passed through a column of basic alumina to remove the inhibitor. Solvents involved in handling pentafluorophenyl ester-bound catalysts and polymers are obtained from the solvent purification system (Inert PureSolv MD 5) or dried over molecular sieves (4 Å). Copper grids with Carbon Film only on 400 mesh for TEM were purchased from Ted Pella, Inc.

Instrumentation. Nuclear Magnetic Resonance (NMR). Spectra were acquired at room temperature on a JEOL ECA 400 (400 MHz), ECA-500 (500 MHz), or ECA-600 (600 MHz) NMR spectrometer. Chemical shifts are measured relative to residual solvent peaks as an internal standard set to δ 5.32 and δ 54.00 ($CD_2Cl_2$), and δ 7.26 and δ 77.23 ($CDCl_3$) for $^1H$ and $^{13}C$ respectively.

Gel Permeation Chromatography (GPC). Analyses of polyacrylamides were performed using a Tosoh high-performance GPC system HLC-8320 equipped with an auto-injector, a dual differential refractive index (RI)—UV detectors, and TSKgel® Alpha series columns connected in series (7.8×300 mm TSKgel® α-5000, TSKgel® α-4000, TSKgel® α-3000). GPC analysis was carried out in HPLC grade N, N-dimethylformamide containing 10 mmol/L LiBr with a flow rate of 1.0 mL/min at 40° C. Other polymers were performed using a Tosoh high-performance GPC system HLC-8320 equipped with an auto-injector, a dual differential refractive index (RI) UV detectors, and TSKgel® G series columns connected in series (7.8×300 mm TSKgel® G5000Hxl, TSKgel® G4000Hxl, TSKgel® G3000Hxl). GPC analysis was carried out in HPLC grade tetrahydrofuran with a flow rate of 1.0 mL/min at 40° C. Molecular weights ($M_n$ and $M_w$) and molecular weight distributions (Đ) were calculated from polystyrene (PS) standards with molecular weights of 800 to $2.2×10^6$ g/mol provided by Polymer Standard Service (PSS).

Electron Paramagnetic Resonance (EPR). EPR spectra were recorded on a continuous wave X-band (9.5 GHz)

EMXnano Bench-Top EPR spectrometer from Bruker Biospin. Samples were added to 2 mm EPR S9 tubes and The EPR spectra were acquired at 23° C. and processed using the XEPR Bruker Spectrometer software package. EPR simulations were performed with Bruker XERP Spin-fit software.

Transmission Electron Microscope (TEM) imaging was performed using JEOL JEM 210 F microscope operated at 200 kV. TEM samples for PE-b-PDMA self-assembly were prepared by dispersing (~1 mg/mL) the polymer in 0.22 μm filtered methanol and deposited onto copper grids followed by a deposition of phosphotungstic acid monohydrate solution (3 wt %) in methanol. TEM samples for PISA of PE-b-PNIPAM were prepared by diluting 20 μL aliquot with 1 mL of toluene and depositing a drop of the dispersion onto a copper grid. PISA samples were not stained. Excess solutions on grids were immediately blotted by filter paper. All samples were dried overnight at an ambient temperature.

Dynamic light scattering (DLS) was measured on a Malvern Zetasizer Nano ZS at 25° C., unless otherwise specified with an angle of 173° and at 0.5 mg/mL concentration.

Synthesis of Ligands and Complexes

Synthesis of bis(2,6-diisopropylaniline)-butane-2,3-diimine

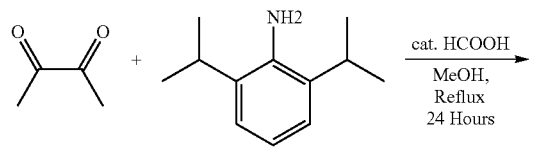

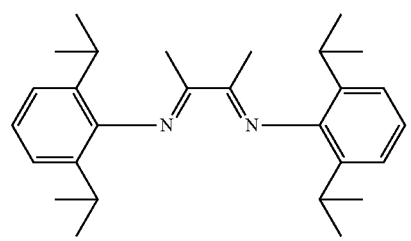

A 250 ml round bottom flask was charged with 100 mL of methanol, 16.7 mL of 2,6-diisopropylaniline (15.71 g, 88.62 mmol, 2.1 eq.) and 3.7 mL of butanedione (3.63 g, 42.2 mmol, 1.00 eq.). Formic acid (~200 μL, 4.0 mmol, 0.05 eq) was then added to the solution, and the reaction mixture was heated to 95° C. After refluxing overnight, the reaction mixture was cooled down to room temperature, concentrated under reduced pressure, and cooled to −20° C. overnight. The solid residue was collected by vacuum filtration and washed with cold MeOH then dried in vacuo resulting in yellow crystals. $^1$H NMR (400 MHz, CD$_2$Cl$_2$, ppm) δ 7.18 (m, 4H), 7.10 (m, 2H), 2.73 (sp, J=6.60 Hz, 4H), 2.07 (s, 6H), 1.22 (d, J=5.93 Hz, 6H), 1.20 (d, J=5.93 Hz, 6H), 1.18 (d, J=5.93 Hz, 6H), 1.16 (d, J=5.93, 6H). $^{13}$C NMR (150 MHz, CD$_2$Cl$_2$, ppm) δ 168.69, 146.80, 135.61, 124.23, 123.50, 28.99, 23.32, 22.92.

Synthesis of (Ar—N═C(Me)-C(Me)═N—Ar)Pd(Me)(Cl) (Ar 2,6-diisopropylaniline)

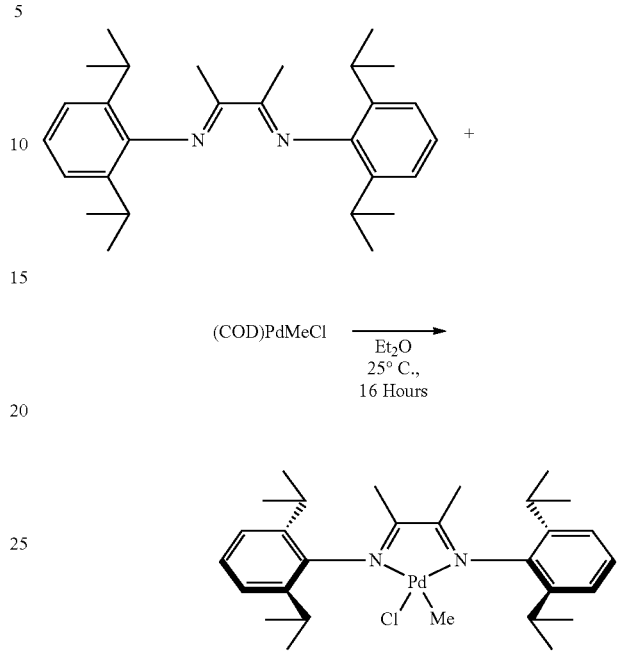

Et$_2$O (10 ml) was added to a flame-dried 25 ml round bottom flask containing chloro(1,5-cyclooctadiene)methylpalladium(II) (270 mg, 1.02 mmol, 1 eq) and a slight excess of bis(2,6-diisopropylaniline)-butane-2,3-diimine (450 mg, 1.11 mmol, 1.09 eq). The formation of an orange precipitate was observed within a few minutes upon mixing. The reaction mixture was stirred overnight and Et$_2$O and free cyclooctadiene were then removed via filtration. The solid product was washed twice with 10-20 mL of cold Et$_2$O, then dried overnight in vacuo to yield 520 mg (91% yield) of the title compound as an orange solid. $^1$H NMR (400 MHz, CDCl$_3$, ppm): δ 7.36-7.26 (m, 6H), 3.08 (sep, J=6.60 Hz, 2H), 3.02 (sep, J=6.93 Hz, 2H), 2.06 (s, 3H), 2.05 (s, 3H), 1.42 (d, J=7.31 Hz, 6H), 1.37 (d, J=7.31 Hz, 6H), 1.20 (d, J=6.99 Hz, 6H), 1.19 (d, J=6.99 Hz, 6H), 0.39 (s, 3H). $^{13}$C NMR (150 MHz, CDCl$_3$, ppm) δ 175.08, 170.44, 142.44, 142.28, 139.12, 138.57, 128.18, 127.30, 124.49, 123.76, 29.45, 28.99, 24.08, 29.97, 23.68, 23.48, 21.62, 20.20.

Synthesis of [(Ar—N═C(Me)-C(Me)═N—Ar)Pd(CH$_2$)$_3$C(O)OPhF$_5$](BAr$_4$F) (Catalyst 1)

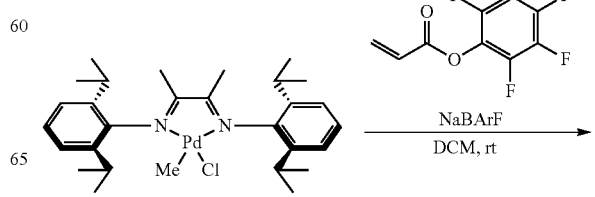

-continued

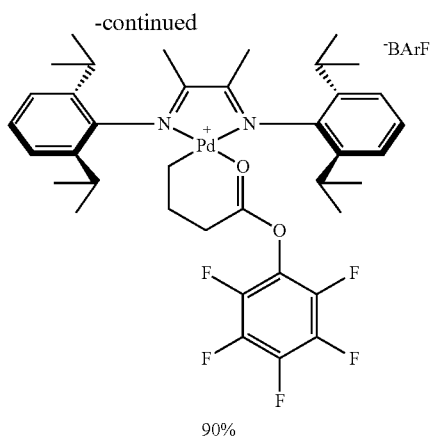

90%

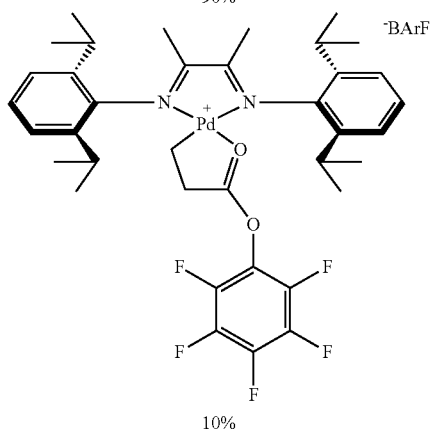

10%

At room temperature, palladium precursor (500 mg, 0.882 mmol, 1 eq) was weighted out with NaBArF (845 mg, 0.978 mmol, 1.1 eq) in a flame-dried round bottom flask. DCM (20 ml) and pentafluorophenyl acrylate (175 μL, 1.1 mmol, 1.2 eq) were mixed and then injected into the reaction. After stirring for 1 hour, NaCl was removed from the reaction via filtration using a 0.45 μm PTFE syringe filter. The solvent was then evaporated and the residue was crashed out and washed with pentanes (100 ml). The complex was collected through vacuum filtration and dried under a high vacuum overnight. Catalyst 1 (the major isomer) was obtained as yellow solid (yield=91%).

Catalyst 1 was prepared by a single insertion of pentafluorophenyl acrylate to the Pd-alkyl bond of the precursor using an adapted procedure. NMR analyses of the products revealed the predominant formation of a six-membered ring chelate via 2,1-insertion with approximately 90% regioselectivity. 1,2-insertion also occurred, resulting in the generation of a five-membered chelate (10%). $^{19}$F NMR experiments were performed to confirm the attachment of the fluorinated ester. Additionally, the crystal structure of the major isomer was verified by X-ray diffraction analysis after recrystallization by slow diffusion of pentane into a solution of in $CH_2Cl_2$ at −20° C.

$^1$H NMR (500 MHz, $CD_2Cl_2$) δ 7.43 (br, 8H, BArF, $H_o$), 7.42 (br, 4H, BArF, $H_p$), 7.36-7.11 (6H$_{aryl}$), 2.92-2.90 (m, J=7.2 Hz, 2H, CHMe$_2$), 2.87 (t, J=5.5 Hz, 2H, CH$_2$CH$_2$C(O)), 2.79 (m, 2H, CHMe$_2$), 2.19 and 2.08 (s, 3H each, N=C(Me)-C'(Me)=N), 1.50 (t, J=5.8 Hz, 2H, PdCH$_2$CH$_2$) 1.38 (d, J=6.8 Hz, 6H, CHMe$_2$), 1.21 (d, J=6.8 Hz, 6H, CHMe$_2$), 1.18 (d, J=6.8 Hz, 6H, CHMe$_2$), 0.78 (p, J=5.8 Hz, 1H, PdCH$_2$CH$_2$CH$_2$C(O)). $^{13}$C NMR (150 MHz, $CD_2Cl_2$) δ 182.40 (C=O), 179.46 and 172.34 (C=N), 140.57 ($C_{ipso}$), 138.70 and 137.74 ($C_o$), 129.61 ($C_p$), 125.13 and 123.81 ($C_m$), 35.40 (CH$_2$C(O)), 31.66 (PdCH$_2$), 29.37 and 29.25 (CHMe$_2$), 23.83-23.79 (CHMe$_2$), 23.54 (CH$_2$CH$_2$CO), 23.19-23.03 (CHMe$_2$), 21.98 and 19.91 (N=CCH$_3$). $^{19}$F NMR (470 MHz, $CD_2Cl_2$) δ −62.75 (CF$_3$—BArF), −152.45 (d, 2F$_m$), −153.16 (t, 1F$_p$), −159.21 (t, 2F$_o$). $^1$H NMR (500 MHz, $CD_2Cl_2$) of isomer 1: δ 2.19 and 2.14 (s, 3H each, N=C(Me)-C'(Me)=N), 1.31 (d, J=6.8 Hz, 6H, CHMe$_2$), 1.25 (d, J=6.8 Hz, 6H, CHMe$_2$), 1.28 (d, J=7.2 Hz, 3H, CHMeC(O)). $^{19}$F NMR (470 MHz, $CD_2Cl_2$) of isomer 1: −152.78 (d, 2F$_m$), −153.75 (t, 1F$_p$), −60.05 (t, 2F$_o$).

Synthesis of [(Ar—N=C(Me)-C(Me)=N—Ar)Pd(CH$_2$)$_3$C(O)OCH$_2$PhF](BAr$_4$F)

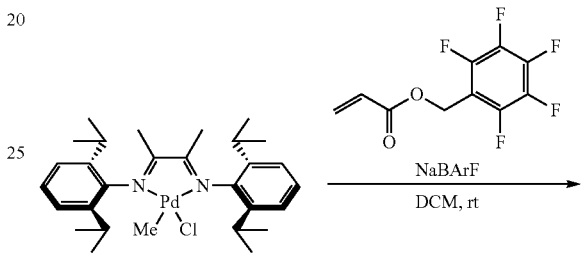

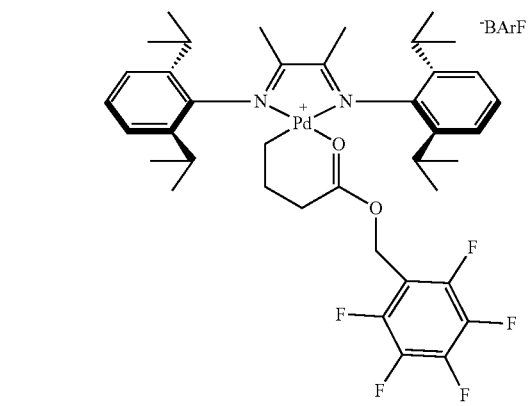

Synthesis of[(Ar—N=C(Me)-C(Me)N—Ar)Pd(CH$_2$)$_3$C(O)Ch(CF$_3$)$_2$](BAr$_4$F)

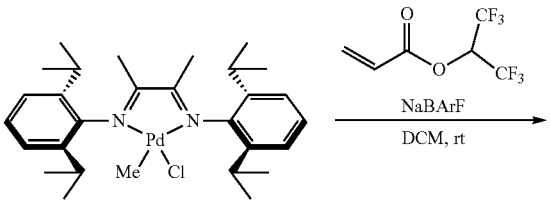

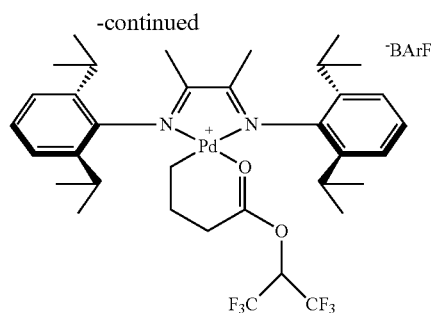

Example 1. Ethylene Polymerization Using an Inventive Fluorinated Polymerization Catalyst (Catalyst 1)

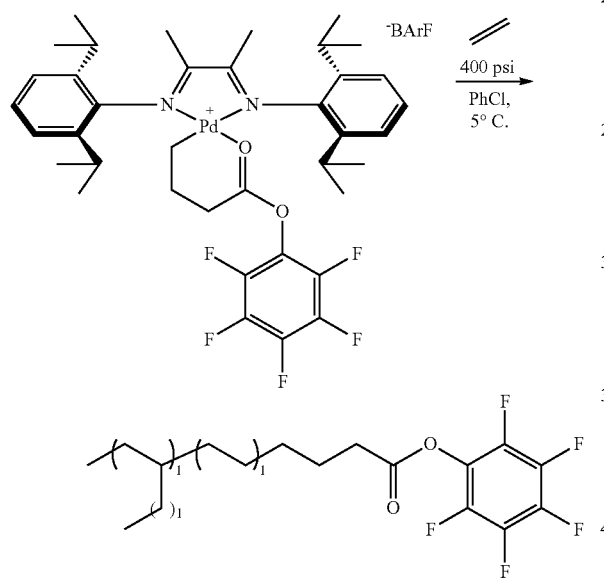

A mechanically stirred 300 mL Parr® reactor, equipped with a heating mantle and a thermocouple was heated overnight to 80° C. under vacuum. The reactor was vented with argon and then cooled to room temperature. The reactor was then pressurized to 100 psi ethylene and vented three times. A sampling port located on the reactor was opened and chlorobenzene (80 ml) was added to the reactor. After closing the sampling port, the reactor was pressurized with ethylene to 100 psi and vented twice. The ethylene pressure was then raised to 400 psi, and the chlorobenzene was stirred until the system equilibrated at 5° C. After venting the ethylene pressure, a solution of catalyst 1 (100 mg, 6.14× $10^{-5}$ mol) in chlorobenzene (20 ml) was added to the reactor through the sampling port. The reactor was then recharged with ethylene to 400 psi to start the polymerization.

To monitor the growth of the polymer, 5 mL of the reaction was removed periodically through the sampling port on the reactor and quenched with 200 μL of triethylsilane. The solution in the vial was concentrated down, washed with acetone, then dried in vacuo. The sample in the vial was then analyzed by SEC/GPC. After the allotted polymerization time, the ethylene pressure was vented and 500 μL of triethylsilane was added to the reaction to quench the catalyst. The reaction was transferred to a round bottom flask from which the solvent was removed under reduced pressure. The residue was dissolved in hexanes, filtered through a plug of aluminum oxide neutral, concentrated then precipitated in dry acetone. The isolated polymer was dried before analysis.

The polymerization livingness was evidenced through low dispersities that remained during the reaction, in addition to the linear increase of molecular weight versus time. Due to the chelate structure, ethylene polymerization using Catalyst 1 can directly generate semi-telechelic polyethylene bearing a pentafluoro ester moiety (PE-PFPh) that was introduced by the initiating species at the beginning of the propagation. GPC analysis with dual detection showed a good overlap of RI and UV traces, which was detectable because of the aromatic polymer end-group. $_1$H NMR analysis of the PE-PFE showed a distinctive peak of $CH_2COOPFPh$ at 2.66 ppm, suggesting the deshielding effect caused by the terminal fluorinated group. This was further confirmed through observed $^{19}F$ NMR resonances that are similar to the reported values of a small molecule model. A good correlation between molecular weight determined by GPC ($M_n^{15\ min}$=8600) and $^1$H-NMR chain-end analysis ($M_n^{15\ min}$=7700), as well as the lack of olefinic resonances indicated the high chain-end fidelity of the polymerization.

Figure 2:
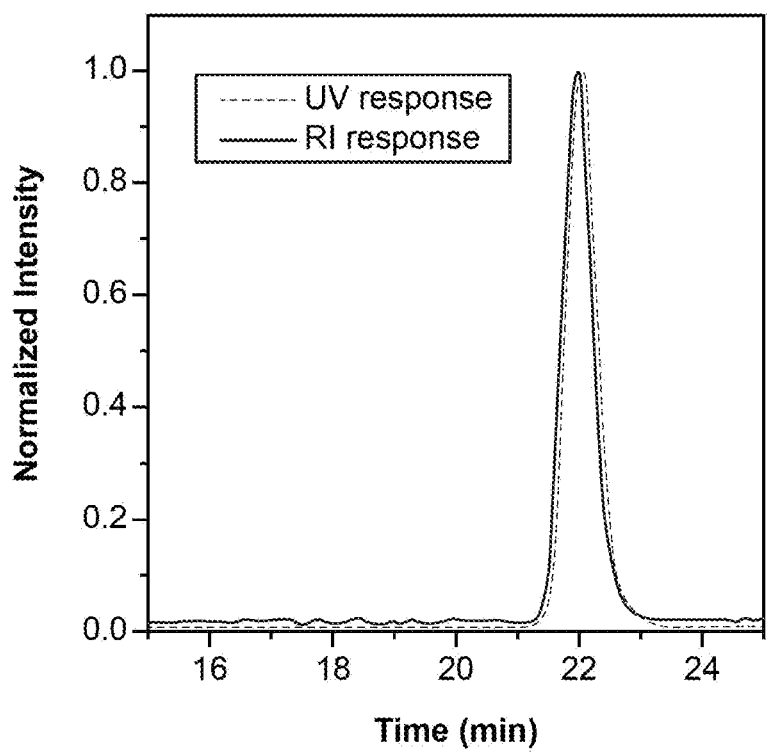
FIG. 2 is a graphical display of refractive index (RI) vs ultraviolet (UV) responses of GPC traces at 15 min after of polyethylene production using a fluorinated polymerization catalyst according to various aspects of the disclosure in Example 1.
Figure 3:
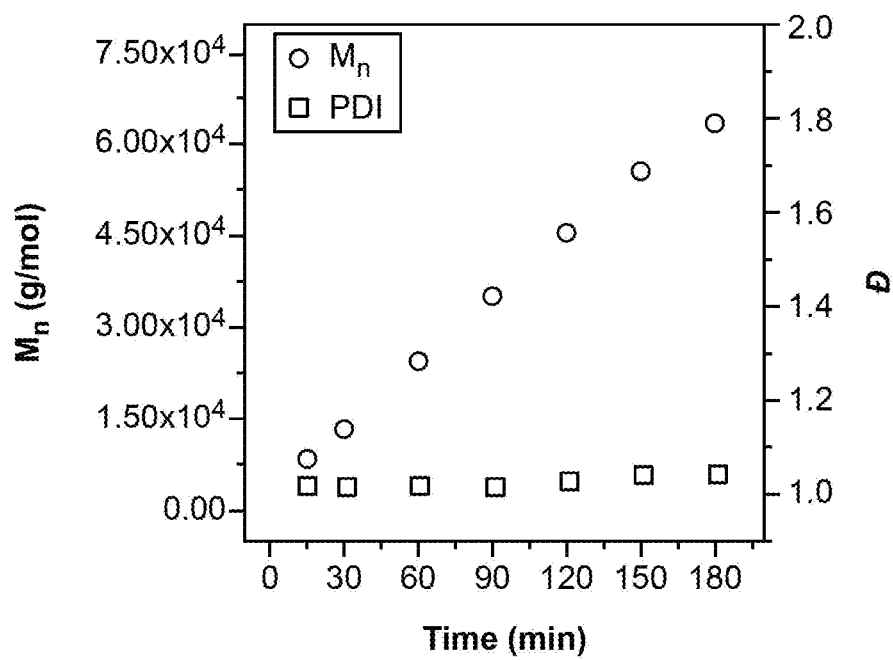
FIG. 3 is a graphical display showing the molecular weight ($M_n$; g/mol) and Đ ($M_w/M_n$) of polyethylene produced, using a fluorinated polymerization catalyst according to various aspects of the disclosure, over time in Example 1.

FIG. 1 is a graphical display of GPC traces showing the evolution of the molecular weight of the polyethylene product over time. FIG. 2 is a graphical display of refractive index (RI) vs ultraviolet (UV) responses of GPC traces at 15 min after polymerization. FIG. 3 is a graphical display showing the molecular weight ($M_n$; g/mol) and Đ ($M_w/M_n$) of the polyethylene product over time. The results of the polymerization study using inventive catalyst 1 are also provided in Table 1 below.

TABLE 1

| Entry | Time (min) | $M_n$ (kg/mol; GPC) | $M_n$ (kg/mol; GPC) | Đ ($M_w/M_n$) |
|---|---|---|---|---|
| 1 | 15 | 8.4 | 8.6 | 1.02 |
| 2 | 30 | 13.5 | 13.8 | 1.02 |
| 3 | 60 | 24.7 | 25.2 | 1.02 |
| 4 | 90 | 35.4 | 36.1 | 1.02 |
| 5 | 120 | 45.6 | 47.0 | 1.03 |
| 6 | 150 | 55.7 | 58.2 | 1.05 |
| 7 | 180 | 63.4 | 66.2 | 1.05 |

Example 2. Ethylene Polymerization Using a Comparative Non-Fluorinated Polymerization Catalyst

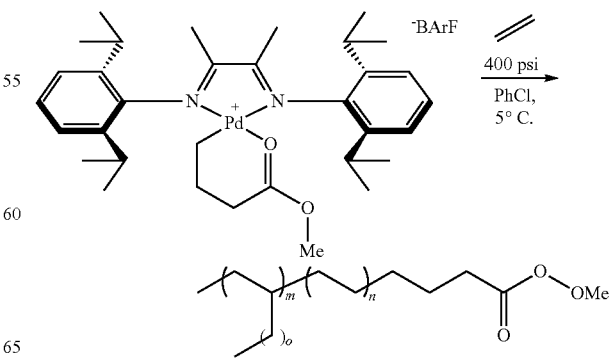

A mechanically stirred 300 mL Parr® reactor, equipped with a heating mantle and a thermocouple was heated overnight to 80° C. under vacuum. The reactor was vented with argon and then cooled to room temperature. The reactor was then pressurized to 100 psi ethylene and vented three times. A sampling port located on the reactor was opened and chlorobenzene (80 ml) was added to the reactor. After closing the sampling port, the reactor was pressurized with ethylene to 100 psi and vented twice. The ethylene pressure was then raised to 400 psi, and the chlorobenzene was stirred until the system equilibrated at 5° C. After venting the ethylene pressure, a solution of catalyst 2 (90.6 mg, 6.14×10$^{-5}$ mol) in chlorobenzene (20 ml) was added to the reactor through the sampling port. The reactor was then recharged with ethylene to 400 psi to start the polymerization. To monitor the growth of the polymer, 5 mL of the reaction was removed periodically through the sampling port on the reactor and quenched with 200 μL of triethylsilane. The solution in the vial was concentrated down, washed with acetone, then dried in vacuo. The sample in the vial was then analyzed by GPC. After the allotted polymerization time, the ethylene pressure was vented and 500 μL of triethylsilane was added to the reaction to quench the catalyst. The reaction was transferred to a round bottom flask from which the solvent was removed under reduced pressure. The residue was dissolved in hexanes, filtered through a plug of aluminum oxide (neutral), concentrated then precipitated in dry acetone. The isolated polymer was dried before analysis.

Figure 4:
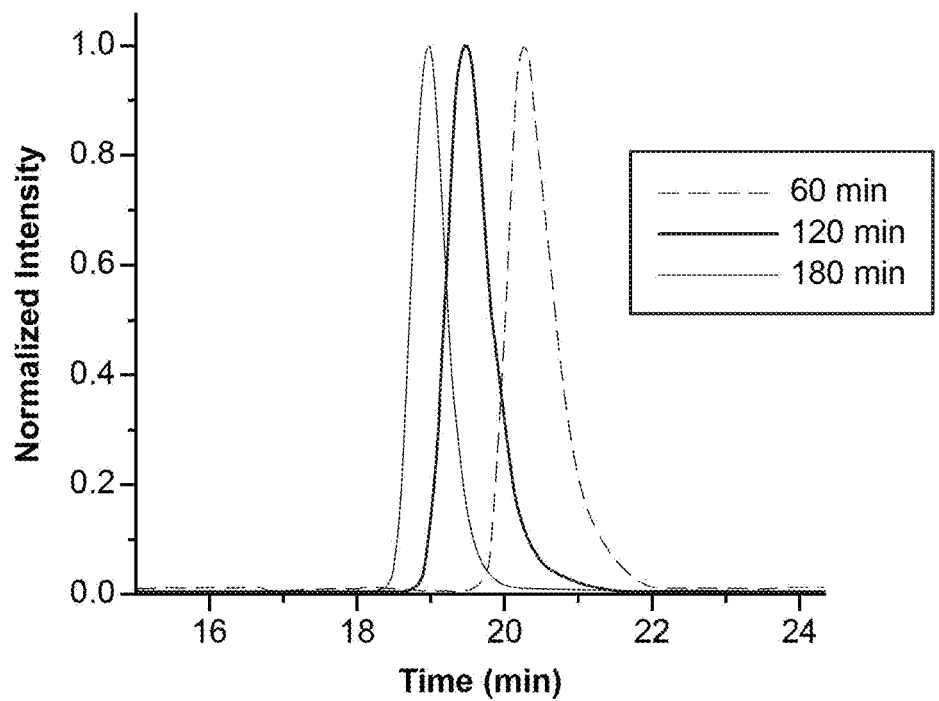
FIG. 4 is a graphical display of GPC traces showing the evolution of the molecular weight of polyethylene produced, using a comparative non-fluorinated polymerization catalyst according to various aspects of the disclosure, over time in Example 2.
Figure 5:
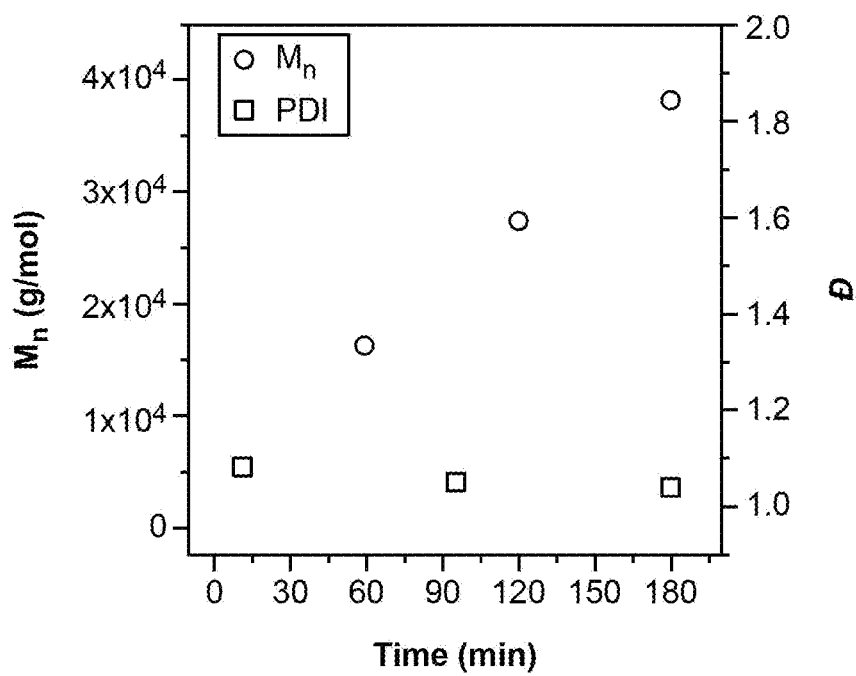
FIG. 5 is a graphical display showing the molecular weight ($M_n$; g/mol) and Đ ($M_w/M_n$) of polyethylene produced, using a comparative non-fluorinated polymerization catalyst according to various aspects of the disclosure, over time in Example 2.

FIG. 4 is a graphical display of GPC traces showing the evolution of the molecular weight of the polyethylene product over time. FIG. 5 is a graphical display showing the molecular weight ($M_n$; g/mol) and Đ ($M_w/M_n$) of the polyethylene product over time. The results of the polymerization study using the comparative catalyst are also provided in Table 2 below.

TABLE 2

| Entry | Time (min) | $M_n$ (kg/mol; GPC) | $M_n$ (kg/mol; GPC) | Đ ($M_w/M_n$) |
|---|---|---|---|---|
| 1 | 60 | 16.2 | 17.6 | 1.09 |
| 2 | 120 | 27.3 | 28.9 | 1.06 |
| 3 | 180 | 38.0 | 40.0 | 1.05 |

Example 3. Activity Comparison Between an Inventive Catalyst 1 (Example 1) and a Comparative Catalyst (Example 2)

In this example, polyethylene was produced according to Examples 1 and 2 above using the inventive Catalyst 1 (Example 1) and the comparative catalyst (Example 2) in separate reactions under identical conditions (6.14×10$^{-5}$ mol catalyst in 20 ml chlorobenzene, 400 psi, 1 hr., 5° C.). The obtained polyethylene polymers were dried in a vacuum set at 40° C. for 2 days before determining the yield. Turnover frequency (TOF) was calculated based on the amount of produced polymers and mole of catalyst used. The results of the polymerization reactions of Example 3 are provided below in Table 3.

TABLE 3

| | | polymerization | | | GPC | | |
|---|---|---|---|---|---|---|---|
| Entry | Yield (g) | TOF [(mol Pd)$^{-1}$ · h$^{-1}$] | $M_n^{TOF}$ (kg/mol) | rate, k, (s$^{-1}$) | $M_n$ (kg/mol; GPC) | $M_n$ (kg/mol; GPC) | Đ ($M_w/M_n$) |
| Cat. 1 | 1.34 | 777 | 21.8 | 339 | 24.2 | 24.6 | 1.02 |
| Comp. Cat. | 0.42 | 244 | 6.8 | 182 | 16.3 | 17.3 | 1.06 |

Example 4. 1-hexene Polymerization Using Inventive Catalyst 1

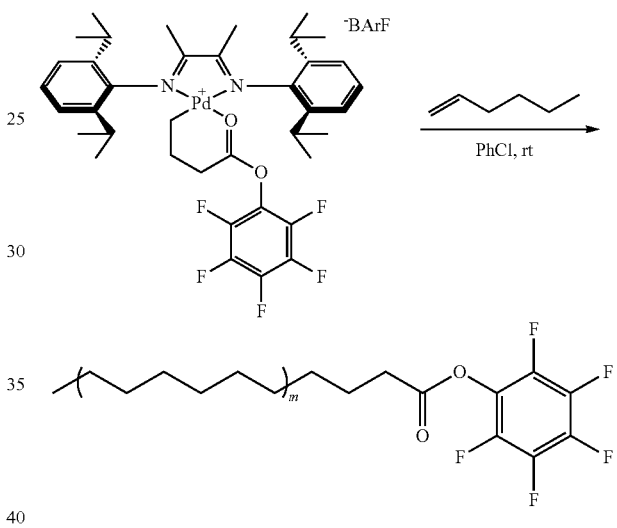

To a flame-dried round bottom flask, equipped with a stir bar, catalyst 1 (43.9 mg, 2.70×10$^{-5}$ mol) was added and dissolved by 12 mL of degassed chlorobenzene. 1-hexene (2 mL, 1.36 g, 1.61×10$^{-2}$ mol) was then injected to the reaction to start the polymerization (monomer concentration=2.0 M). Polymerization was conducted at ambient temperature. To monitor the monomer conversion, 100 μL aliquots were removed from the reaction periodically and added to 1-dram vials containing 500 μL deuterated chloroform and 3 drops of MA. To track the evolution of molecular weight over time, 400 μL aliquots were removed from the reaction vessel and quenched by 100 μL of triethylsilane. The volatiles was partially removed under reduced pressure and polymer crude was washed with acetone and dried under vacuum for GPC analysis.

Figure 6:
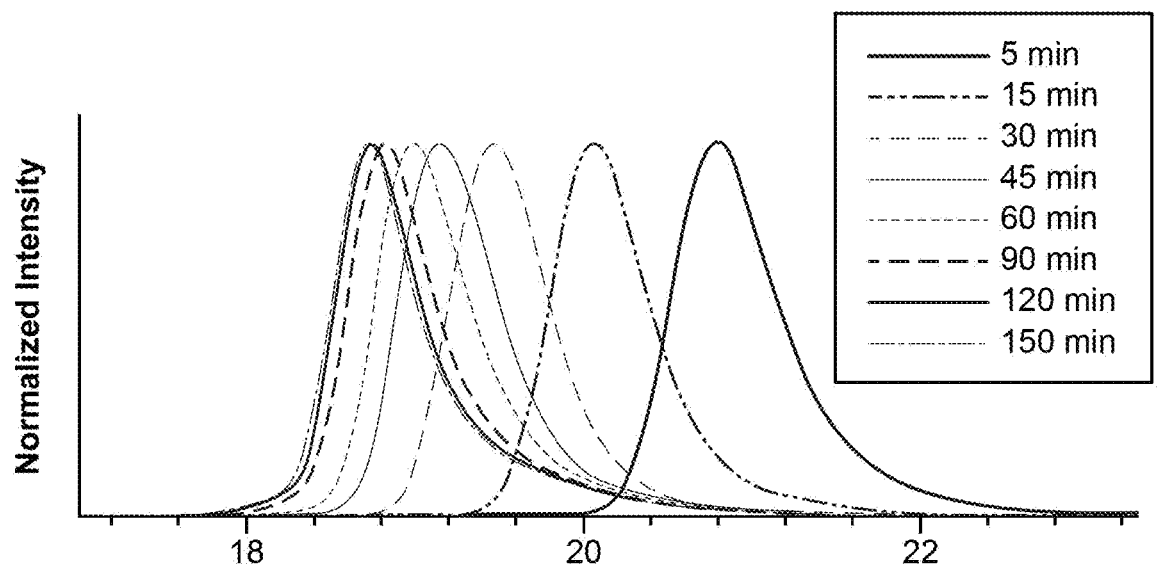
FIG. 6 is a graphical display of GPC traces showing the evolution of the molecular weight of the poly(1-hexene) product over time, using a fluorinated polymerization catalyst according to various aspects of the disclosure, in Example 4.
Figure 7:
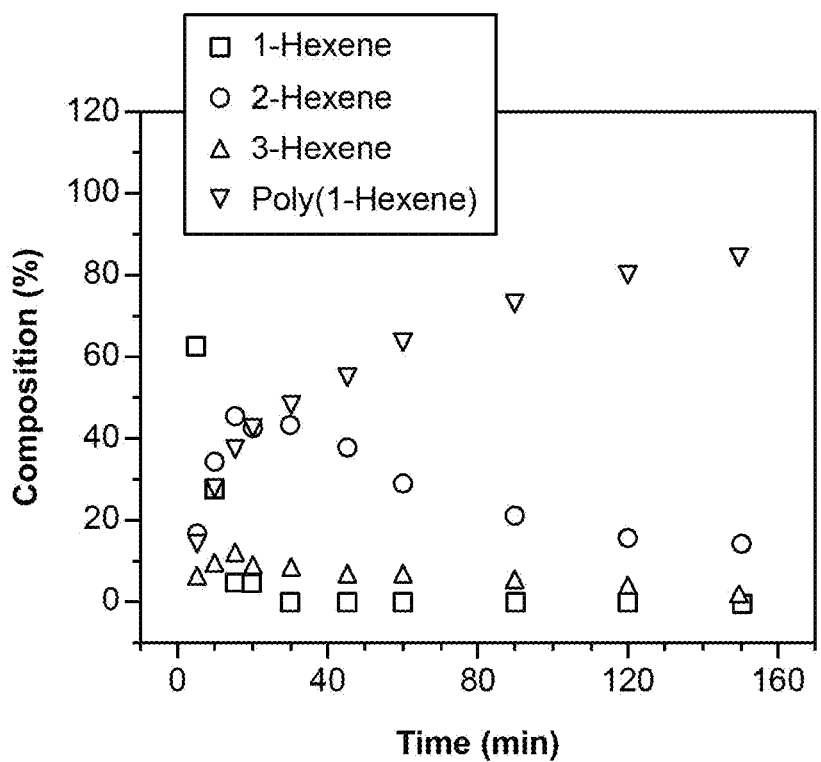
FIG. 7 is a graphical display of the composition of the poly(1-hexene) product mixture over time, using a fluorinated polymerization catalyst according to various aspects of the disclosure, in Example 4.
Figure 8:
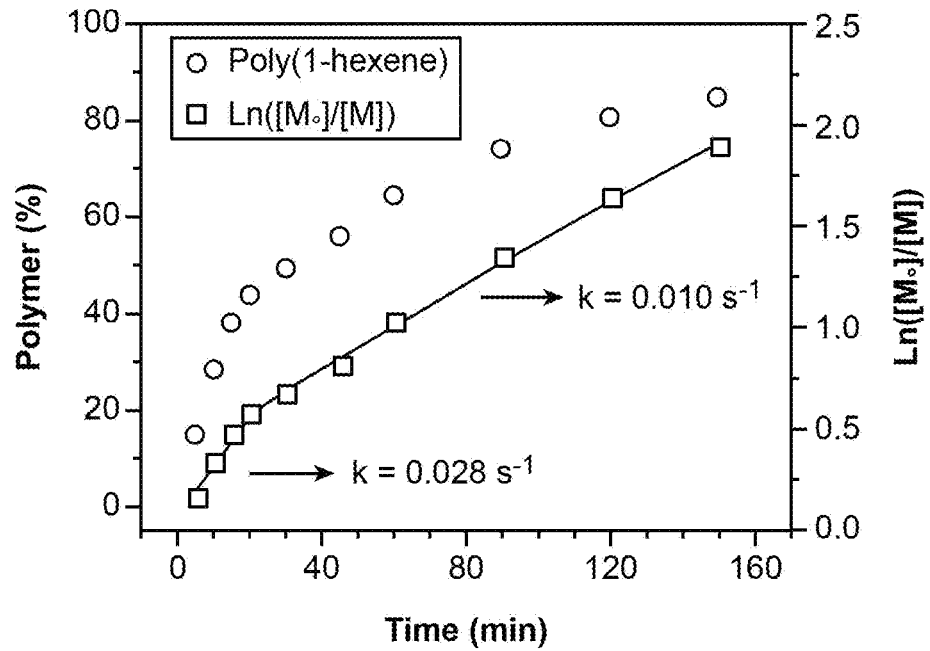
FIG. 8 is a graphical display showing the polymer percentage and $L_n([M_o]/[M])$ of the poly(1-hexene) product over time, using a fluorinated polymerization catalyst according to various aspects of the disclosure, in Example 4.
Figure 9:
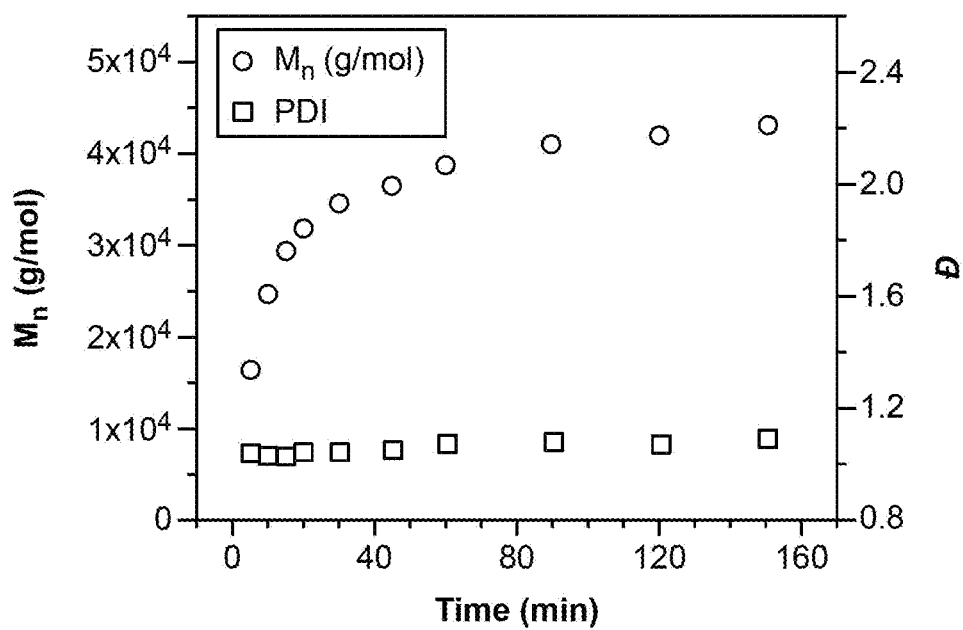
FIG. 9 is a graphical display showing the molecular weight ($M_n$; g/mol) and Đ ($M_w/M_n$) of the poly(1-hexene) product over time, using a fluorinated polymerization catalyst according to various aspects of the disclosure, in Example 4.
Figure 10:
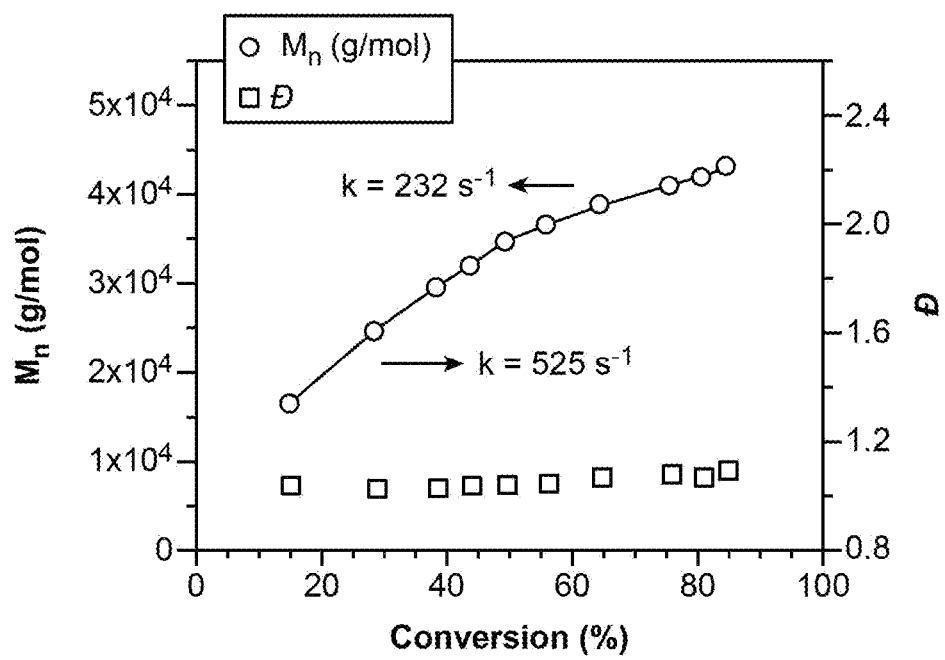
FIG. 10 is a graphical display showing the molecular weight ($M_n$; g/mol) and Đ ($M_w/M_n$) of the poly(1-hexene) product as a function of conversion percentage, using a fluorinated polymerization catalyst according to various aspects of the disclosure, in Example 4.
Figure 11:
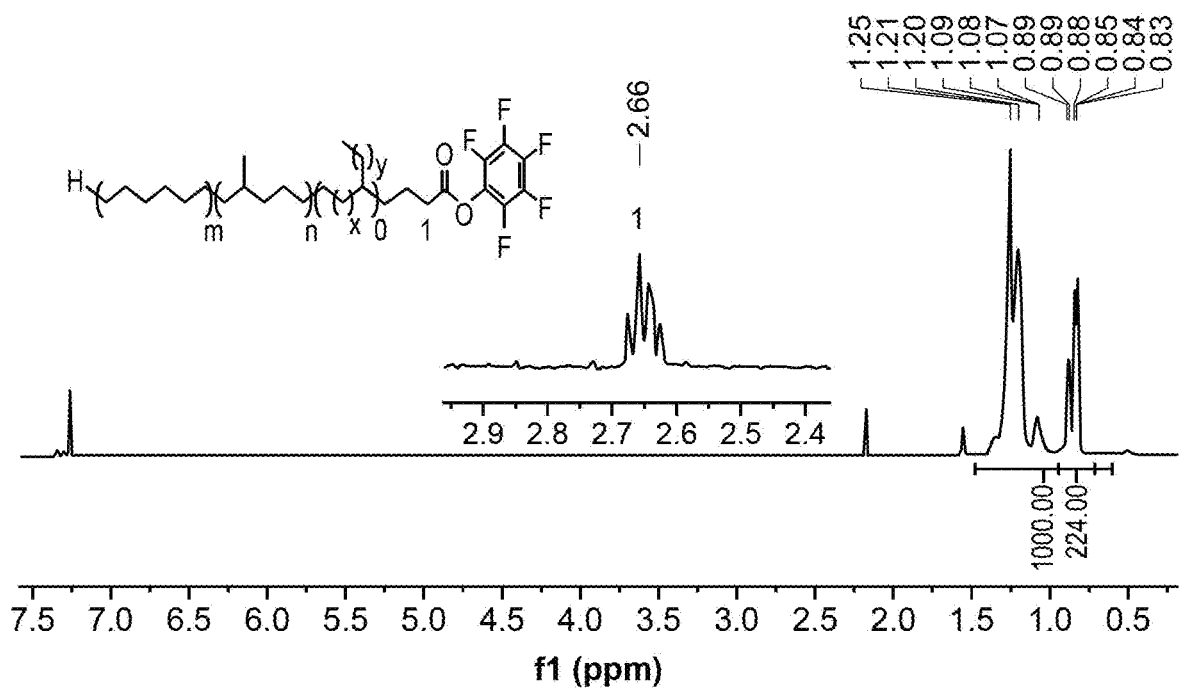
FIG. 11 is an $^1$H NMR (600 MHz, CDCl$_3$, 25° C.) spectrum of the polyhexene product produced, using a fluorinated polymerization catalyst according to various aspects of the disclosure, in Example 4.
Figure 12:
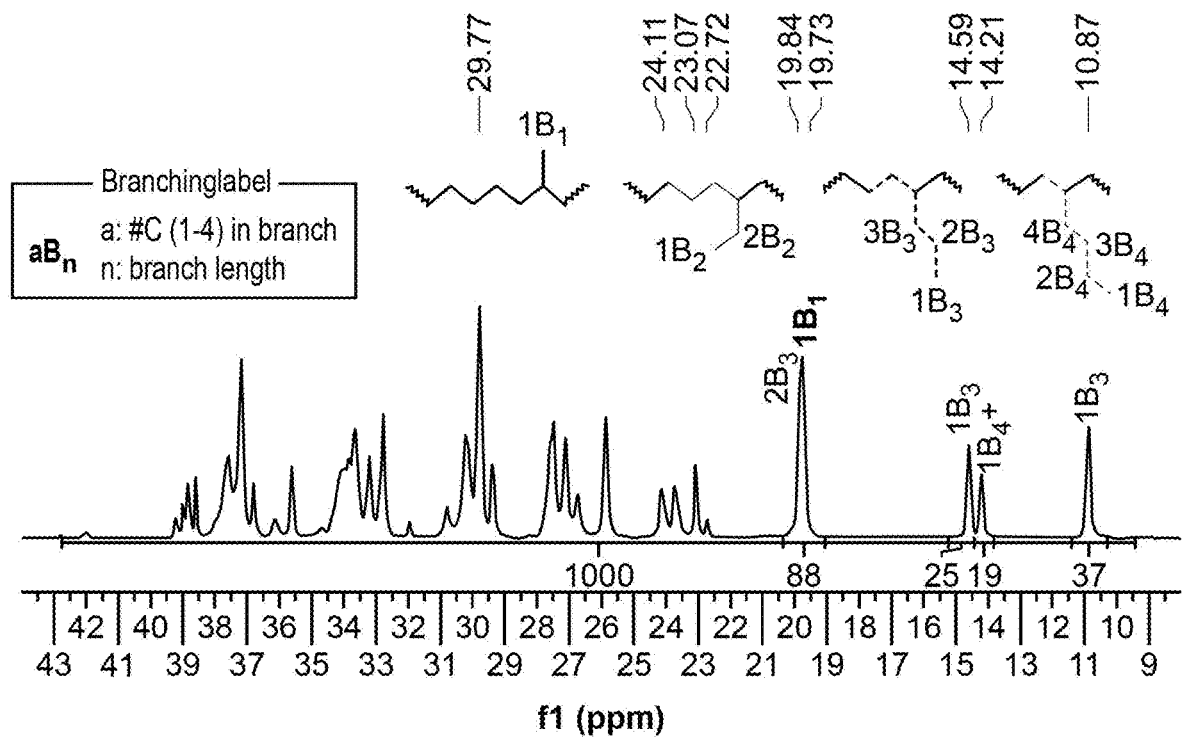
FIG. 12 is a $^{13}$C NMR (600 MHz, CDCl$_3$, 25° C.) spectrum of the polyhexene product produced, using a fluorinated polymerization catalyst according to various aspects of the disclosure, in Example 4.

FIG. 6 is a graphical display of GPC traces showing the evolution of the molecular weight of the poly(1-hexene) product over time. FIG. 7 is a graphical display of the composition of the poly(1-hexene) product over time. FIG. 8 is a graphical display showing the polymer percentage and $L_n$ ([$M_o$]/[M]) of the poly(1-hexene) product over time. FIG. 9 is a graphical display showing the molecular weight ($M_n$; g/mol) and Đ ($M_w/M_n$) of the poly(1-hexene) product over time. FIG. 10 is a graphical display showing the molecular weight ($M_n$; g/mol) and Đ ($M_w/M_n$) of the poly(1-hexene) product as a function of conversion percentage. The composition of the poly(1-hexene) product over time is also summarized in below Table 4 ($^a$Reaction composition was determined by using $^1$H NMR spectroscopy. $^b$Molecular weight and polydispersity index ($M_w/M_n$) were determined by GPC analysis with samples run in THF at 40° C. calibrated to polystyrene standards. Branching=149 B/1000 carbons). FIGS. 11 and 12 are $^1$H NMR (600 MHz, CDCl$_3$, 25° C.) and $^{13}$C NMR (600 MHz, CDCl$_3$, 25° C.) spectra, respectively, of the polyhexene product produced according to this Example.

of MA. To track the evolution of molecular weight over time, 400 µL aliquots were removed from the reaction vessel and quenched by 100 µL of triethylsilane. The volatiles was partially removed under reduced pressure and polymer crude was washed with acetone and dried under vacuum for GPC analysis.

Figure 13:
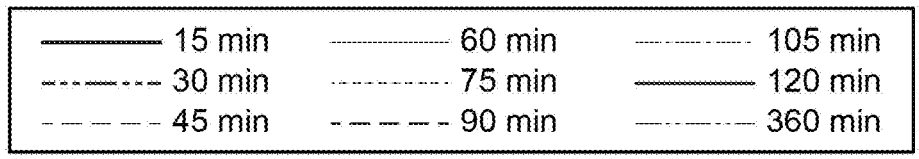
FIG. 13 is a graphical display of GPC traces showing the evolution of the molecular weight of the poly(1-hexene) product over time, using a comparative non-fluorinated polymerization catalyst according to various aspects of the disclosure, in Example 5.
Figure 13:
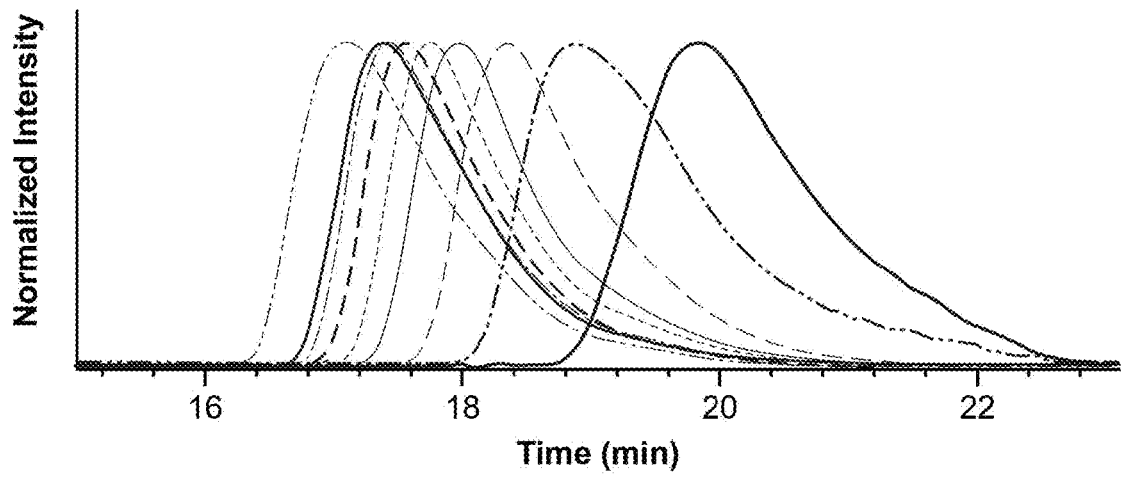
Figure 14:
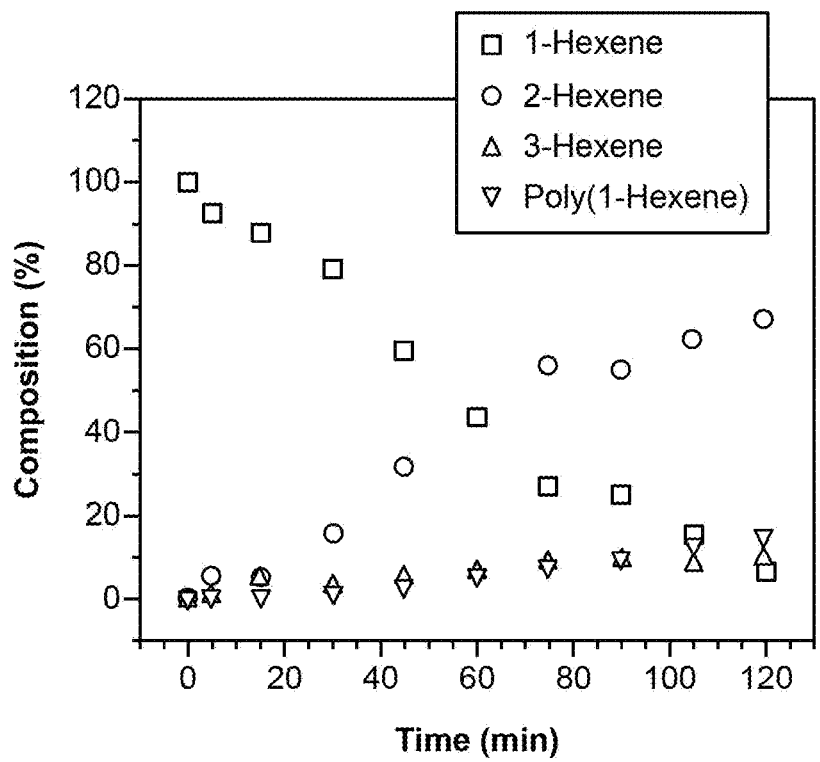
FIG. 14 is a graphical display of the composition of the poly(1-hexene) product over time, using a comparative non-fluorinated polymerization catalyst according to various aspects of the disclosure, in Example 5.

FIG. 13 is a graphical display of GPC traces showing the evolution of the molecular weight of the poly(1-hexene) product over time. FIG. 14 is a graphical display of the composition of the poly(1-hexene) product mixture over

TABLE 4

| Entry | Time (min) | 1-hexene (%)$^a$ | 2-hexene (%)$^a$ | 3-hexene (%)$^a$ | Polyhexene (%)$^a$ | $M_{n, GPC}^b$ (kg/mol) | $M_{w, GPC}^b$ (kg/mol) | $Đ^b$ ($M_w/M_n$) |
|---|---|---|---|---|---|---|---|---|
| 1 | 5 | 63 | 16 | 6 | 15 | 16.4 | 17.2 | 1.05 |
| 2 | 10 | 28 | 35 | 9 | 28 | 24.8 | 25.9 | 1.04 |
| 3 | 15 | 5 | 46 | 11 | 38 | 29.5 | 30.7 | 1.04 |
| 4 | 20 | 5 | 43 | 8 | 44 | 31.8 | 33.5 | 1.05 |
| 5 | 30 | 0 | 43 | 8 | 49 | 34.7 | 36.6 | 1.05 |
| 6 | 45 | 0 | 38 | 6 | 56 | 36.5 | 28.9 | 1.06 |
| 7 | 60 | 0 | 29 | 7 | 64 | 38.7 | 41.3 | 1.08 |
| 8 | 90 | 0 | 21 | 5 | 76 | 41.0 | 44.8 | 1.09 |
| 9 | 120 | 0 | 16 | 3 | 81 | 42.0 | 45.7 | 1.08 |
| 10 | 150 | 0 | 14 | 1 | 85 | 43.1 | 47.2 | 1.10 |

Example 5. 1-hexene Polymerization Using a Comparative Non-Fluorinated Polymerization Catalyst

Figure 15:
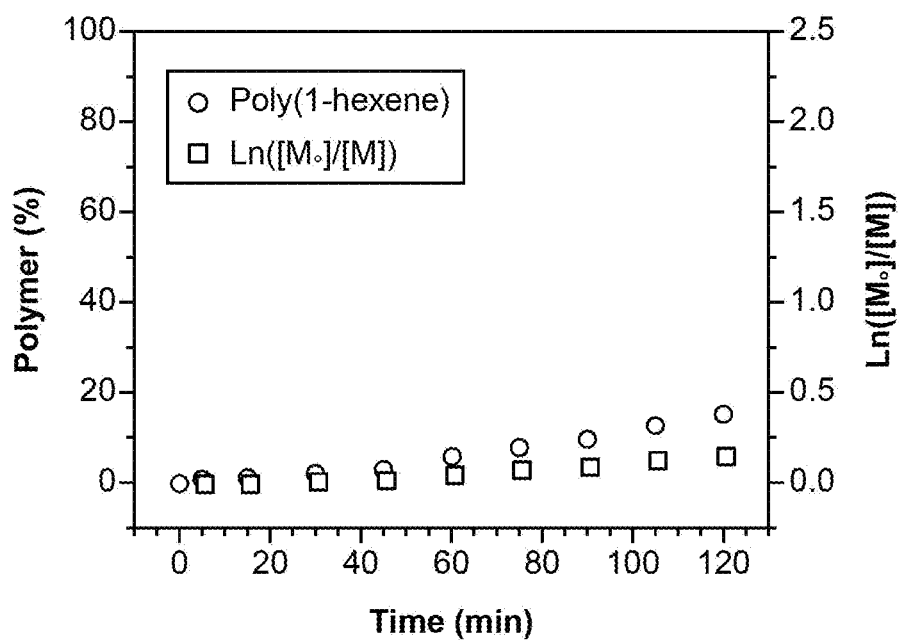
FIG. 15 is a graphical display showing the polymer percentage and $L_n([M_o]/[M])$ of the poly(1-hexene) product over time, using a comparative non-fluorinated polymerization catalyst according to various aspects of the disclosure, in Example 5.
Figure 16:
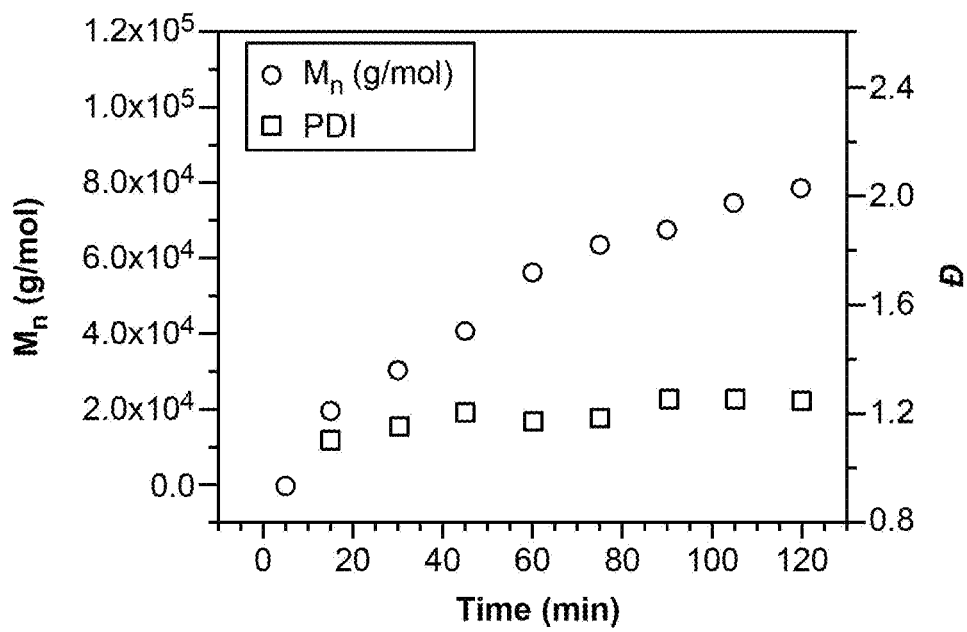
FIG. 16 is a graphical display showing the molecular weight ($M_n$; g/mol) and Đ ($M_w/M_n$) of the poly(1-hexene) product over time, using a comparative non-fluorinated polymerization catalyst according to various aspects of the disclosure, in Example 5.
Figure 17:
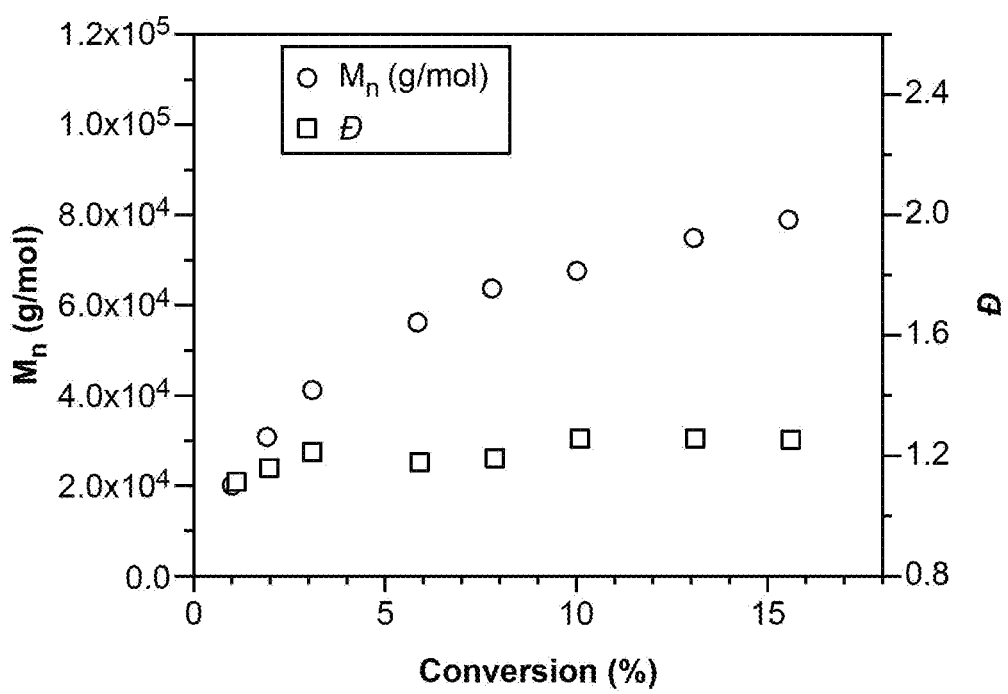
FIG. 17 is a graphical display showing the molecular weight ($M_n$; g/mol) and Đ ($M_w/M_n$) of the poly(1-hexene) product as a function of conversion percentage, using a comparative non-fluorinated polymerization catalyst according to various aspects of the disclosure, in Example 5.
Figure 18:
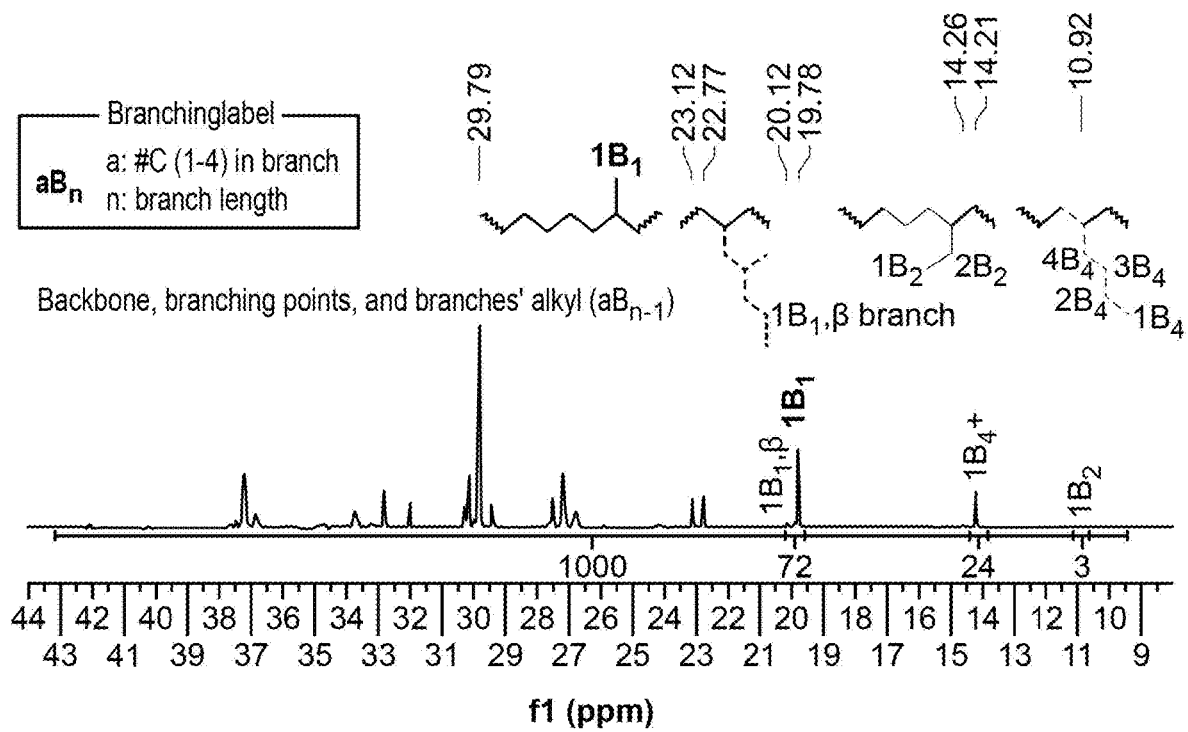
FIG. 18 is a $^{13}$C NMR (600 MHz, CDCl$_3$, 25° C.) spectrum of the polyhexene product produced, using a comparative non-fluorinated polymerization catalyst according to various aspects of the disclosure, in Example 5.

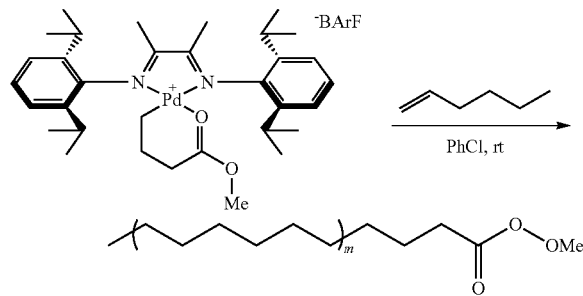

time. FIG. 15 is a graphical display showing the polymer percentage and $L_n$ ($[M_o]/[M]$) of the poly(1-hexene) product over time. FIG. 16 is a graphical display showing the molecular weight ($M_n$; g/mol) and Đ ($M_w/M_n$) of the poly (1-hexene) product over time. FIG. 17 is a graphical display showing the molecular weight ($M_n$; g/mol) and Đ ($M_w/M_n$) of the poly(1-hexene) product as a function of conversion percentage. The composition of the poly(1-hexene) product mixture over time is also summarized in below Table 5 ($^a$Reaction composition was determined by using $^1$H NMR spectroscopy. $^b$Molecular weight and polydispersity index ($M_w/M_n$) were determined by GPC analysis with samples run in THF at 40° C. calibrated to polystyrene standards. Branching=149 B/1000 carbons). FIG. 18 is a $^{13}$C NMR (600 MHz, CDCl$_3$, 25° C.) spectrum of the polyhexene product produced according to this Example.

TABLE 5

| Entry | Time (min) | 1-hexene (%)$^a$ | 2-hexene (%)$^a$ | 3-hexene (%)$^a$ | Polyhexene (%)$^a$ | $M_{n, GPC}^b$ (kg/mol) | $M_{w, GPC}^b$ (kg/mol) | $Đ^b$ ($M_w/M_n$) |
|---|---|---|---|---|---|---|---|---|
| 1 | 5 | 93 | 6 | 0 | 1 | 0.0 | 0.0 | 0 |
| 2 | 15 | 88 | 5 | 5 | 1 | 19.9 | 22.3 | 1.12 |
| 3 | 30 | 79 | 16 | 3 | 2 | 30.7 | 35.9 | 1.17 |
| 4 | 45 | 60 | 32 | 5 | 3 | 41.0 | 50.0 | 1.22 |
| 5 | 60 | 45 | 43 | 7 | 6 | 56.1 | 66.8 | 1.19 |
| 6 | 75 | 27 | 56 | 9 | 8 | 63.7 | 76.5 | 1.2 |
| 7 | 90 | 26 | 55 | 9 | 10 | 67.8 | 86.1 | 1.27 |
| 8 | 105 | 16 | 62 | 9 | 13 | 74.9 | 95.1 | 1.27 |
| 9 | 120 | 7 | 67 | 10 | 16 | 78.8 | 99.3 | 1.26 |
| 10 | 360 | 1 | 63 | 11 | 24 | 95.3 | 125.8 | 1.32 |

To a flame dried round bottom flask, equipped with a stir bar, catalyst 1 (39.8 mg, 2.70×10-5 mol) was added and dissolved by 12 mL of degassed chlorobenzene. 1-hexene (2 mL, 1.36 g, 1.61×10-2 mol) was then injected to the reaction to start the polymerization (monomer concentration=2.0 M). To monitor the monomer conversion, 100 µL aliquots were removed from the reaction periodically and added to 1-dram vials containing 500 µL deuterated chloroform and 3 drops Examples 4-5 discussion. Chelate opening with α-olefins is more challenging compared to ethylene because of steric hindrance. Therefore, α-olefin polymerization employing the comparative non-fluorinated catalyst of Example 5 was performed as previously reported at low temperature (0° C.). The TOF slow down the propagation process during initiation to eventually obtain better controlled polymerization during the duration of the polymerization With the insights gained from ethylene polymerization studies, we hypothesized that Catalyst 1 can polymerize 1-hexene (Example 4) at room temperature in a living fashion thanks to fast initiation. As the resonances of the PFPh group during chain growth are different in comparison to when bound to Pd, in-situ $^{19}$F was employed to address the initiation efficiency. In detail, an NMR tube containing a solution of Catalyst 1 in chloroform-d, 1-hexene monomer (100 eq.) was added and the reaction and immediately submitted to $^{19}$F NMR spectroscopy measurements. A complete initiation was confirmed by the up-field shift observed in the spectrum. Surprisingly, the resultant polyhexene by Catalyst 1 (PH-PFPh) exhibited a different microstructure from previously reported data. The degree of branching of PH-PFPh was calculated to have 149B per 1000 carbons, while polyhexene derived by the comparative non-fluorinated catalyst of Example 5 showed 95B/1000C. Quantitative 13C NMR analysis shows a good agreement with $^1$H NMR data (144B/1000C), with significant enchainment of longer branches ($C_2$-$C_4$ branches) compared to regular poly(1-hexene) (FIG. 12). To gain a deeper understanding of 1-hexene polymerization via this system, kinetic studies were performed assisted by NMR and GPC analyses. Tracking monomer conversion via $^1$H NMR revealed that polymerization and isomerization are occurring simultaneously. Isomerization of 1-hexene to 2- and 3-hexene proceeded rapidly and was completed after 30 minutes of the reaction. Then, the polymerization slowed down as the binding affinity and insertion rate of internal hexenes were less than for 1-hexene due to steric effects. This concurrent isomerization-polymerization resulted in two distinctive linear kinetic profiles (time vs. monomer conversion and conversion vs. molecular weight) of living polymerization, which were separated by the time point where quantitative isomerization was achieved. This phenomenon resulted in the formation of an olefin block copolymer with different branching structures. After 2.5 hours of the reaction with Catalyst 1, highly branched polyhexene was obtained with $M_n$=43100 (85% conversion), and narrow molecular weight distribution (Đ=1.1) (Table 4). As the livingness in traditional Pd-diimine catalyzed olefin polymerization is commonly only conceded with a linear increase in molecular weight versus time, this finding represents a different facet when addressing the livingness in the isomerization-polymerization system. On the contrary, the polymerization with the comparative non-fluorinated catalyst is drastically slower, affording only 24% conversion and 12% of catalyst activation after 4 hours forming polymer with higher dispersity (Đ=1.32) (Table 5).

Similarly, isomerization to mostly 2-hexene was observed, but continuously increased throughout the reaction, suggesting a modest insertion of internal hexenes occurred. Furthermore, the microstructure of polyhexene derived from the two catalysts are significantly different. Typical 1-hexene polymerization with a chain walking catalyst proceeds through a chain straightening mechanism, in which the terminal alkenes can insert into the Pd—C bond via 1,2- or 2,1-insertion followed by complete chain walking to primary Pd-alkyl bond before next insertion. This afforded polyhexene with linear methylene sequences and a majority of methyl branches on the polymer backbone. In contrast, insertions of internal hexenes cannot generate linear segments. Therefore, polyhexene produced with Catalyst 1 displayed thermal characteristics of highly amorphous materials with $T_g$=−70° C., significantly lower compared to regular poly(1-hexene) with $T_g$=−44° C. and $T_m$=0° C.

Example 6. Synthesis of polyethylene-b-polyoctadecene (PE-b-POD) Block Copolymer Using Inventive Catalyst 1

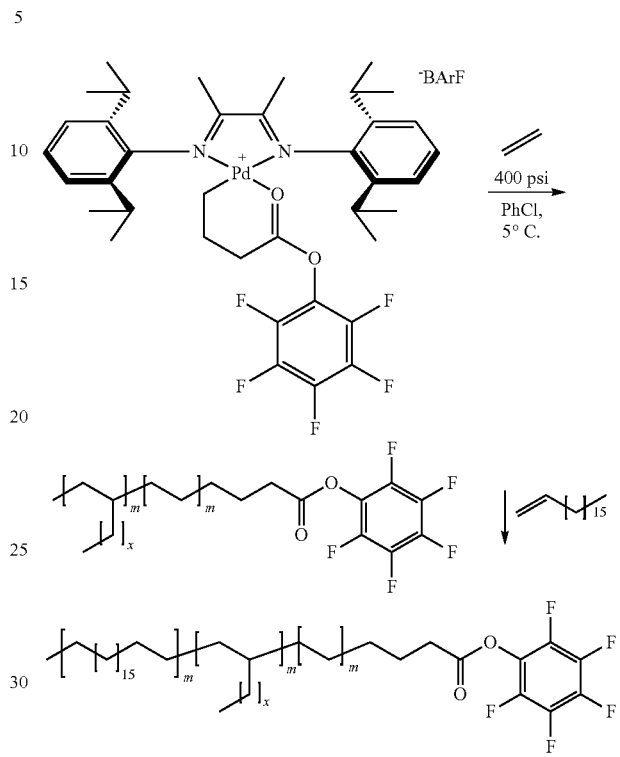

Figure 19:
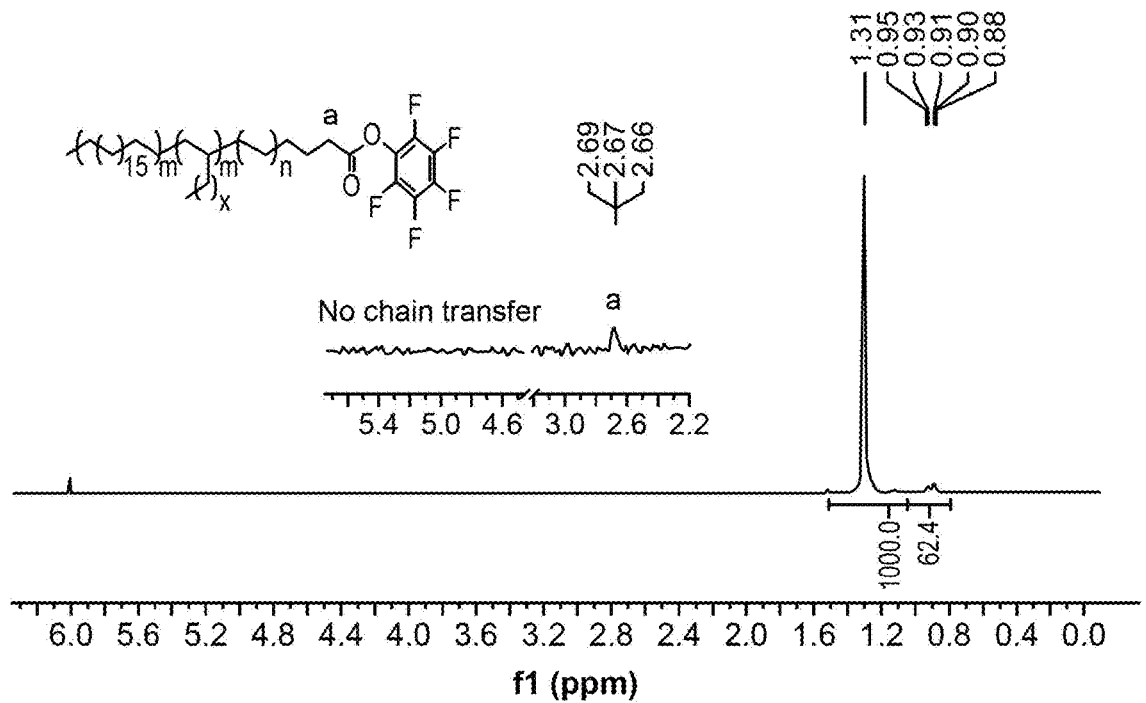
FIG. 19 is an $^1$H NMR spectrum of a polyethylene-polyoctadecene diblock copolymers (PE-b-POD) product produced, using a fluorinated polymerization catalyst according to various aspects of the disclosure, in Example 6.
Figure 20:
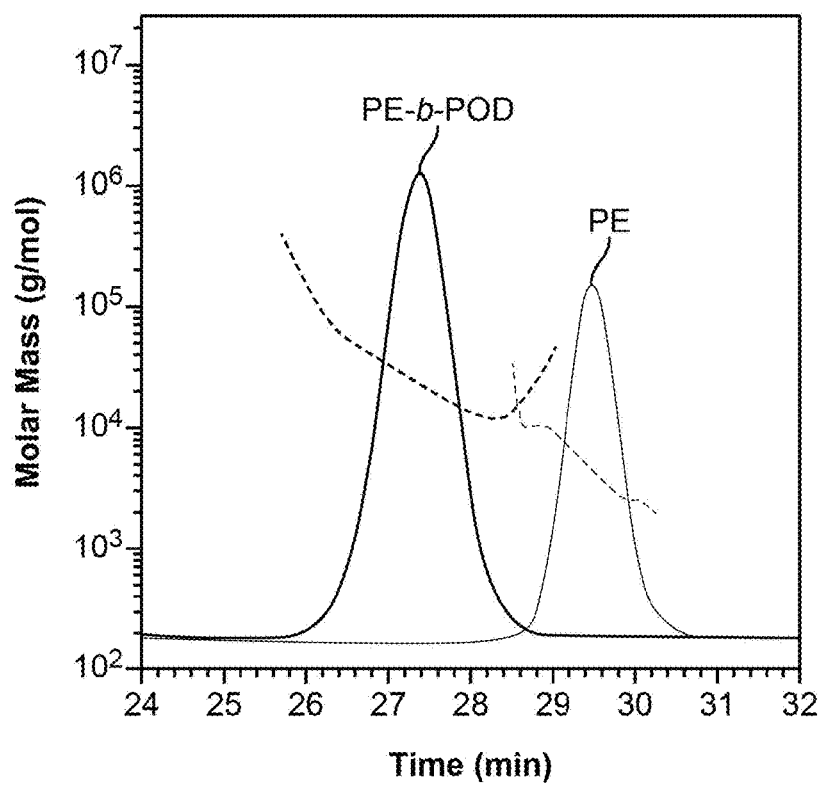
FIG. 20 is a graphical display of a HT-GPC trace of a polyethylene-polyoctadecene diblock copolymers (PE-b-POD) product produced, using a fluorinated polymerization catalyst according to various aspects of the disclosure, in Example 6.

A mechanically stirred 300 mL Parr® reactor, equipped with a heating mantle and a thermocouple was heated at 110° C. for at least 2 hours under vacuum. The reactor was vented with argon and then cooled to room temperature. The reactor was then pressurized to 100 psi ethylene and vented three times. A sampling port on the reactor was opened and chlorobenzene was added to it. After closing the sampling port, the reactor was pressurized with ethylene to 100 psi and vented twice. The ethylene pressure was then raised to 400 psi, and the chlorobenzene was stirred until the system equilibrated at 5° C. After venting the ethylene pressure, a solution of catalyst 1 in chlorobenzene was added to the reactor through the sampling port. The reactor was then recharged with ethylene to 400 psi to start the polymerization. After 10 minutes ethylene was vented. Three cycles of applying a high vacuum to the reactor, followed by purging with argon through the polymerization reactor for 5 minutes. A solution of 1-octadecene (3 ml) in chlorobenzene (3 mL) was then added to the reactor via syringe to restart the polymerization. After 30 minutes, 500 µL of triethylsilane was added to the reaction to quench the catalyst. The reaction was transferred to a round bottom flask from which the solvent was removed under reduced pressure. The residue was dissolved in hexanes, filtered through a plug of aluminum oxide (neutral), concentrated then precipitated in acetone. The isolated polymer was dried and analyzed by $^1$H NMR (FIG. 19) and HT-GPC (FIG. 20).

Polymerization via sequential addition of ethylene and 1-octadecene using Catalyst 1 afforded polyethylene-polyoctadecene diblock copolymers (PE-b-POD) with semicrystalline properties (42B/1000C, $T_m$=76.5° C., 87.9° C.). $^1$H NMR analysis indicated that the PFPh end-group remained, and no chain transfer side reactions occurred (FIG. 19). The livingness of the block polymerization was also evident by a clean shift to a higher molecular weight region (FIG. 20).

Examples 7-9. In these examples, one-step end-group transformations were performed to attain corresponding macroinitiators capable of undergoing controlled polymerization techniques including ROP and reversible-deactivation radical polymerization such as NMP or RAFT. In order to highlight the versatility of this method, we utilized commercially available exchange agents in aminolysis/transesterification with PO-PFPh that can be performed under mild reaction conditions owning to the high lability of the PFPh terminal group. 2-Aminoethyl alcohol (ethanolamine) and 2-amino-1,3-propanediol (serinol) were picked to introduce hydroxy end-groups to polyolefin precursors. 4-Amino-2,2,6,6-tetramethylpiperidine-1-oxyl (4-Amino-TEMPO) stable radical was selected to produce a macroradical that can serve as a mediating agent in NMP but also for the potential of undergoing radical coupling reaction for block copolymer synthesis. Finally, as coordination-insertion/RAFT combined examples remain scarce, transesterification with 4-cyano-4-[(dodecylsulfanylthiocarbonyl)sulfanyl]pentanol (CDP), a trithiocarbonate (TTC) chain transfer agent, was also performed to obtain a PE-based macroRAFT agent. Additionally, polymerization of a broad range of monomers including cyclic esters, styrene, dienes, acrylamides, and acrylates were explored.

Example 7. Synthesis of Hydroxy-Functionalized Polyolefins (PO—OH/PO—OH$_2$)

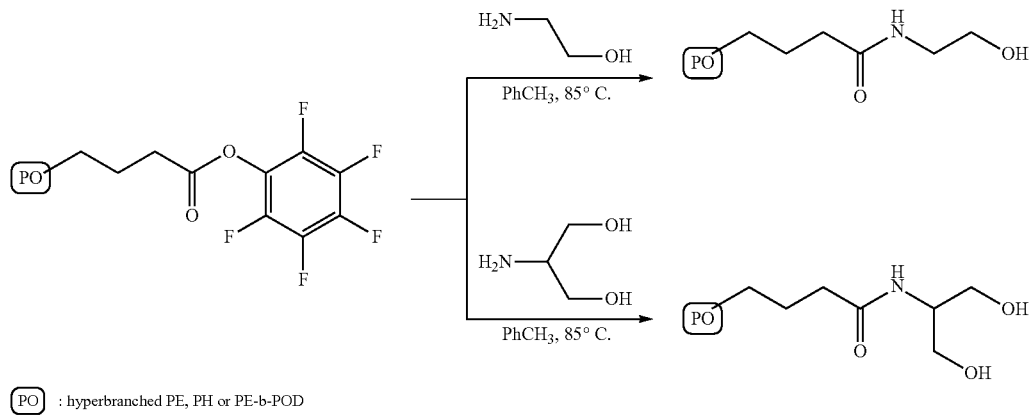

PO : hyperbranched PE, PH or PE-b-POD

Figure 21:
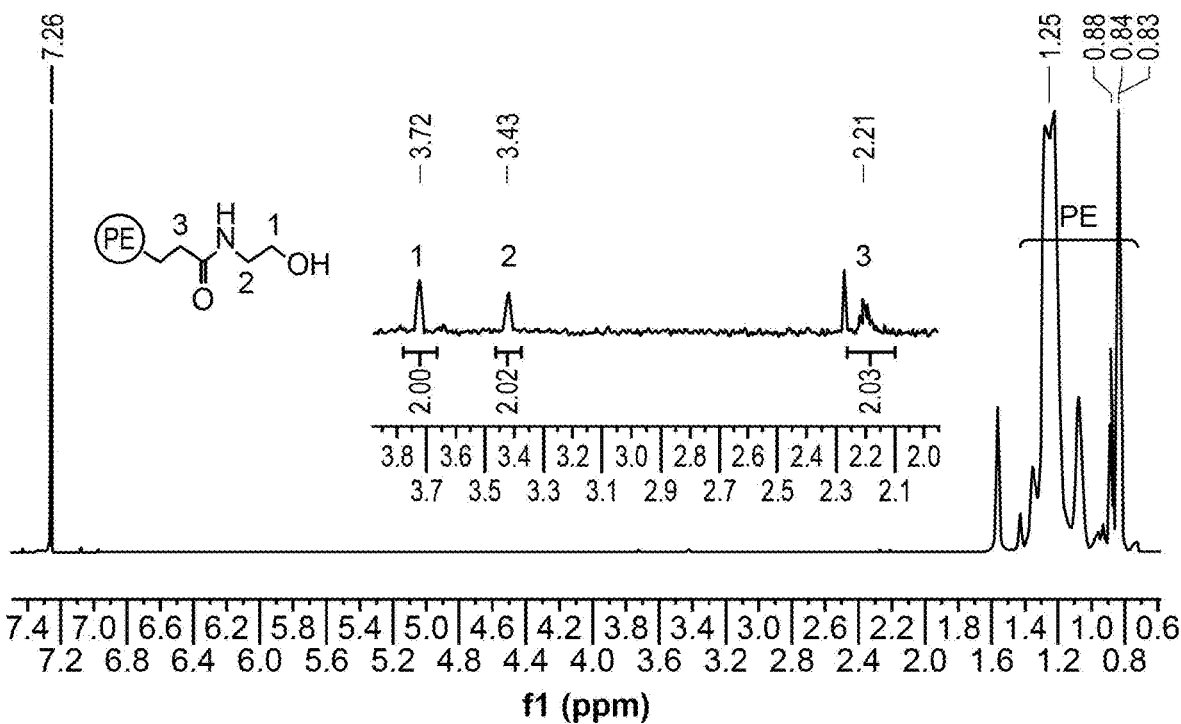
FIG. 21 is an $^1$H NMR (600 MHz, CDCl$_3$, 25° C.) spectrum of a hydroxyl-functionalized polyethylene produced in Example 7.
Figure 22:
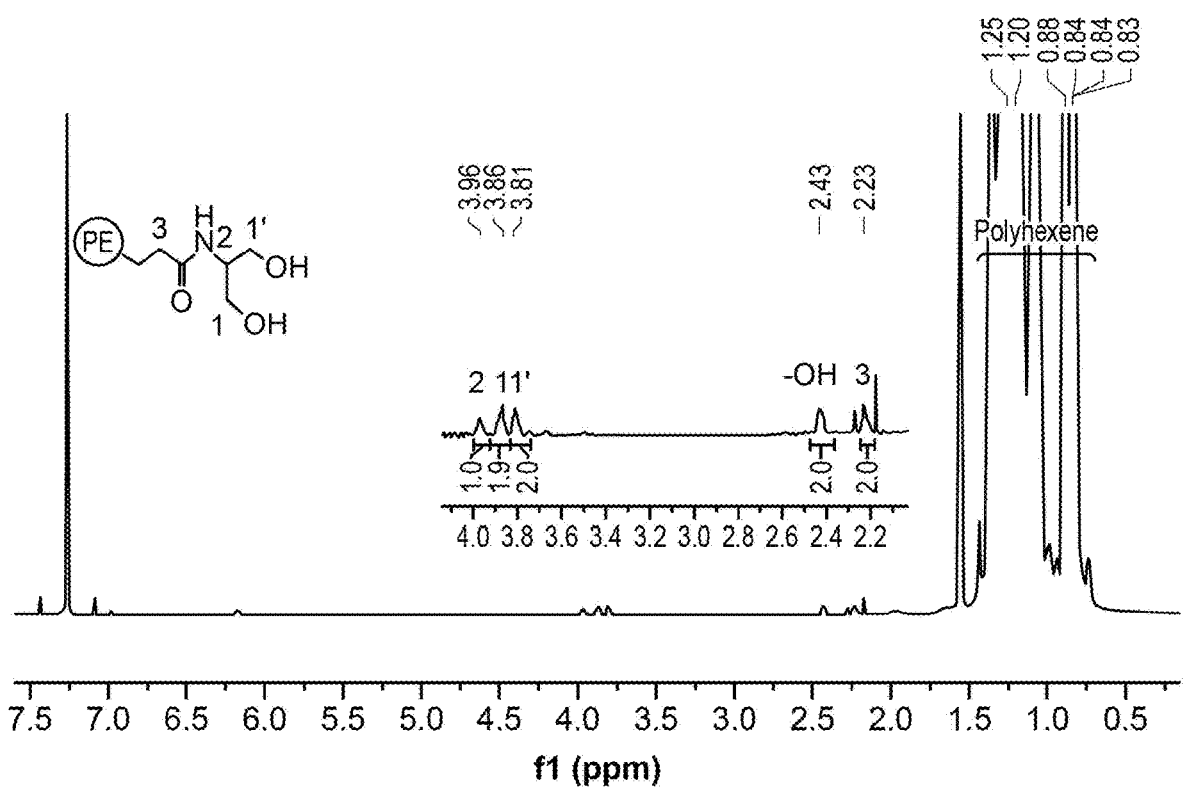
FIG. 22 is an $^1$H NMR (600 MHz, CDCl$_3$, 25° C.) spectrum of another hydroxyl-functionalized polyethylene produced in Example 7.

General procedure for aminolysis of pentafluorophenyl ester functionalized polyolefins (PO-PFPh). All PO-PFPh precursors are kept dry in a vacuum oven (t=40° C.) before use. PO-PFPh precursors' molecular weight was determined through $^1$H NMR end-group analysis and used for mole calculations. In an oven-dried round bottom flask equipped with a magnetic stir bar, PO-PFPh (1 eq) was charged and dissolved in toluene. In cases of PO-PFPh with semi-crystalline segment, the dispersion was heated up to 50° C. to assist solubility. Ethanolamine/Serinol (3 eq) was pre-mixed in toluene then added to the polymer solution. The reaction was then purged with N$_2$, sealed with a septum, and allowed to stir at 85° C. for 4 hours. The reaction vessel was let to be cooled down to room temperature, pentafluoro phenol that was generated as long needle crystals are removed through decanting. Afterward, the polymer solution was concentrated under reduced pressure, followed by precipitated in methanol and washed with acetone to remove residual small molecules. The obtained polymer was dried under a high vacuum at 40° C. overnight. FIGS. 21 and 22 are $^1$H NMR (600 MHz, CDCl$_3$, 25° C.) spectra of hydroxyl-functionalized polyethylenes PE-OH and PE-OH$_2$, respectively, produced according to this Example.

The aminolysis of PE-PFPh carried out with ethanolamine yielded a hydroxy-terminated polyethylene (PE-OH, $M_n$=5900, Đ=1.02). $^1$H NMR analysis of the resultant polymer showed the disappearance of the 2.65 ppm signal that belongs to the CH$_2$ proton at the α-position to the pentafluoro ester group (~2.65 ppm), which shifted to 2.21 ppm when attached to the amide moiety. Additionally, the integration matched the —CH$_2$—CH$_2$— protons found in the attached ethanolamine, which indicates quantitative transformation to PE-OH (FIG. 21).

Example 8. Synthesis of TEMPO-Functionalized Polyolefins

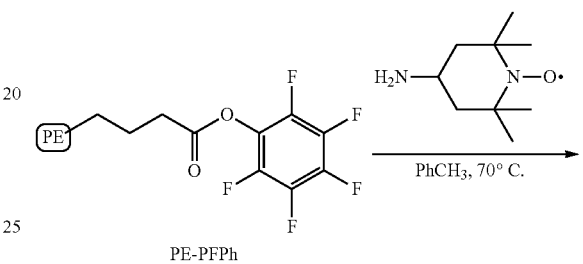

PE-PFPh

-continued

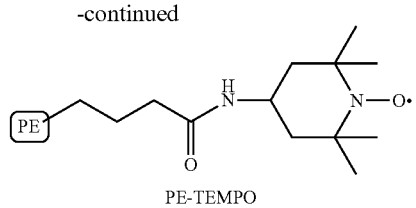

PE-TEMPO

Figure 23:
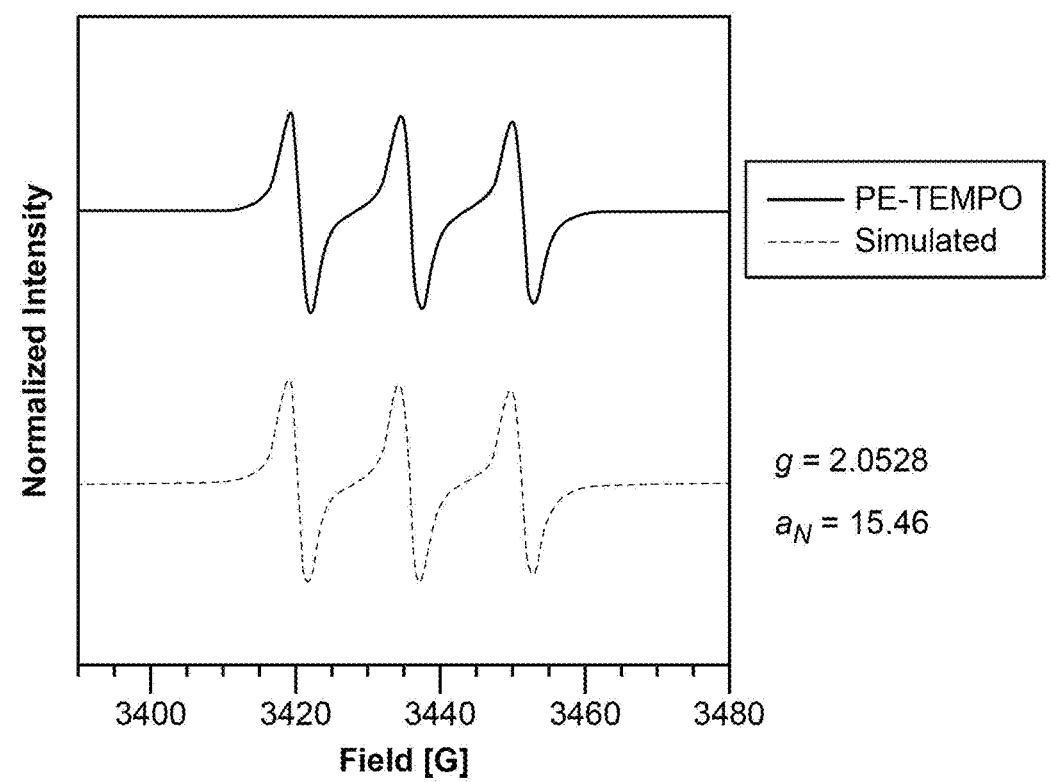
FIG. 23 is a graphical display showing CW X-band (9.5 MHz, rt) EPR spectra of PE-TEMPO radical products in Example 8 and a simulation of a TEMPO radical.
Figure 24:
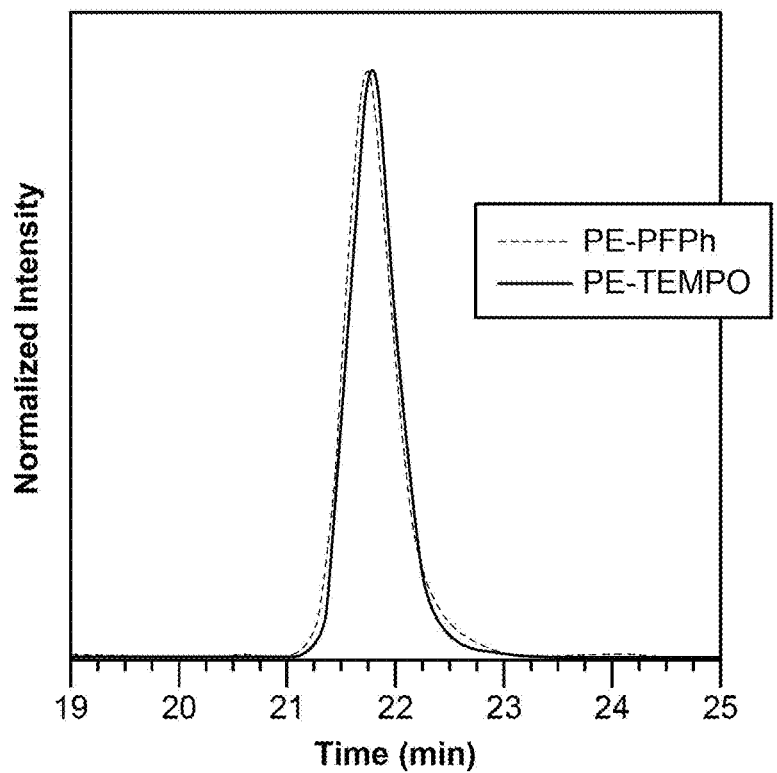
FIG. 24 is a graphical display showing GPC traces of PE-PFPh before and after functional group exchange with TEMPO in Example 8.

In an oven-dried round bottom flask equipped with a magnetic stir bar, PE-PFPh (1.0 g, mmol, 1.0 eq) was dissolved in toluene (50 mL). 4-amino-TEMPO (mmol, mg, 3.0 eq) was dissolved in toluene (5 mL), and the obtained solution was then introduced to the reaction. The mixture was allowed to be stirred for 4 hours at 70° C. After the reaction was complete, volatiles were removed under reduced pressure. The polymer was then washed with acetone until the washing solution is no longer colored. It is noted that a sonicator can be used to facilitate efficient washing. The obtained PE-TEMPO product was dried under a high vacuum overnight and stored in the fridge (2-8° C.). $^1$H NMR spectra confirmed formation of the PE-TEMPO product. FIG. 23 is a graphical display showing CW X-band (9.5 MHz, rt) EPR spectra of PE-TEMPO radical products in this example and a simulation of a TEMPO radical. FIG. 24 is a graphical display showing GPC traces of PE-PFPh before and after functional group exchange with TEMPO.

Example 9. Synthesis of Trithiocarbonate-Functionalized Polyolefins (PE-TTC)

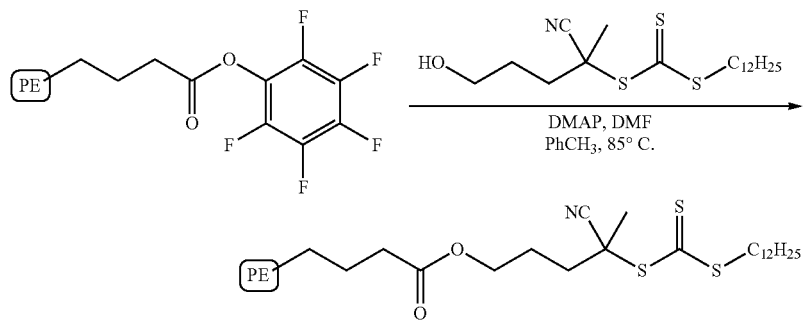

Figure 25:
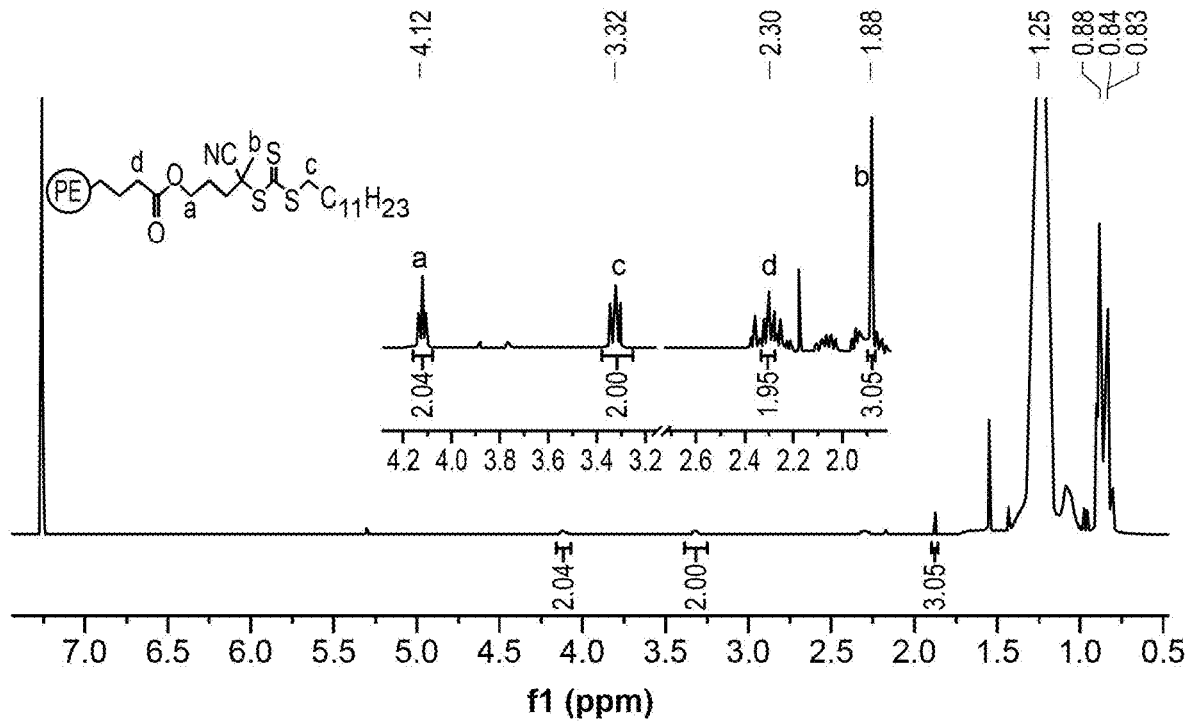
FIG. 25 is an $^1$H NMR spectrum confirmed PE-TTC formed in Example 9.
Figure 26:
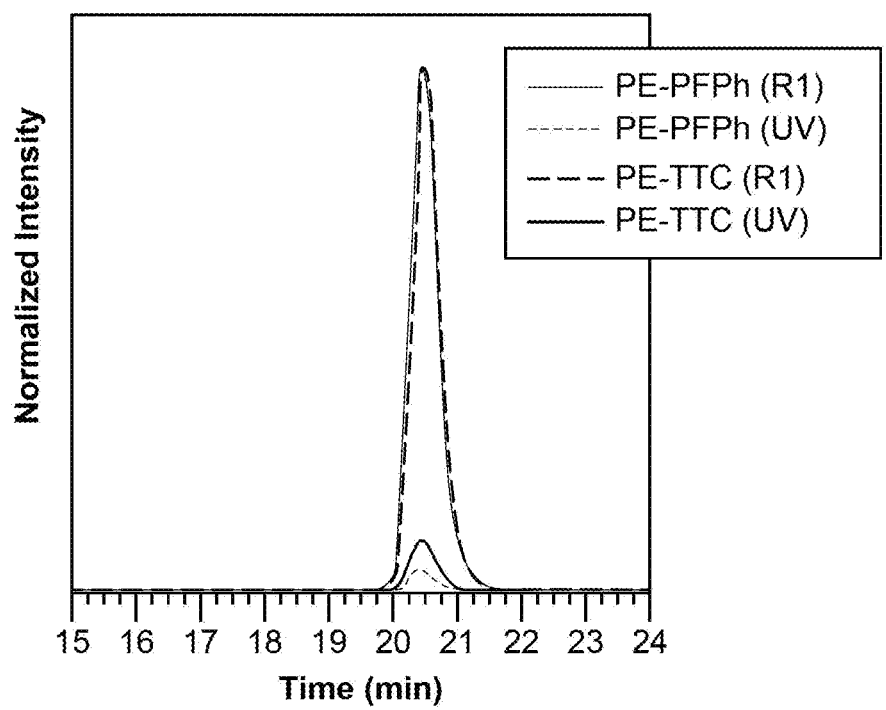
FIG. 26 is a graphical display showing RI- and UV-GPC traces of PE-PFPh before and after functional group exchange with CDP to form PE-TTC in Example 9.
Figure 27:
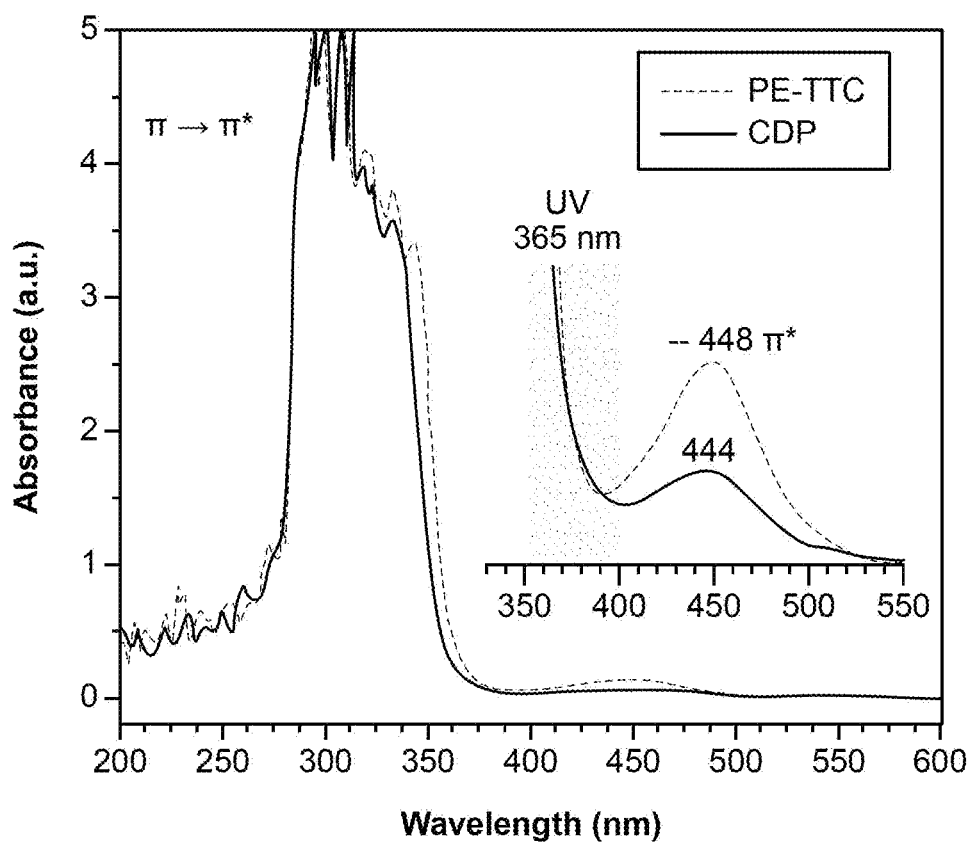
FIG. 27 is a graphical display showing an overlay of UV-Vis spectra of PE-TTC and the CDP precursor reagent.

In an oven-dried round bottom flask equipped with a magnetic stir bar, PE-PFPh (0.5 g, 1.0 eq) was dissolved in toluene (25 mL). DMAP (2 eq) was dissolved in DMF (25 mL) and added to the polymer solution. 4-Cyano-4-[(dodecylsulfanylthiocarbonyl)sulfanyl]pentanol (CDP, 3.0 eq) was dissolved in toluene (5 mL), and the obtained solution was then introduced to the reaction. The mixture was allowed to be stirred for 48 hours at 80° C. (the conversion was identified to reach about 70% after 13 hours by $^1$H-NMR). After the reaction is complete, volatiles were removed under reduced pressure. The polymer was then washed with acetone and methanol until the washing solution is no longer colored. Afterward, the polymer was briefly dried, redissolved in hexanes, and passed through a silica gel/neutral aluminum oxide layered plug to completely remove DMAP residue. Hexanes were removed under reduced pressure and polymer was dried under a high vacuum, yielding a faint yellow polymeric material. $^1$H NMR spectra confirmed formation of the PE-TTC product (FIG. 25). FIG. 26 is a graphical display showing RI- and UV-GPC traces of PE-PFPh before and after functional group exchange with CDP. FIG. 27 is a graphical display showing an overlay of UV-Vis spectra of PE-TTC and CDP.

Example 10. Synthesis of Polyolefin-Polyester Di- and Triblock Copolymers; Ring-Opening Polymerization Reactions from PE-OH and PE-b-POD-OH (Example 7)

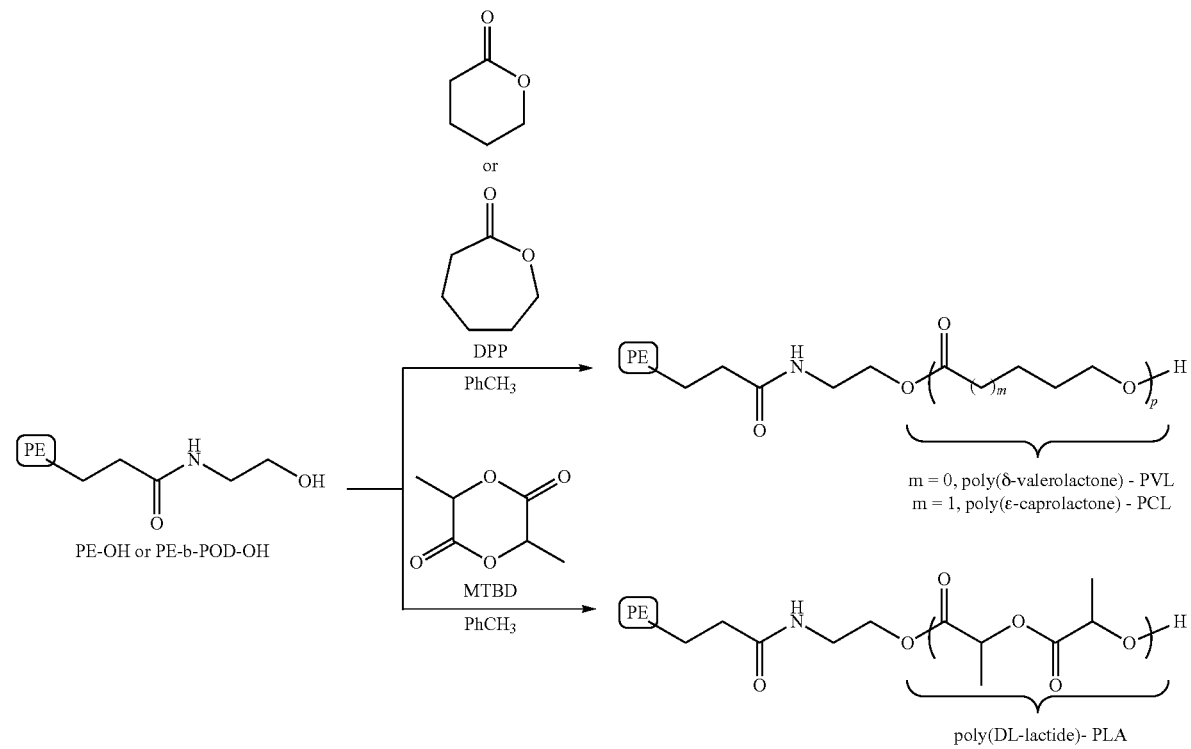

In a typical reaction, the PO—OH macroinitiator (1 eq, 100 mg) was weighed out into a 5 ml oven-dried microwave vial equipped with a PTFE stir bar. Toluene (1.5 mL) was introduced to the reaction and the vial was sealed. The reaction was allowed to be stirred until the macroinitiator fully dissolved. In the case of PE-b-POD, the vial was immersed into an oil bath at 50° C.

For chain extension with δ-valerolactone ε-caprolactone, DPP (1 eq) was weighed out into a separate 1-dram vial, dissolved in 0.5 ml toluene, and injected into the reaction vial. δ-Valerolactone or ε-caprolactone (100 eq) were added to the vial using a microsyringe to start the polymerization.

For chain extension with DL-lactide, MTBD (0.25 eq) was weighed out into a separate 1-dram vial, dissolved in 0.5 ml toluene, and injected into the reaction vial. DL-lactide monomers were added to the under $N_2$ and the vial was re-sealed to start the polymerization.

The polymerization reaction was allowed to react for 16 hours and an excess amount of triethylamine (for DPP) or acetic acid (for MTBD) was added to quench the polymerization, followed by partial removal of volatiles under reduced pressure. The obtained polymer was precipitated in methanol and dried in a vacuum oven before characterization by NMR and GPC.

Figure 28:
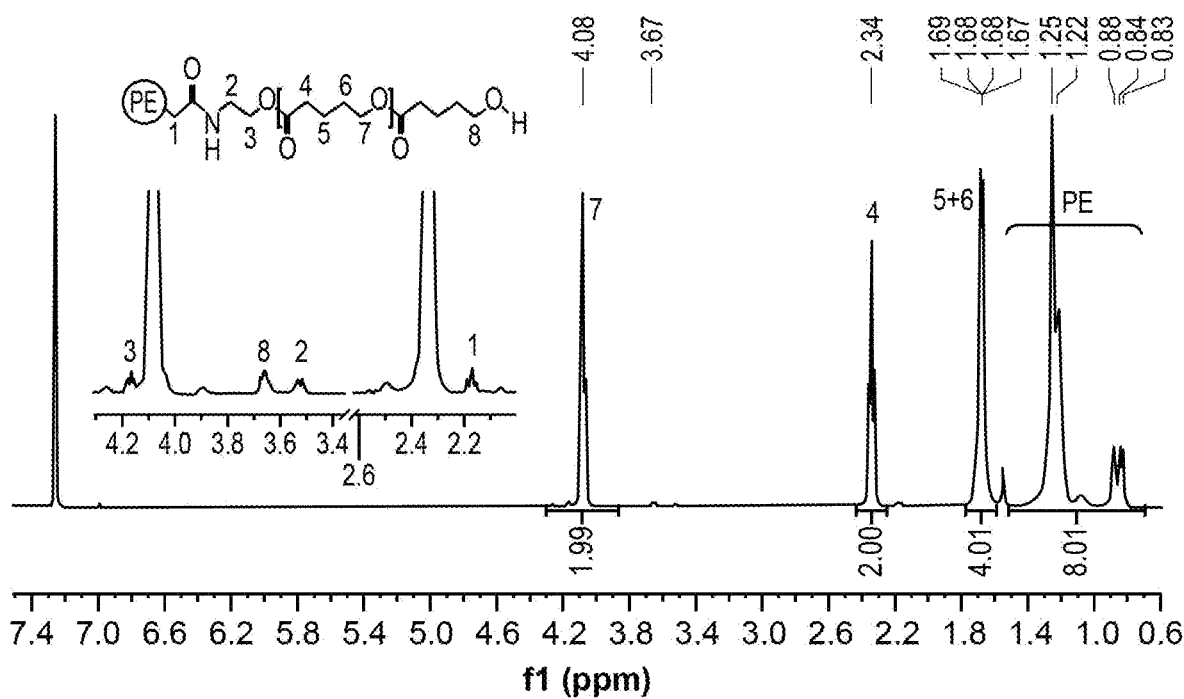
FIG. 28 is a $^1$H NMR spectrum (400 MHz, CDCl$_3$, 25° C.) of a PE-b-PVL diblock copolymer formed in Example 10.
Figure 29:
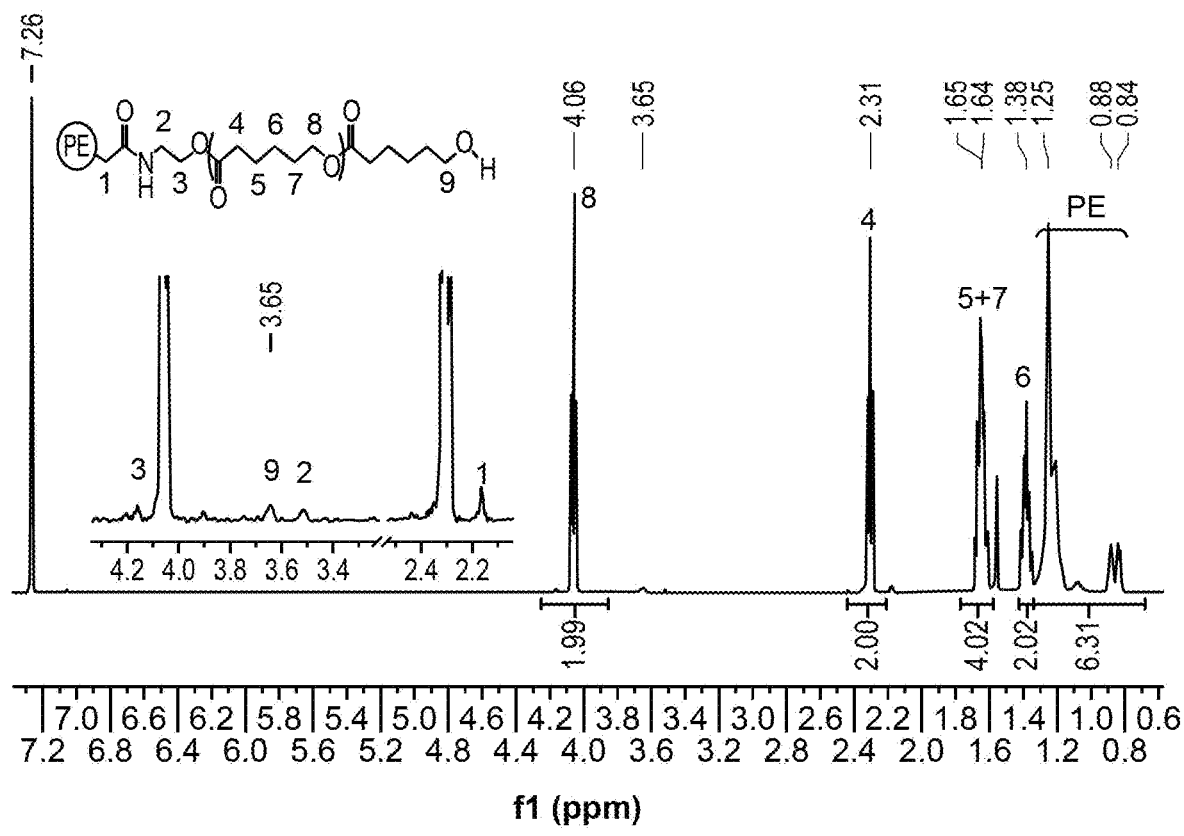
FIG. 29 is a $^1$H NMR spectrum (400 MHz, CDCl$_3$, 25° C.) of a PE-b-PCL diblock copolymer formed in Example 10.
Figure 30:
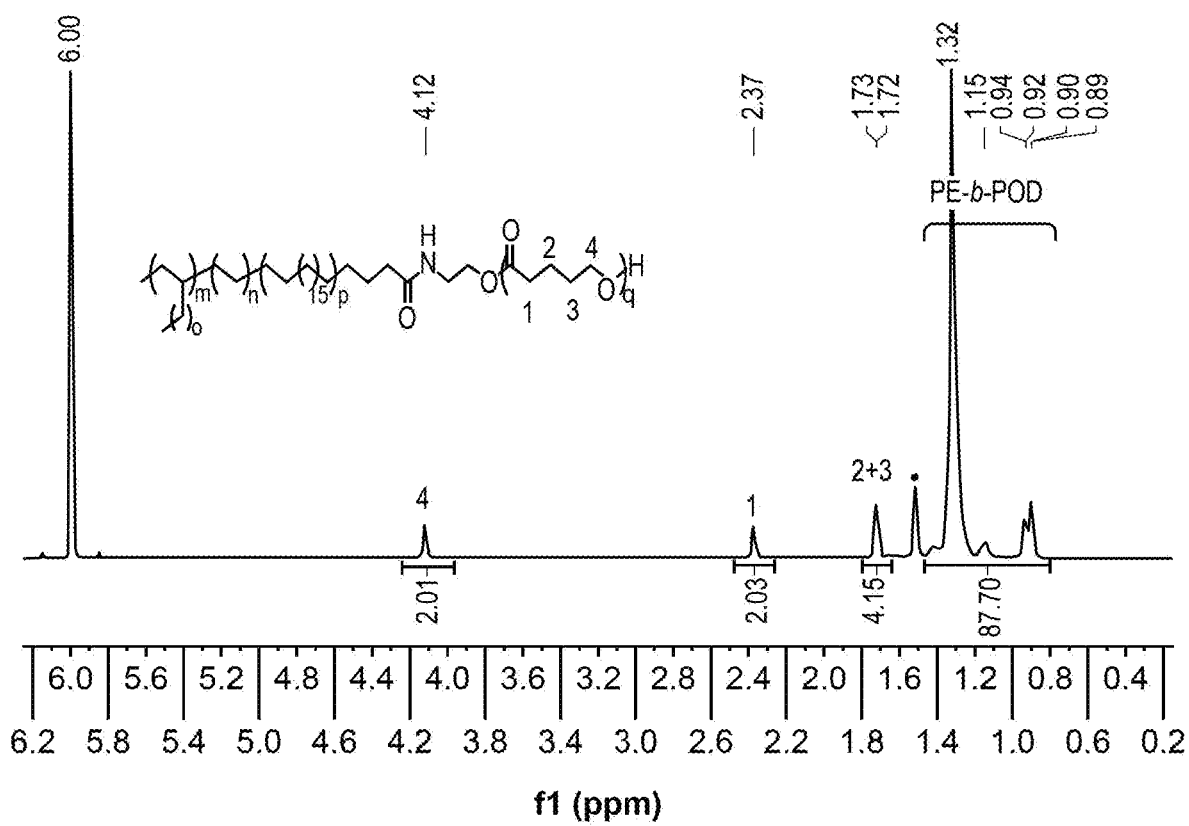
FIG. 30 is a $^1$H NMR spectrum (400 MHz, CDCl$_3$, 80° C.) of a PE-b-POD-b-PVL triblock copolymer formed in Example 10.
Figure 31:
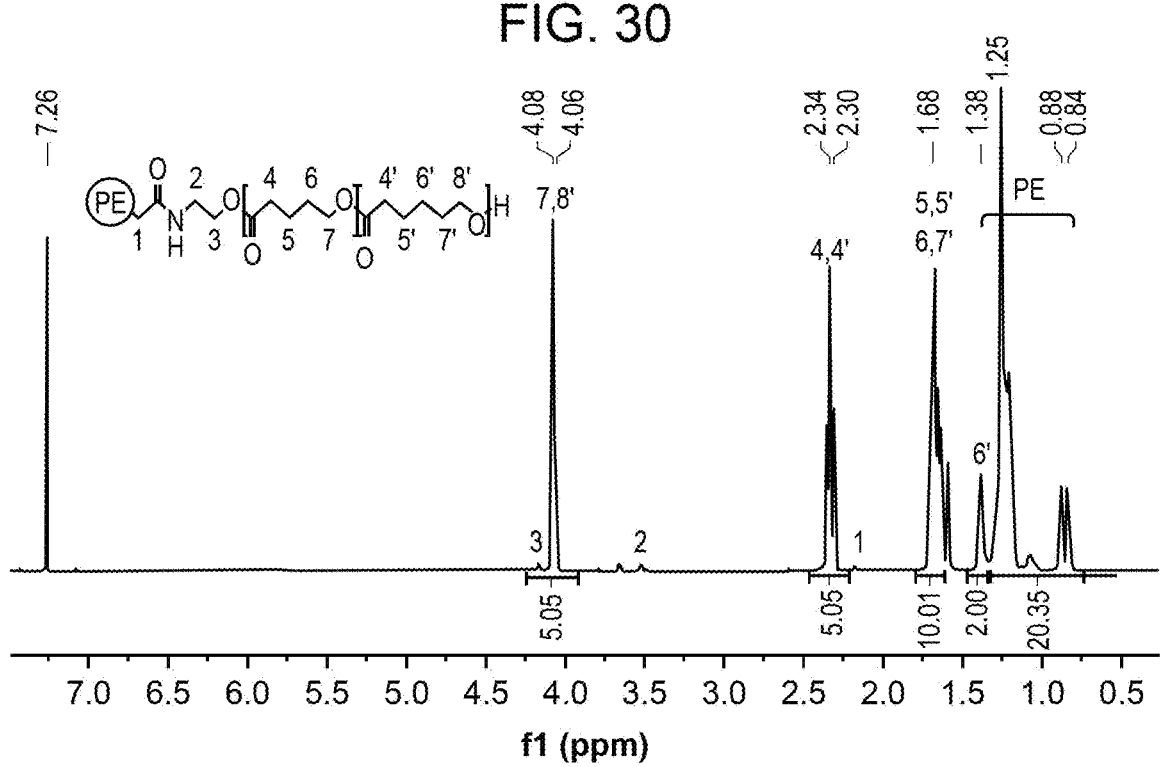
FIG. 31 is a $^1$H NMR spectrum (400 MHz, CDCl$_3$, 25° C.) of a PE-b-POD-b-PCL triblock copolymer formed in Example 10.
Figure 32:
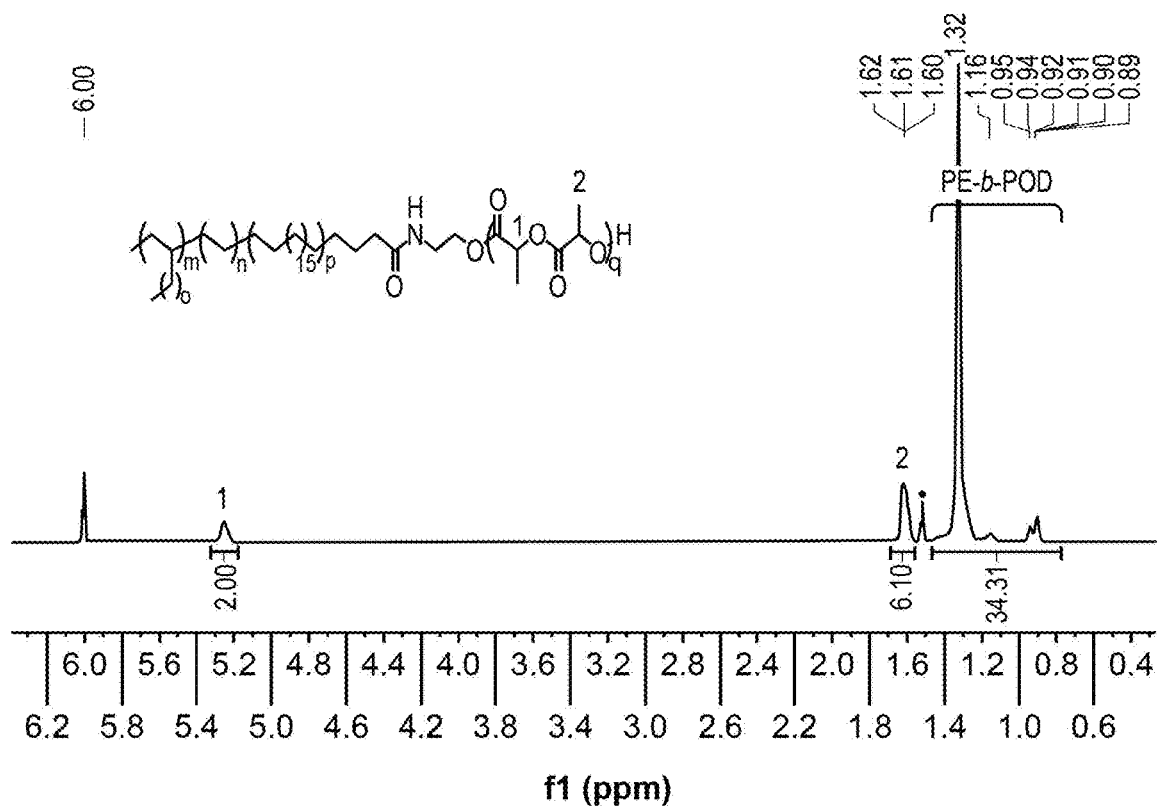
FIG. 32 is a $^1$H NMR spectrum (400 MHz, CDCl$_3$, 80° C.) of a PE-b-POD-b-PLA triblock copolymer formed in Example 10.

FIG. 28 is a $^1$H NMR spectrum (400 MHz, CDCl$_3$, 25° C.) of a PE-b-PVL diblock copolymer formed in this example. FIG. 29 is a $^1$H NMR spectrum (400 MHz, CDCl$_3$, 25° C.) of a PE-b-PCL diblock copolymer formed in this example. FIG. 30 is a $^1$H NMR spectrum (400 MHz, CDCl$_3$, 80° C.) of a PE-b-POD-b-PVL triblock copolymer formed in this example. FIG. 31 is a $^1$H NMR spectrum (400 MHz, CDCl$_3$, 25° C.) of a PE-b-POD-b-PCL triblock copolymer formed in this example. FIG. 32 is a $^1$H NMR spectrum (400 MHz, CDCl$_3$, 80° C.) of a PE-b-POD-b-PLA triblock copolymer formed in this example.

Figure 33:
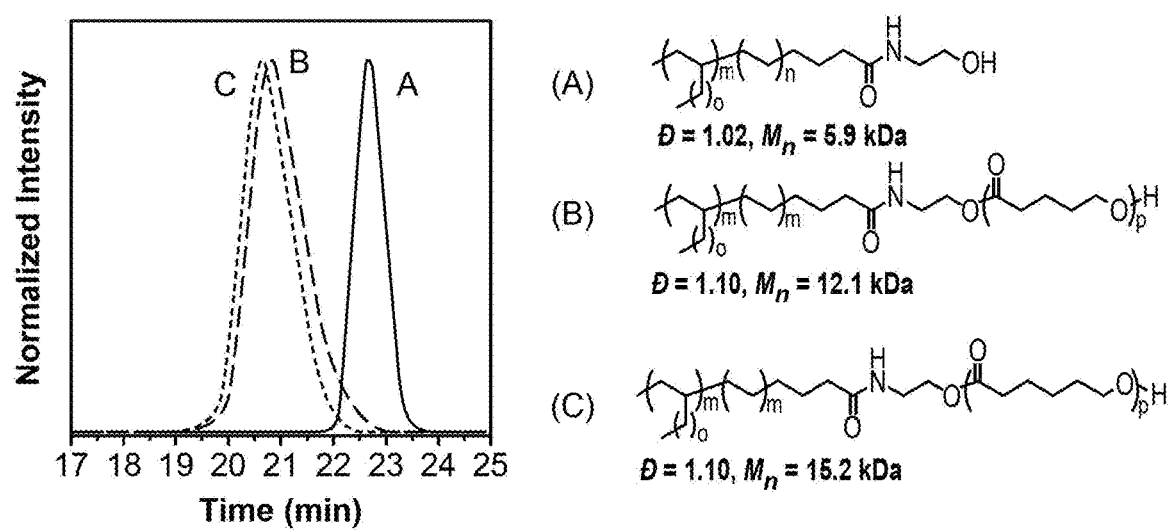
FIG. 33 is a graphical display showing GPC traces of (A) PE-OH and (B) a PE-b-PVL diblock copolymer and (C) a PE-b-PVL diblock copolymer formed in Example 10.
Figure 34:
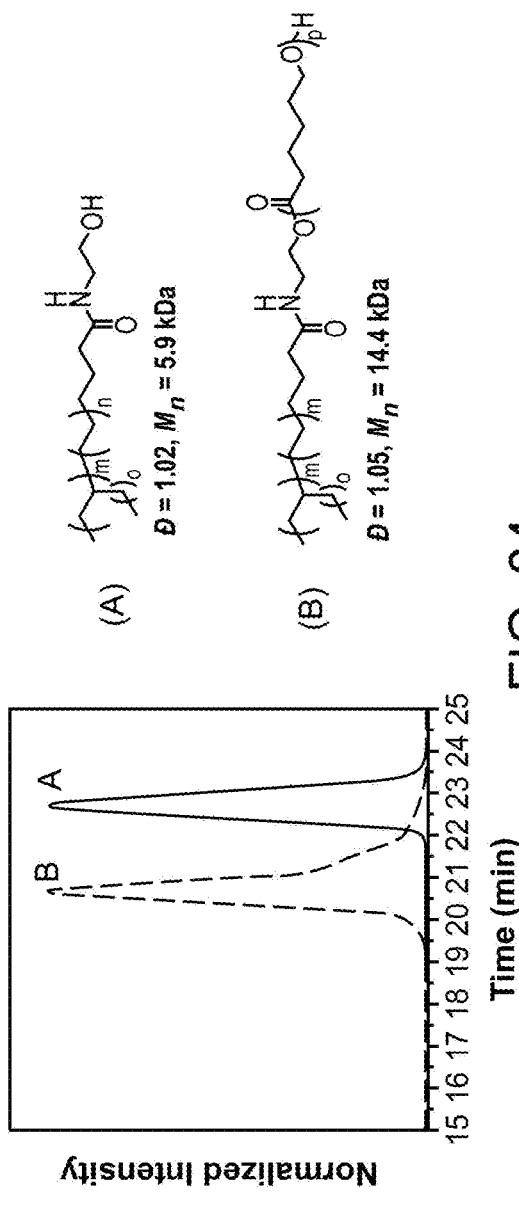
FIG. 34 is a graphical display showing GPC traces of (A) PE-OH and (B) a PE-b-PCL diblock copolymer formed in Example 10.
Figure 35:
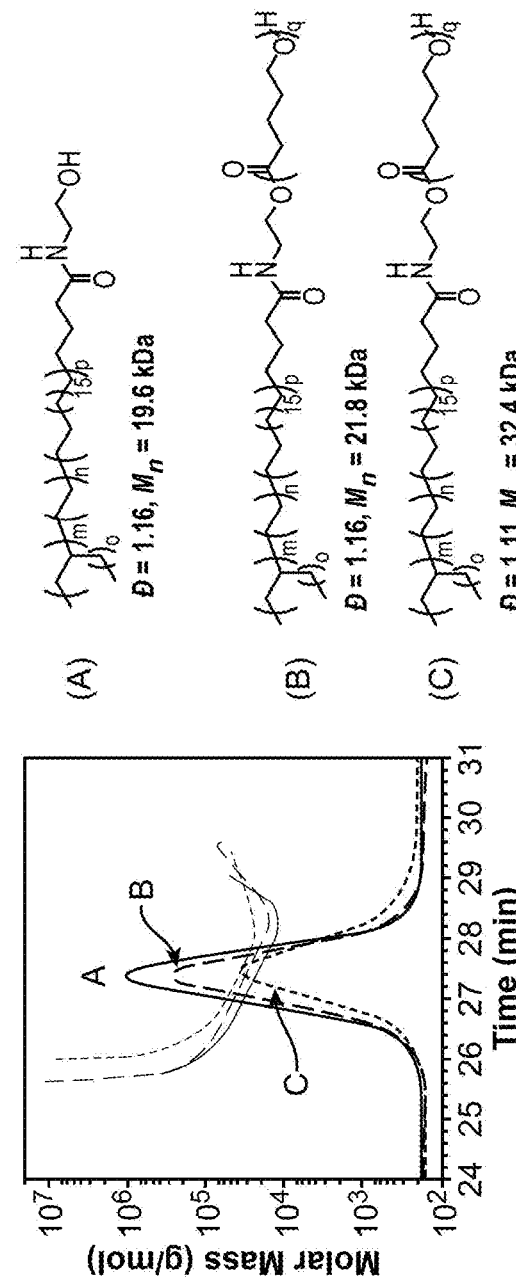
FIG. 35 is a graphical display showing GPC traces of (A) PE-b-POD and (B) a first PE-b-POD-b-PVL triblock copolymer and (C) a second PE-b-POD-b-PVL triblock copolymer formed in Example 10.
Figure 36:
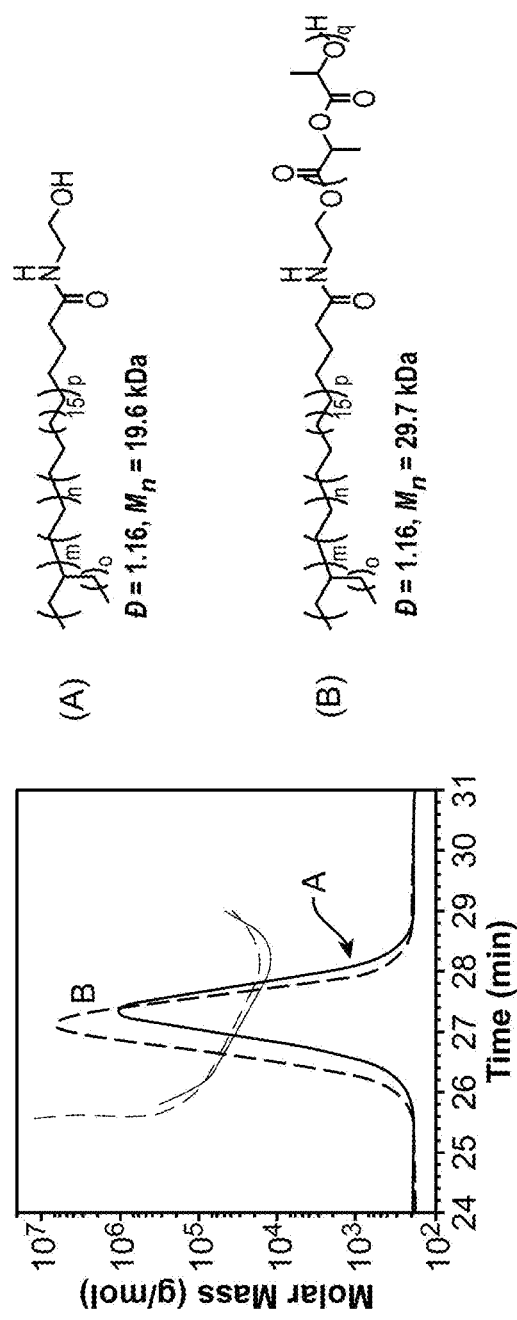
FIG. 36 is a graphical display showing GPC traces of (A) PE-b-POD and (B) a PE-b-POD-b-PLA triblock copolymer formed in this example.

FIG. 33 is a graphical display showing GPC traces of (A) PE-OH and (B) a PE-b-PVL diblock copolymer and (C) a PE-b-PVL diblock copolymer formed in this example. FIG. 34 is a graphical display showing GPC traces of (A) PE-OH and (B) a PE-b-PCL diblock copolymer formed in this example. FIG. 35 is a graphical display showing GPC traces of (A) PE-b-POD and (B) a first PE-b-POD-b-PVL triblock copolymer and (C) a second PE-b-POD-b-PVL triblock copolymer formed in this example. FIG. 36 is a graphical display showing GPC traces of (A) PE-b-POD and (B) a PE-b-POD-b-PLA triblock copolymer formed in this example.

Example 11. DL-Lactide Ring-Opening Polymerization Reaction from PH—OH$_2$ (Example 7)

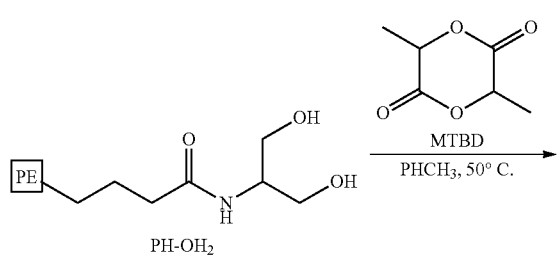

PH-OH$_2$

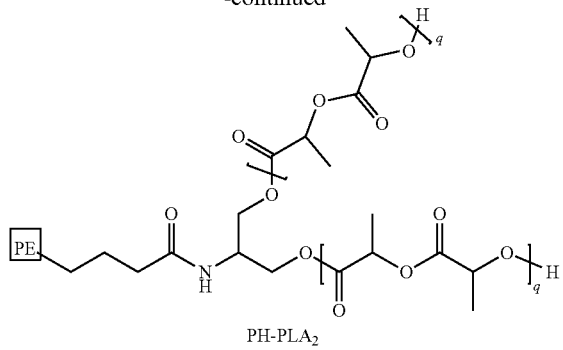

PH-PLA$_2$

Figure 37:
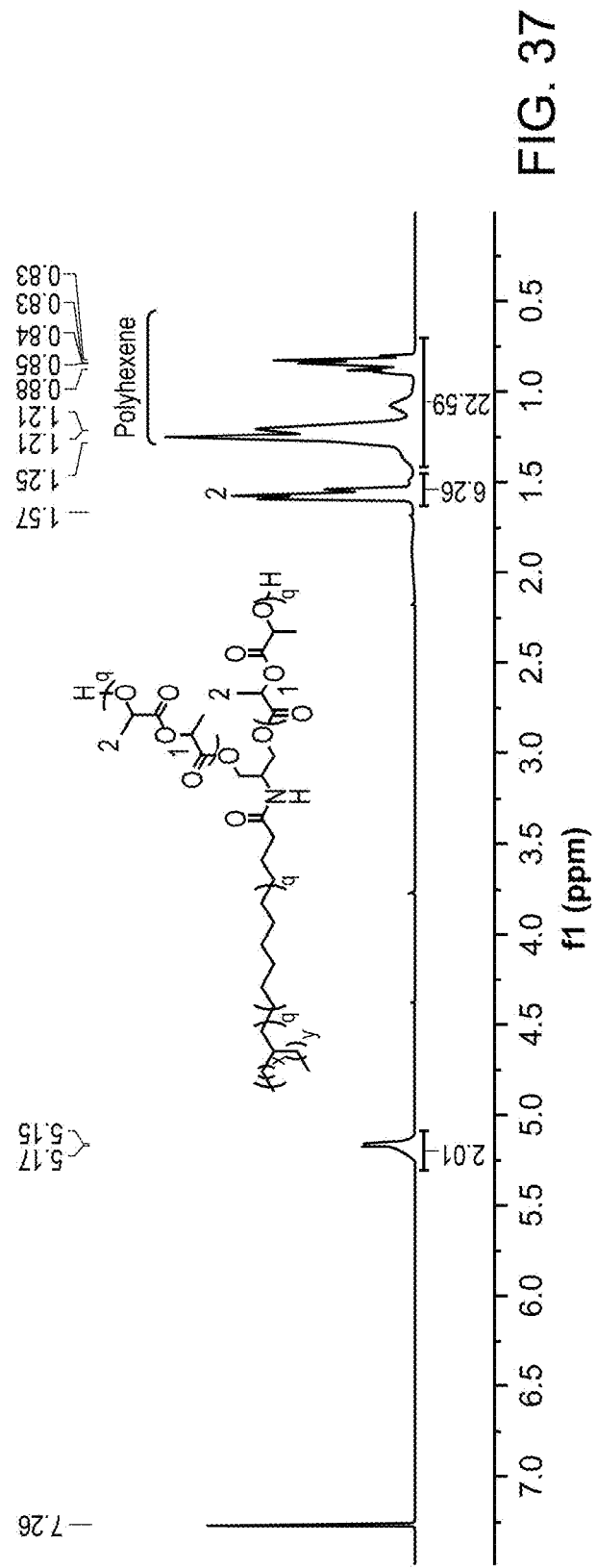
FIG. 37 is an $^1$H NMR (400 MHz, CDCl$_3$, 25° C.) spectrum of a PH-PLA$_2$ "star-like" polymer produced in Example 11.
Figure 38:
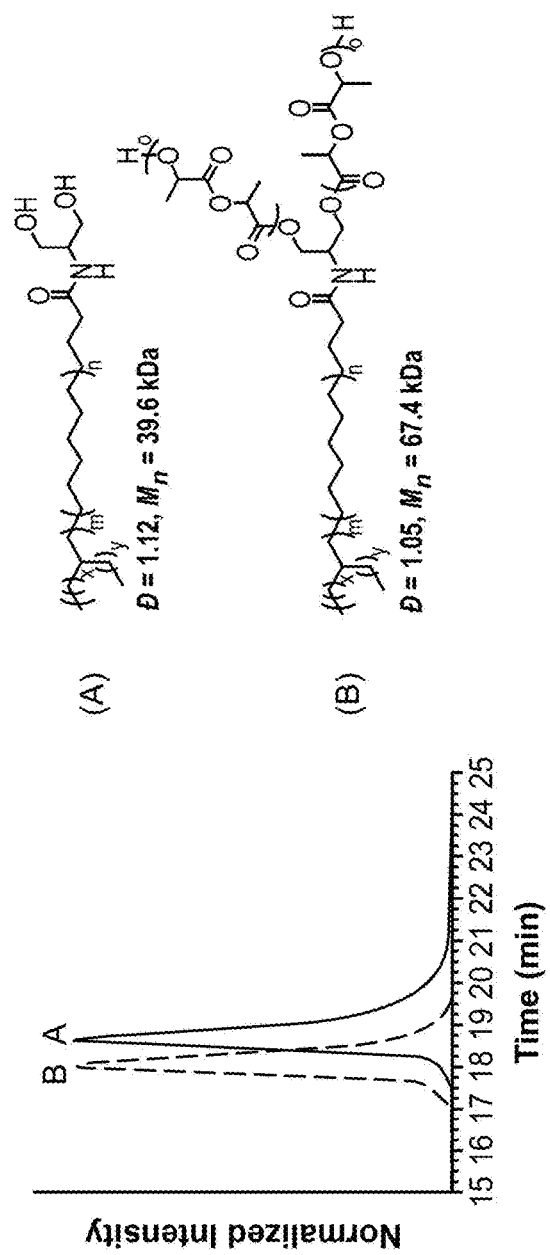
FIG. 38 is a GPC trace of the PH-PLA$_2$ "star-like" polymer produced in Example 11.

In a 5 ml oven-dried microwave vial equipped with a PTFE stir bar, the polyhexene-OH$_2$ (PH—OH$_2$) macroinitiator (1 eq, 200 mg, 5.5×10$^{-3}$ mmol), and DL-lactide monomers (200 eq, 158 mg) were charged. 1.5 mL of dry toluene was added, and the mixture was allowed until the macroinitiator was dissolved. MTBD (0.25 eq, 0.21 mg) was dissolved in 0.5 ml of toluene and the solution was injected into the reactor. The vial was then immersed in an oil bath at 50° C. and allowed to react until complete conversion was achieved. After the reaction completed, an excess amount of acetic acid was used to quench the polymerization. Volatiles were partially removed under reduced pressure, and the polymer was precipitated in methanol. The obtained "star-like" polymer was dried in a vacuum oven at 40° C. overnight before characterization by $^1$H NMR (400 MHz, CDCl$_3$, 25° C.; FIG. 37) and GPC (FIG. 38; (A) PH—OH$_2$, (B) PH-b-PLA$_2$).

Examples 10-11 discussion. Typical conditions of DPP-catalyzed ROP of δ-valerolactone (δ-VL) and ε-caprolactone (ε-CL) were employed using PE-OH to yield polyethylene-polyester diblock copolymers. Full consumption of the PE-OH macroinitiator was revealed through H NMR spectroscopy of the isolated products as the hydroxymethyl (~3.72 ppm) no longer appeared, coupled with a new signal at 3.65-3.67 ppm, corresponding to the hydroxymethyl of the polyester end-group. Furthermore, GPC traces also validate the efficient initiation as a complete shift to a higher molecular weight region while maintaining low dispersities were observed. A chain extension of PE-b-PVL with ε-CL was then carried out to assess the chain-end fidelity of the block copolymer. An expected shift of the diblock to the final triblock copolymer of PE-b-PVL-b-PCL with narrow molecular weight distribution ($M_n$=15200, Đ=1.10) was observed, highlighting the livingness of the diblock precursor. Similarly, PE-b-POD bearing an OH end-group (PE-POD-OH, $M_n$=19600, Đ=1.16) was prepared and employed for organocatalyzed ROP with rac-lactide and b-VL. This polyolefin diblock macroinitiator gave a triblock copolymer comprising a new polylactide (PLA) segment that reached a molar mass of 29700 kDa with a unimodal distribution (Đ=1.16).

In the case of chain extension with b-VL, interestingly, triple detection HT-GPC showed that the elution of the obtained triblock copolymers shifted backward as well as a decrease in refractive index (RI) intensity as higher PVL incorporation. This phenomenon can be explained by the hydrodynamic volume of the resulting PE-b-POD-b-PVL being smaller than the polyolefin precursor in the eluent solvent (trichlorobenzene).

Figure 39:
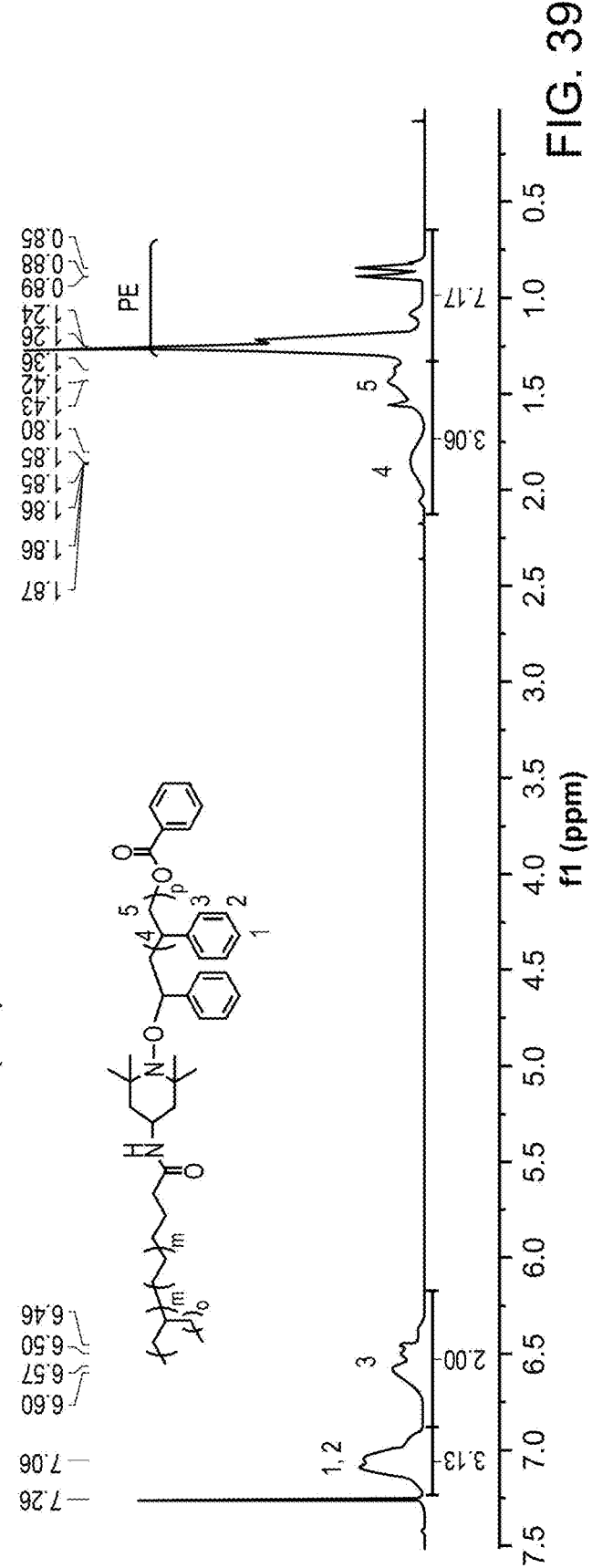
FIG. 39 is an $^1$H NMR (400 MHz, CDCl$_3$, 25° C.) spectrum of a PE-b-PS block copolymer formed in Example 12.

Despite this, the dispersity of the generated triblock copolymers slightly decreased (1.16 to 1.11) as molecular weight increased, highlighting the uniformity and livingness of the polymerization. In addition to ethanolamine, serinol was selected to react with the end-product of the hexene kinetic study to achieve a dual-hydroxy functionalized polyhexene (PH—OH$_2$). A successive extension was demonstrated with rac-Lactide using MTBD as a catalyst, which afforded a "star-like" triblock architecture of PH-PLA$_2$ with Mn=67400 and lower dispersity (Đ=1.05) compared to its macroinitiator. Polymerization results for Examples 9-10 are provided below in Table 6 ([a] Catalyst used for ROP:DPP. [b] Catalyst used for ROP:MTBD. [c] Molecular weight and dispersity index (Đ) were determined by GPC analysis with samples run in THF at 40° C. calibrated to polystyrene standards. [d] Molecular weight and polydispersity index (Đ) were determined by GPC analysis with samples run in TCB at 150° C. calibrated to polystyrene standards).

ture to 120° C. To monitor the polymerization, an aliquot was taken periodically and dropped into cold methanol to precipitate the polymer for $^1$H NMR (400 MHz, CDCl$_3$, 25° C.; FIG. 39) and GPC analysis. (Note: To accelerate the polymerization, CSA (0.036 M) can be added to the reaction vial, the temperature first set at 95° C. for 1.5 hours, then increased to 120° C.)

Figure 40:
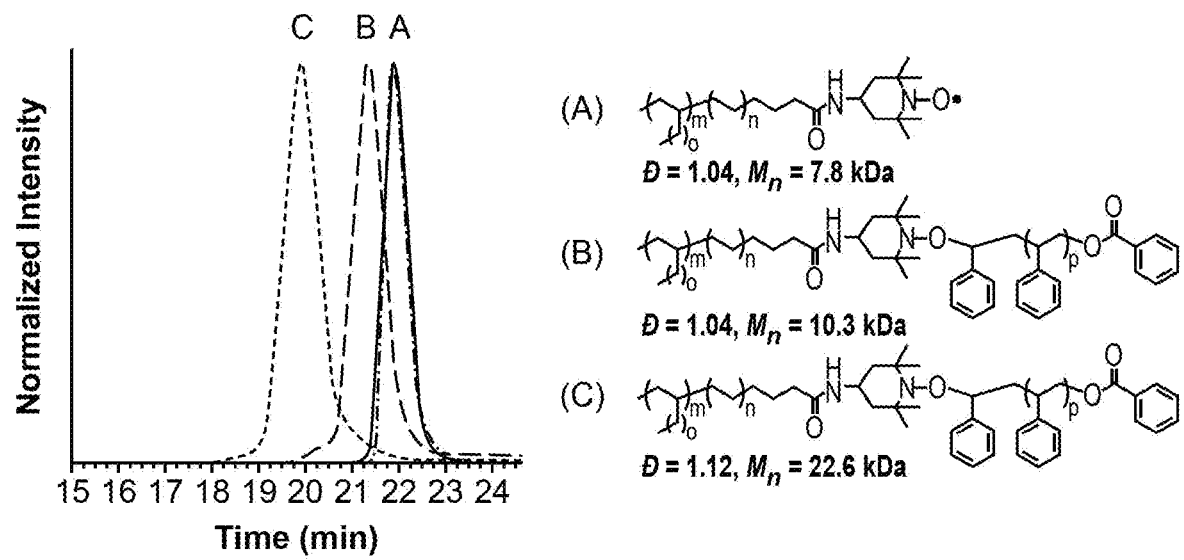
FIG. 40 is a graphical display showing GPC traces of (A) PE-TEMPO ($M_n$=7.8 kDA, Đ=1.04) and PE-b-PS formed in Example 12 at (B) 16 hours, (C) 26.5 hours and 7.5 hours (dashed line with substantially same trace as PE-TEMPO).
Figure 41:
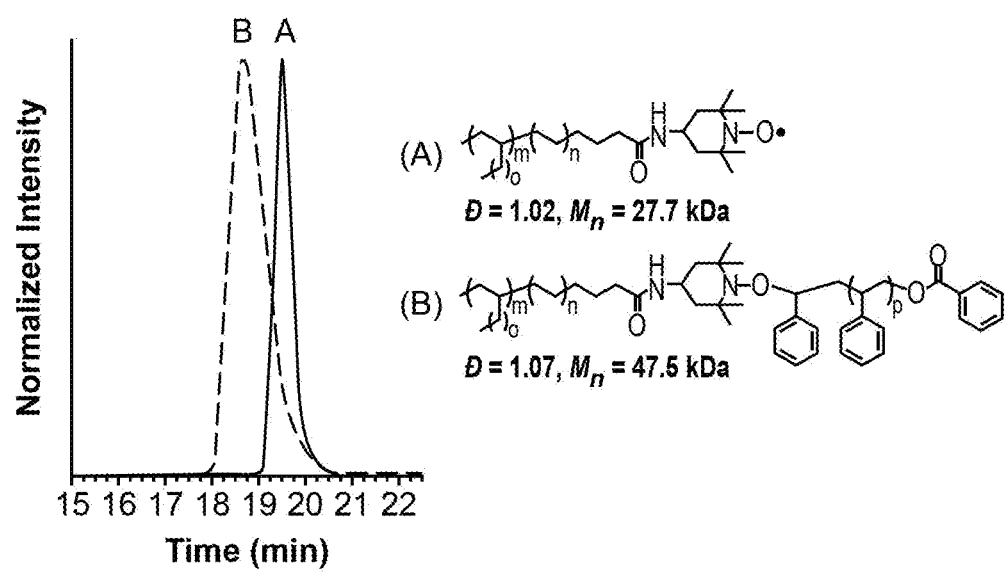
FIG. 41 is a graphical display showing GPC traces of (A) PE-TEMPO ($M_n$=27.7 kDA, Đ=1.02) and (B) PE-b-PS formed in Example 12.
Figure 42:
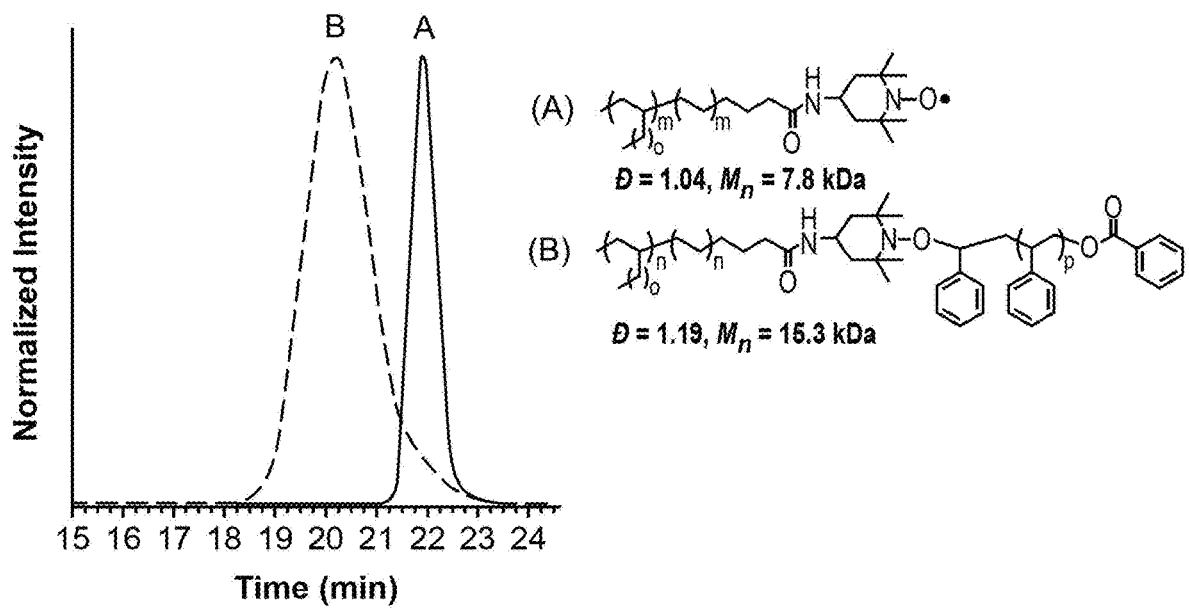
FIG. 42 is a graphical display showing GPC traces of (A) PE-TEMPO ($M_n$=7.8 kDA, Đ=1.04) and (B) PE-b-PS formed in Example 12 after 6 hours with the addition of CSA accelerator.

FIG. 40 is a graphical display showing GPC traces of (A) PE-TEMPO (M$_n$=7.8 kDA, Đ=1.04) and PE-b-PS formed in this example at (B) 16 hours, (C) 26.5 hours and 7.5 hours (dashed line with substantially same trace as PE-TEMPO). FIG. 41 is a graphical display showing GPC traces of (A) PE-TEMPO (M$_n$=27.7 kDA, Đ=1.02) and (B) PE-b-PS formed in this example. FIG. 42 is a graphical display showing GPC traces of (A) PE-TEMPO (M$_n$=7.8 kDA,

TABLE 6

| Entry | Sample | Macro-initiator | Polyolefin block M$_n$ | Đ | Co-monomer | Polyolefin-b-polyester M$_n$ | Đ | T$_g$ (° C.) | T$_m$ (° C.) |
|---|---|---|---|---|---|---|---|---|---|
| 1[a, c] | PE-PVL | PE-OH | 5900 | 1.02 | δ-VL | 12000 | 1.10 | −64.0 | 50 |
| 2[a, c] | PE-PCL | PE-OH | 5900 | 1.02 | ε-CL | 14000 | 1.05 | −64 | 54 |
| 3[a, c] | PE-PVL-PCL | PE-PVL | 12000 | 1.10 | ε-CL | 15200 | 1.10 | ND | ND |
| 4[a, d] | PE-POD-PVL | PE-POD-OH | 19600 | 1.16 | δ-VL | 21800 | 1.16 | ND | ND |
| 5[a, d] | PE-POD-PVL | PE-POD-OH | 19600 | 1.16 | δ-VL | 32400 | 1.11 | −64 | 53, 72, 85 |
| 6[b, d] | PE-POD-PLA | PE-POD-OH | 19600 | 1.16 | rac-LA | 29700 | 1.16 | 52 | 71, 85 |
| 7[b, c] | PH-PLA$_2$ | PH-OH$_2$ | 39600 | 1.12 | rac-LA | 67400 | 1.05 | −48/48 | — |

Example 12. Chain Extension of PE-TEMPO Via Nitroxide Mediated Polymerization; Synthesis of PE-b-PS Diblock Copolymers Đ=1.04) and (B) PE-b-PS formed in this example after 6 hours with the addition of CSA accelerator.

Figure 43:
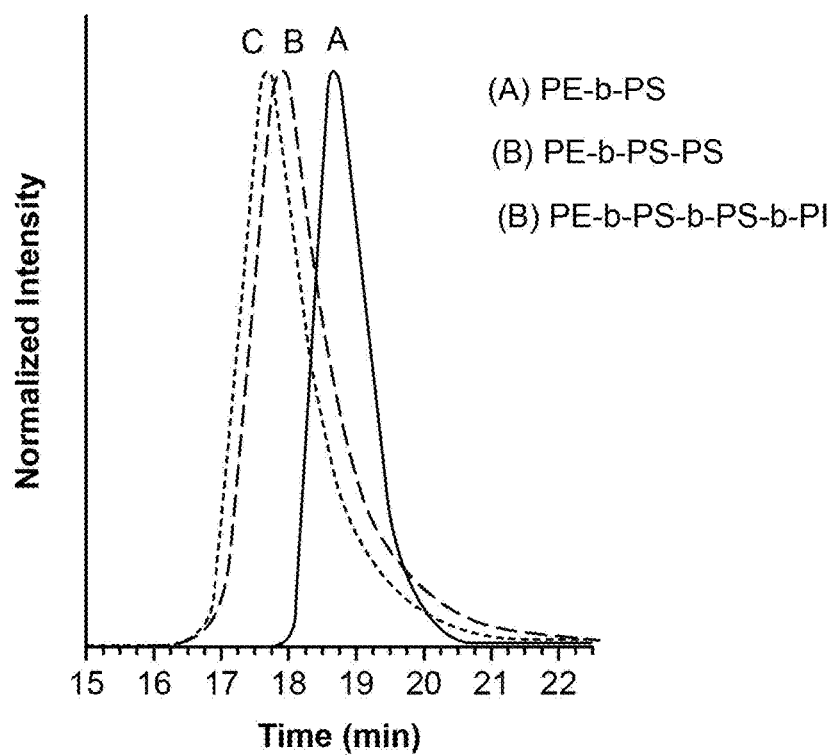
FIG. 43 is a graphical display showing GPC traces of PE-b-PS-b-PS and PE-b-PS-b-PS-b-PI block copolymers formed in Example 13.
Figure 44:
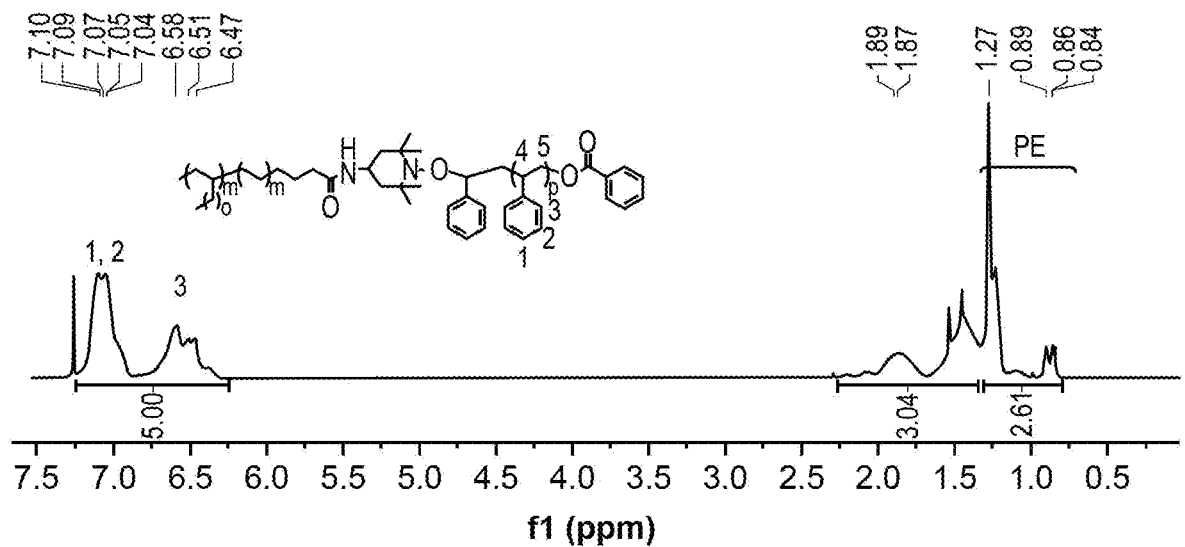
FIG. 44 is an $^1$H NMR spectrum of a PE-b-PS-b-PS block copolymer formed in Example 13.

Example 13. Chain Extension of PE-TEMPO Via Nitroxide Mediated Polymerization; Synthesis of PE-b-PS-b-PS and PE-b-PS-b-PS-b-PI Block Copolymers Chain extension with styrene. PE-b-PS macroinitiator (PE-TEMPO-PS; M$_n$=47.5 kDA, Đ=1.12; 1 eq, 250 mg) was weighed in a 5 ml oven-dried microwave vial equipped with a PTFE stir bar, followed by the addition of styrene in toluene solution (1:1 v/v). After the macroinitiator was dissolved, the reaction solution underwent 3 cycles of freeze-pump-thaw to ensure oxygen removal. Afterward, the reaction vial was sealed under N$_2$ and submerged in an oil bath set at 120° C. and allowed to be stirred for 4 hours. The polymerization was quenched by submerging the reaction vial in liquid N$_2$. The resulting PE-b-PS-b-PS polymer (M$_n$=72.0 kDA, Đ=1.29) was precipitated into cold methanol and collected by filtration. The sample was dried in a vacuum oven at 40° C. before analysis by GPC (FIG. 43) and $^1$H NMR (FIG. 44).

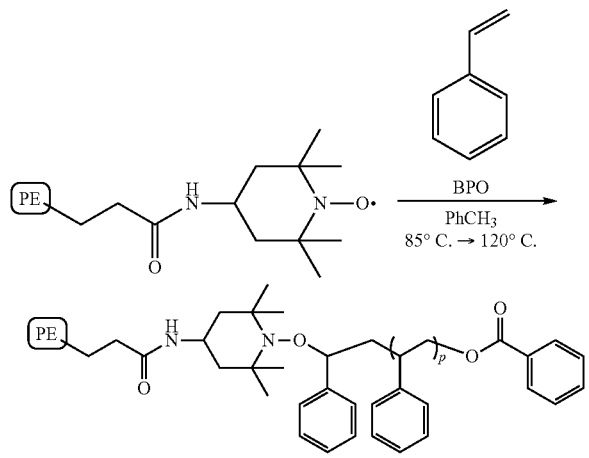

Figure 45:
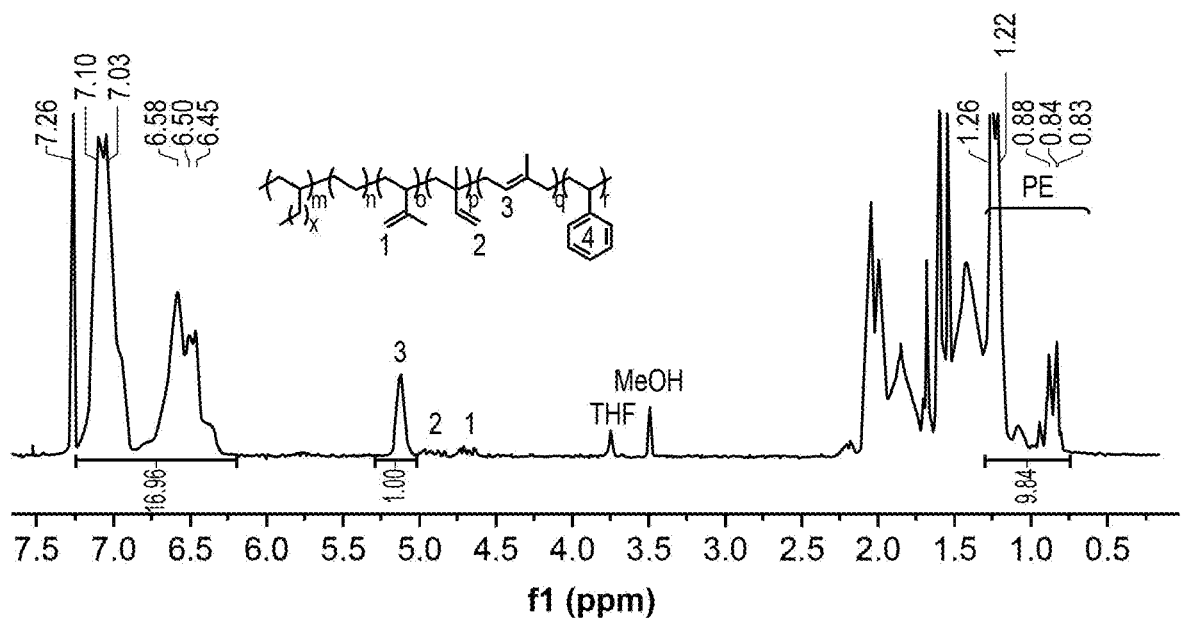
FIG. 45 is an $^1$H NMR spectrum of a PE-b-PS-b-PS-b-PI block copolymer formed in Example 13.

PE-TEMPO macroinitiator (1 eq) was weighed in a 5 ml oven-dried microwave vial equipped with a PTFE stir bar, followed by benzoyl peroxide (BPO, 0.25 eq, used in form of Luperox® A75). A solution of styrene in toluene (1:1 v/v) was injected into the vial. After the macroinitiator was dissolved, the reaction solution underwent 3 cycles of freeze-pump-thaw to ensure oxygen removal. Afterward, the reaction vial was submerged in an oil bath set at 85° C. and allowed to be stirred for 4 hours before raising the tempera- Chain extension with isoprene. PE-b-PS-b-PS macroinitiator (1 eq, 100 mg) was weighted in a 5 ml oven-dried microwave vial equipped with a PTFE stir bar, followed by the addition of isoprene (2 mL) and hydroxyacetone (50 μL). After the macroinitiator was dissolved, the reaction solution was degassed by 3 cycles of freeze-pump-thaw and sealed under N$_2$. The reaction was then submerged in an oil bath set at 130° C. and allowed to be stirred for 3 hours. The polymerization was quenched by submerging the reaction vial in liquid N$_2$. Afterward, the reaction mixture was poured into cold methanol and the resulting PE-b-PS-b-PS-b-PI polymer ($M_n$=60.0 kDA, Đ=1.32) was isolated by filtration. The sample was dried in a vacuum oven at 40° C. before analysis by GPC (FIG. 43) and $^1$H NMR (FIG. 45).

Examples 12-13 Discussion. PE bearing a nitroxide stable radical represents an opportunity for the formation of polyolefin-polyvinyl block copolymers via the NMP technique. This concept has previously been introduced via the MIL-Rad spin trapping functionalization, which can be used to produce PE-b-PS block copolymers. However, the crude product of functionalization needs to be treated with dimethyl sulfide or acetonitrile to release all of the macroradicals. Additionally, due to the polar functionalities of the spin trapping agent, chain transfer side products were formed, entailing homoPE removal after NMP to attain pure block copolymers.

This work strives to overcome this limitation by quantitatively introducing a TEMPO radical unit at the chain end of PE. Aminolysis of PE-PFPh precursors with 4-amino-TEMPO afford PE-TEMPO macroradicals, which was characterized by a combination of electron paramagnetic resonance (EPR), NMR, and GPC.

EPR resonances of isolated PE-TEMPO macroradicals displayed a triplet with hyperfine coupling constants of $a_N$=15.46 G and are consistent with the literature value of TEMPO (FIG. W). PE-TEMPO ($M_n$=7800, Đ=1.04) was then used as the macro-mediating agent in NMP polymerization with styrene using benzoyl peroxide (BPO) as a radical initiator in an adapted procedure.

To avoid self-initiated free radical polymerization of styrene at high temperature, a mixture of PE-TEMPO, BPO, and styrene in toluene was first heated to 85° C. (4 hours) to generate the alkoxyamine adduct in situ. Next, the reaction temperature was subsequently raised to 120° C. to promote chain propagation. Regular sampling of the reaction mixture revealed a long induction period as no significant shift in GPC elution was recorded after 7.5 hours. However, as the polymerization progressed, well-defined PE-b-PS were obtained with narrow molecular weight distribution ($M_n$=10300-22600, Đ=1.04-1.12). This method was also used to prepare PE-b-PS with a different composition ($M_n$=47500, Đ=1.12) with a higher PE block length by utilizing PE-TEMPO with a molecular weight of 27700 (Đ=1.02) as the macroinitiator. The long induction period was attributed to the built-up free nitroxide throughout polymerization as a consequence of termination. To tackle this issue, camphorsulfonic acid (CSA, 0.036 M) was added to the reaction, which served as a scavenger for free nitroxides and accelerated chain propagation. This afforded PE-b-PS with $M_n$=15300 after only 6 hours of polymerization.

The chain-end fidelity of the PE-b-PS diblock copolymers was apprised through continuous chain extension with styrene and isoprene. Particularly, the PE-b-PS ($M_n$=47500, Đ=1.12) was used as a macroinitiator for the radical polymerization of styrene at 120° C. The induction period no longer occurred and ABB-type PE-b-PS-b-PS triblock copolymer with high molecular weight ($M_n$=60000) and reasonable dispersity (Đ=1.32) were obtained. The isolated product was further extended with isoprene to give an ABBC tetrablock architecture of PE-b-PS-b-PS-b-PI ($M_n$=72000, Đ=1.29). $^1$H diffusion-ordered NMR spectroscopy (DOSY) was performed on the PE-b-PS diblock copolymers. The 2D spectrum of the block copolymer exhibited a single resonance whereat the singles of the PE segment (0.8-1.22 ppm) and PS segment (6.42-7.09 ppm) were aligned tightly around the same diffusion coefficient (4.05×10-11 cm$^2$/s), confirming a blocky architecture. The selective solubility of this hybrid material allows the preparation of micelle-size dispersion via a self-assembly mechanism. Specifically, the PE-b-PS could be dispersed in hexane (selective solvent for PE) and encapsulate 8-anilino-naphthalene sulfonic acid (ANS dye), an environmentally sensitive fluorescent probe. The dispersion of the block copolymer with this probe exhibits fluorescent properties upon UV light irradiation, whereas in the control experiment, no fluorescence was observed.

Polymerization results for examples 12-13 are provided below in Table 7 ([a] BPO was used as an initiator [b] CSA (0.036M) was added for rate acceleration [c] Molecular weight and dispersity index (Đ) were determined by GPC analysis with samples run in THF at 40° C. calibrated to polystyrene standards).

TABLE 7

| Entry | Sample | Macro-initiator | Polyolefin block $M_n$ | Đ | Co-monomer | Polyolefin-b-polyvinyl $M_n$ | Đ | $T_g$ (° C.) | $T_m$ (° C.) |
|---|---|---|---|---|---|---|---|---|---|
| 1[a, c] | PE-PS | PE-TEMPO | 7800 | 1.04 | Styrene | 22600 | 1.12 | ND | ND |
| 2[a, b, c] | PE-PS | PE-TEMPO | 7800 | 1.04 | Styrene | 15300 | 1.19 | ND | ND |
| 3[a, c] | PE-PS | PE-TEMPO | 27700 | 1.02 | Styrene | 47500 | 1.07 | ND | ND |
| 4[c] | PE-PS-PS | PE-PS | 47500 | 1.12 | Styrene | 60000 | 1.32 | −67, 100 | — |
| 5[c] | PE-PS-PS-PI | PE-PS-PS | 60000 | 1.32 | Isoprene | 72000 | 1.29 | −62, 104 | — |

Example 14. Chain Extension of PE-TTC from RAFT Polymerization

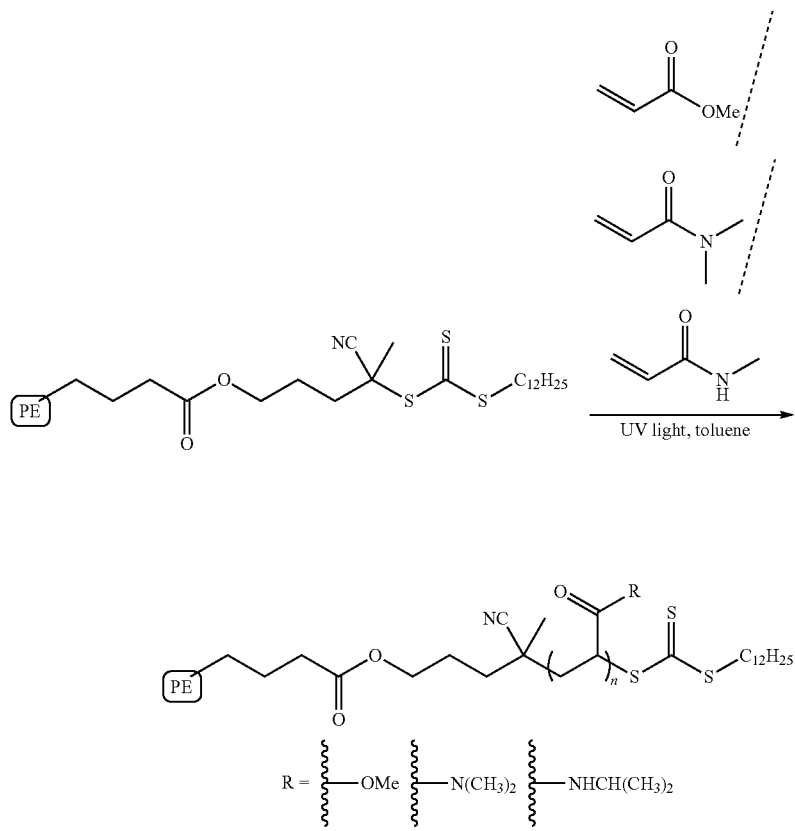

Polymerization Procedure. PE-TTC macroRAFT agent (50 mg, 1 eq) was weighted in a 1-dram vial equipped with a stir bar. Toluene (2 mL) and monomers were added, and the mixture was stirred until the PE-TTC was completely dissolved. The reaction solution was then degassed by 3 cycles of freeze-pump-thaw and sealed under $N_2$. Afterward, the reaction vial was placed in a PhotoCube™ reactor that was set at UV light (365 nm), 4 panels, low-intensity mode (50%). The PhotoCube™ reactor was equipped with 4 fan panels but the temperature increased (from 24° C. to 30° C.) throughout the reaction due to heat provided by the light source. The polymerization was quenched by removing the reaction vial out of the light source and exposing it to air. Volatiles were removed under reduced pressure and the polymer was dried under a high vacuum. Precipitation in methanol prior to vacuum drying was carried out with the PE-b-PMA sample. PE-b-P(acrylamide) were dialyzed against methanol for a day in 10 kDa MWCO snakeskin dialysis tube.

Figure 46:
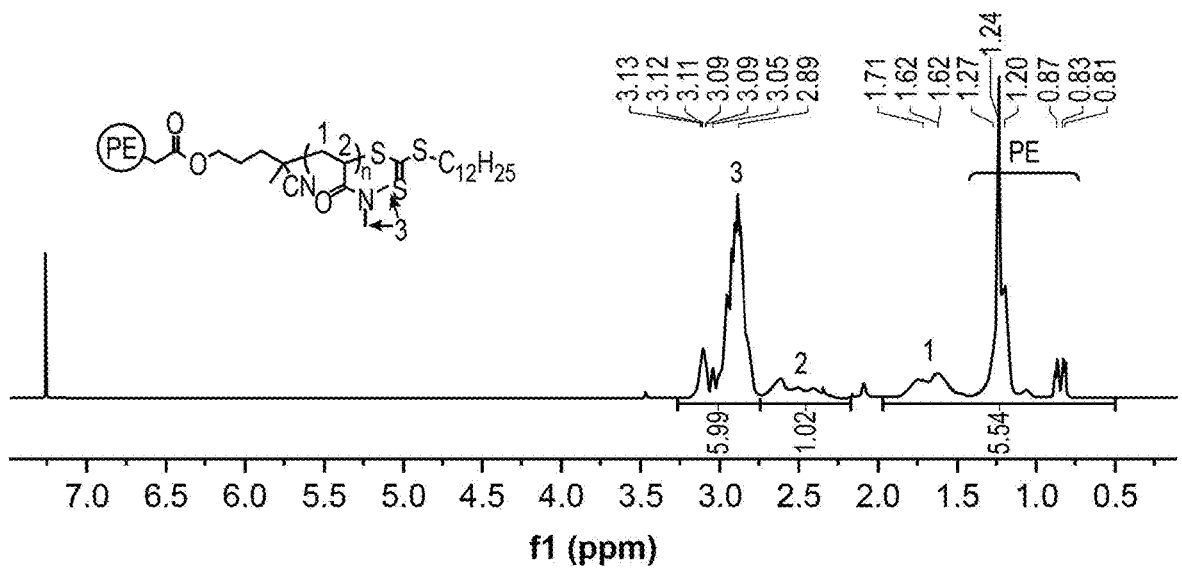
FIG. 46 is an $^1$H NMR spectrum (600 MHz, CDCl$_3$, 25° C.) of a PE-b-PDMA diblock copolymer produced in Example 14.
Figure 47:
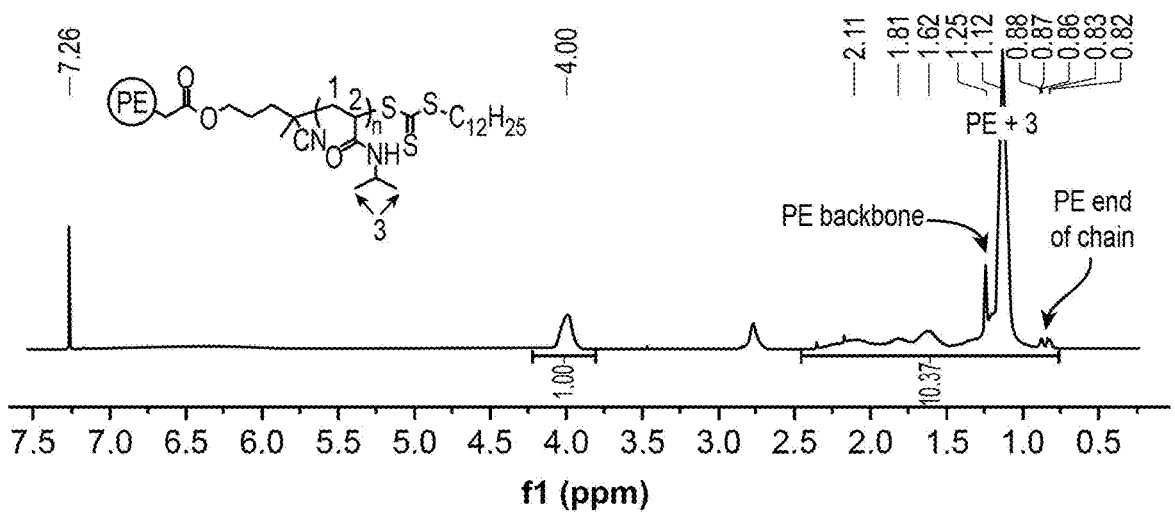
FIG. 47 is an $^1$H NMR spectrum (600 MHz, CDCl$_3$, 25° C.) of a PE-b-PNIPAM diblock copolymer produced in Example 14.
Figure 48:
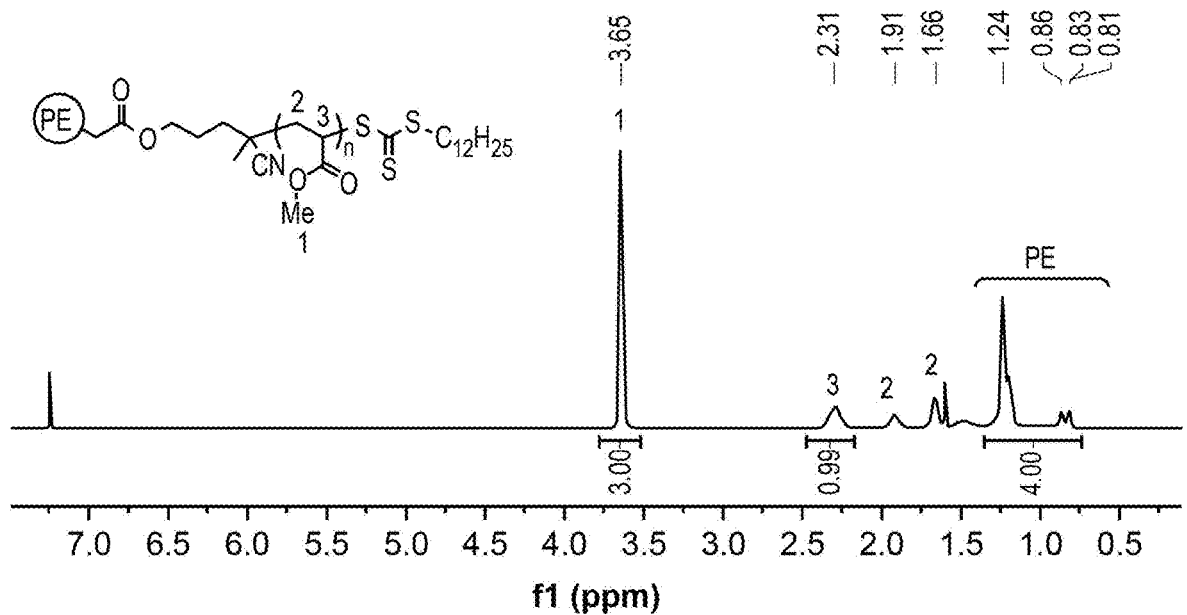
FIG. 48 is an $^1$H NMR spectrum (600 MHz, CDCl$_3$, 25° C.) of a PE-b-PMA diblock copolymer produced in Example 14.
Figure 49:
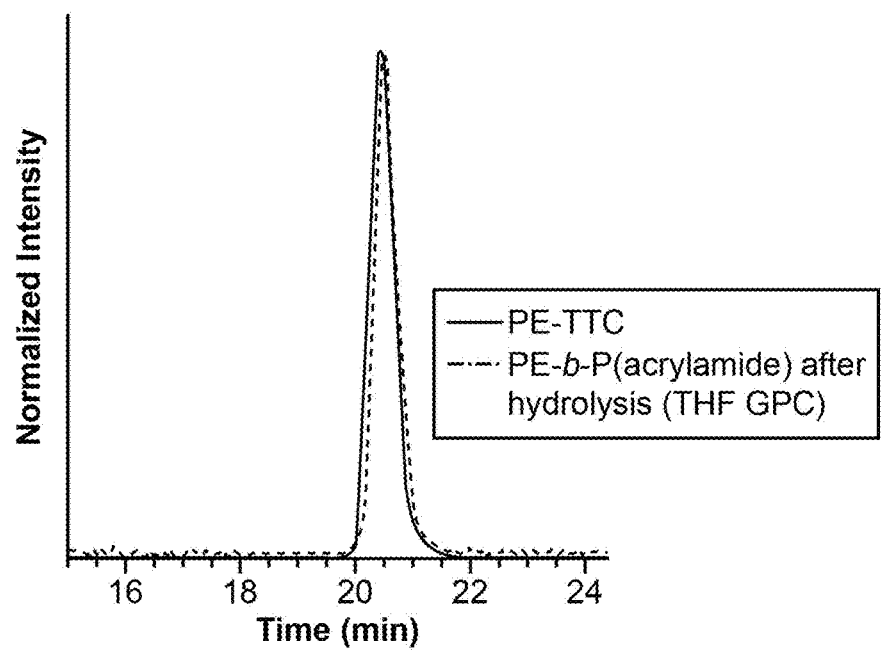
FIG. 49 is a GPC trace of PE-TTC and PE-b-P(acrylamide) obtained after hydrolysis in Example 14.
Figure 50:
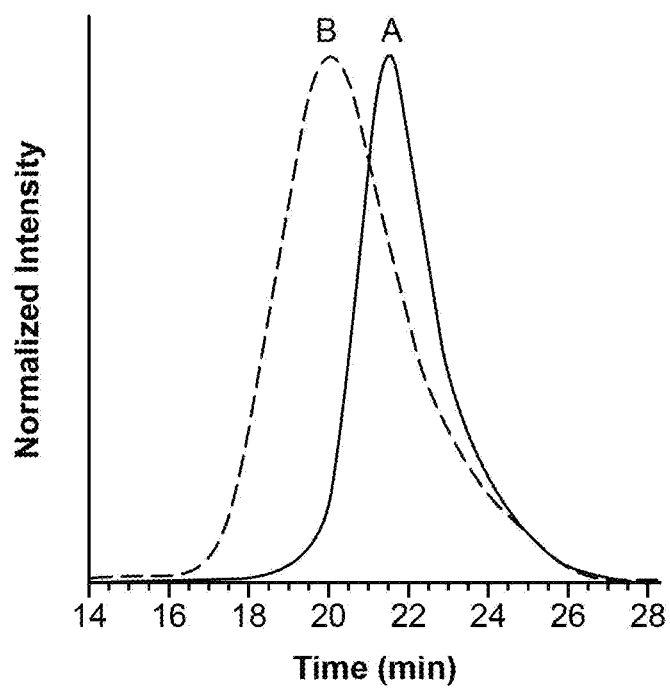
FIG. 50 is a GPC trace of A) PE-b-PDMA and B) PE-b-PNIPAM obtained after hydrolysis in Example 14.
Figure 51:
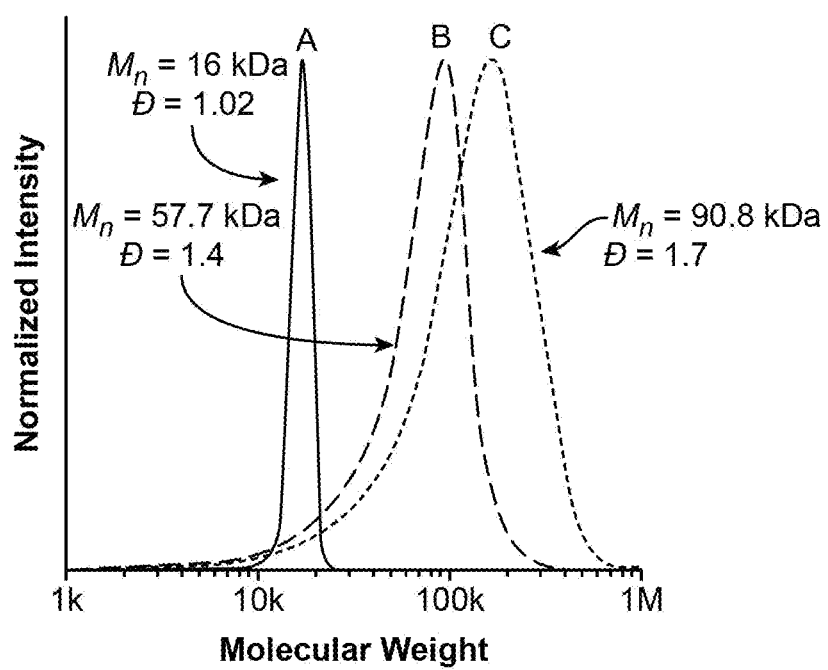
FIG. 51 is a graphical display the molecular weight of A) PE and B) PDMA and C) PNIPAM polymers in Example 14.

Hydrolysis of PE-b-P(acrylamide) copolymers. In a 25 mL round bottom flask, 30 mg block copolymer was dissolved in 5 mL 0.5 N NaOH solution in THF:MeOH:$H_2O$ (5:4:1 v:v) and stirred overnight at rt. The reaction was then concentrated under reduced pressure and dried under a vacuum. The resulting solids were sonicated in THF (PE and PDMA) or $CHCl_3$ (PE and PNIPAM) and filtered with a 0.45 μm filter disk to remove excess NaOH. The solution was then reduced and dried before analysis with NMR and GPC. FIG. 46 is a $^1$H NMR spectrum (600 MHz, $CDCl_3$, 25° C.) of a PE-b-PDMA diblock copolymer produced in this example. FIG. 47 is a $^1$H NMR spectrum (600 MHz, $CDCl_3$, 25° C.) of a PE-b-PNIPAM diblock copolymer produced in this example. FIG. 48 is a $^1$H NMR spectrum (600 MHz, $CDCl_3$, 25° C.) of a PE-b-PMA diblock copolymer produced in this example. FIG. 49 is a GPC trace of PE-TTC and PE-b-P(acrylamide) obtained after hydrolysis. FIG. 50 is a GPC trace of A) PE-b-PDMA and B) PE-b-PNIPAM obtained after hydrolysis. FIG. 51 is a graphical display of the molecular weight of A) PE and B) PDMA and C) PNIPAM polymers.

Figure 52:
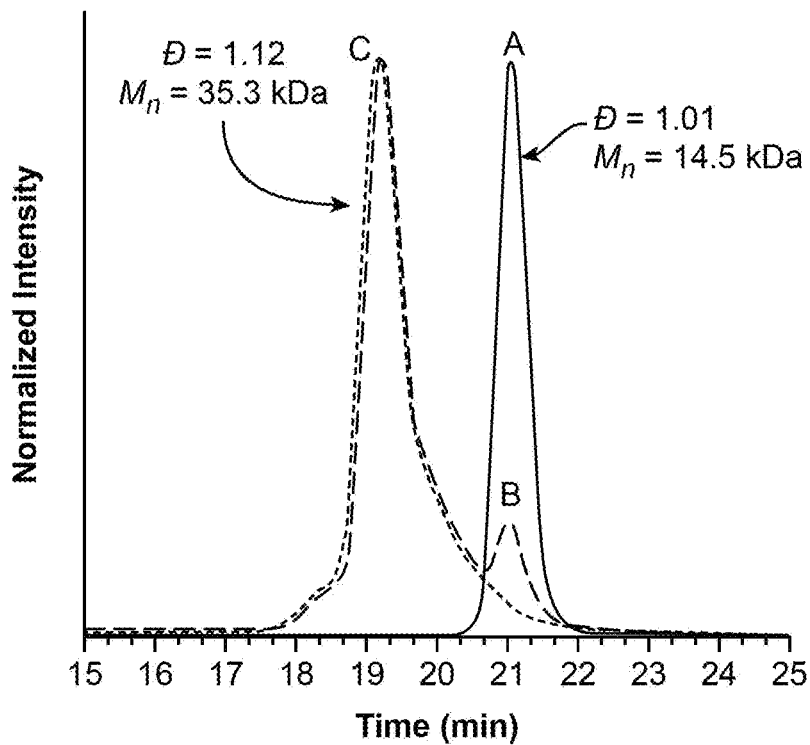
FIG. 52 is a GPC trace of A) PE-TTC, B) PE-b-PMA (crude) and C) PE-b-PMA obtained in Example 14.

FIG. 52 is a GPC trace of A) PE-TTC, B) PE-b-PMA (crude) and C) PE-b-PMA obtained in this example. GPC analysis of the crude material obtained after 4 hours of polymerization under UV light showed a new peak appearing at the high molecular weight region in addition to a minor shoulder peak whose retention time was comparable to PE-TTC precursor. Nevertheless, the shoulder peak can be easily removed via precipitation/centrifugation using hexane, affording a well-defined PE-b-PMA with Mn=35300, and Đ=1.12 whose blocky structure was confirmed by DOSY.

Polymerization results for Example 14 are provided below in Table 8 ([a] Molecular weight and dispersity index (Đ) were determined by GPC analysis with samples run in THF at 40° C. calibrated to polystyrene standards. [b] Molecular weight was calculated by the addition of the molecular weight of PE (THF GPC) and PDMA/PNIPAm (DMF/LiBr GPC) obtained after hydrolysis).

TABLE 8

| Entry | Sample | Macro-initiator | Polyolefin block $M_n$ | Đ | Co-monomer | Polyolefin-b-polyester $M_n$ | Đ | $T_g$ (° C.) | $T_m$ (° C.) |
|---|---|---|---|---|---|---|---|---|---|
| 1 | PE-PDMA | PE-TTC | 16000 | 1.02 | DMA | 73700[b] | — | −67/108 | — |
| 2 | PE-PNIPAM | PE-TTC | 16000 | 1.02 | NIPAM | 106800[b] | — | −67/130 | — |
| 3 | PE-PMA | PE-TTC | 14500 | 1.01 | MA | 35300[a] | 1.12 | −67/13 | — |

Despite its excellent reactivity towards aminolysis, the pentafluorophenyl ester group is not prone to transesterification because of the backward reaction demonstrated in earlier reports. Higher conversion (up to 90%) could be achieved when using TBD as the catalyst. However, the instability of RAFT agents towards aminolysis precludes the use of this organocatalyst for the current study. Attempts were carried out by employing DBU and MTBD for transesterification with the CDP, however, the conversions remained low (less than 50% after 24 hours). Eventually, an adapted procedure based on a recent study by Theato et al. (*Macromolecules* 2015, 48, 8695-8707) was employed to accomplish a near quantitative conversion. Specifically, transesterification of PE-PFPh with CDP was performed using a milder DMAP/DMF base system and toluene as the solvent at 85° C. In the NMR spectrum of the isolated product, a new triplet corresponding to the α-hydrogens of the ester moiety (—CH$_2$CO, δ=4.12 ppm) was observed. The integration of this peak matched with that of S—CH$_2$ (3.32 ppm) on the RAFT-Z group, which suggested the preservation of the RAFT agent under this condition. The complete disappearance of the CH$_2$CO$_2$PFPh indicates the quantitative conversion of the parental PE. Additionally, GPC traces of the PE-TTC showed a stronger absorption by UV detection compared to the PE-PFPh precursor. UV-Vis spectroscopy of the PE-TTC also exhibits two absorption bands corresponding to π→π* transition (~310 nm) and π→π* (~450 nm), resembling closely the CDP's spectroscopy. We sought to explore the ability of PE-TTC in PI-RAFT polymerization to initiate acrylamide monomers by exciting the macroRAFT PE using UV light irradiation (365 nm). In a typical reaction, PE-TTC (25 mg/ml, Mn=16000, Đ=1.02) and the acrylamide monomers (620 eq) were dissolved in toluene, followed by degassing via three consecutive freeze-pump-thaw cycles. The reaction vial was then sealed under nitrogen and placed in a photoreactor (PhotoCube®) and UV light was turned on to start the polymerization. The polymeric material collected after the polymerization was difficult to purify using conventional methods such as precipitation. Particularly, in the case of chain extension of PE-TTC with DMA, the material formed a cloudy dispersion in both methanol and hexane, which was attributed to the ability to self-assemble into nano-objects in a selective solvent for their homopolymer constituent. The dispersion of PE-b-PDMA in methanol was analyzed by transmission electron microscopy (TEM), revealing the formation of micelle structures with an average diameter of 172 nm. DOSY spectra of the isolated polymer also pointed towards the formation of the blocky structure, as the signals corresponding to PE (0.8-1.22 ppm) and PDMA (2.87-3.10 ppm) exhibit a similar diffusion coefficient. It is noteworthy that the molecular weight of the block copolymers analyzed through GPC analysis using a RI detector would not accurately correlate to their true molecular weights due to the changes in hydrodynamic volume. Particularly, the highly branched PE described in the study is commonly characterized using THF as eluent, whereas the eluent for polyacrylamides is typically DMF with added LiBr to avoid dipole interaction. Although the obtained polymers are soluble in various solvents, attempts to characterize the sample molecular weight in THF, chloroform, and DMF/LiBr gave different results. Due to this inconsistency, hydrolysis of the ester linkage was carried out to obtain a mixture of homopolymers that can be analyzed in their suitable solvents to obtain reliable data. DOSY experiments were implemented to confirm the successful cleavage of the block copolymers where two distinct diffusion coefficients correlated to the PE and PDMA homopolymers were recorded. The hydrolyzed product was then prepared in THF or DMF/LiBr separately and subjected to GPC analyses with the corresponding eluents.

Example 15. Chain Extension of PE-TTC from RAFT Polymerization

Figure 53:
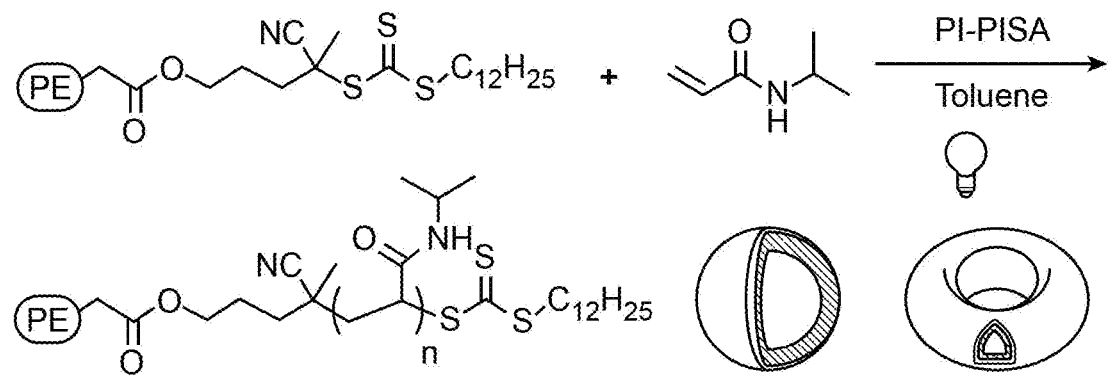
FIG. 53 is a schematic illustration of a PE-TTC mediated polymerization-induced self-assembly (PISA) with N-isopropylacrylamide (NIPAM) in accordance with various aspects of the disclosure, as described in Example 15.

The results of Example 14 motivated us to explore PE-TTC mediated polymerization-induced self-assembly (PISA) with N-isopropylacrylamide (NIPAM) due to its solvophobic interaction with toluene (FIG. 53). The initial transparent reaction medium was turbid after 6 hours of polymerization with 82% of monomer conversion.

Figure 54:
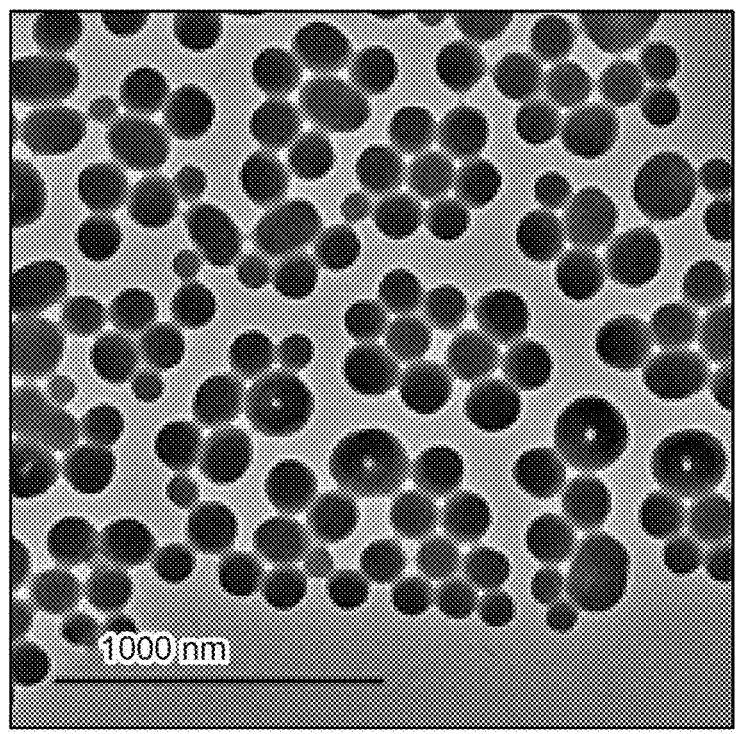
FIGS. 54 and 55 are TEM images (1000 nm and 500 nm scales, respectively) of PE-b-PNIPAM nanostructures formed in Example 15.
Figure 55:
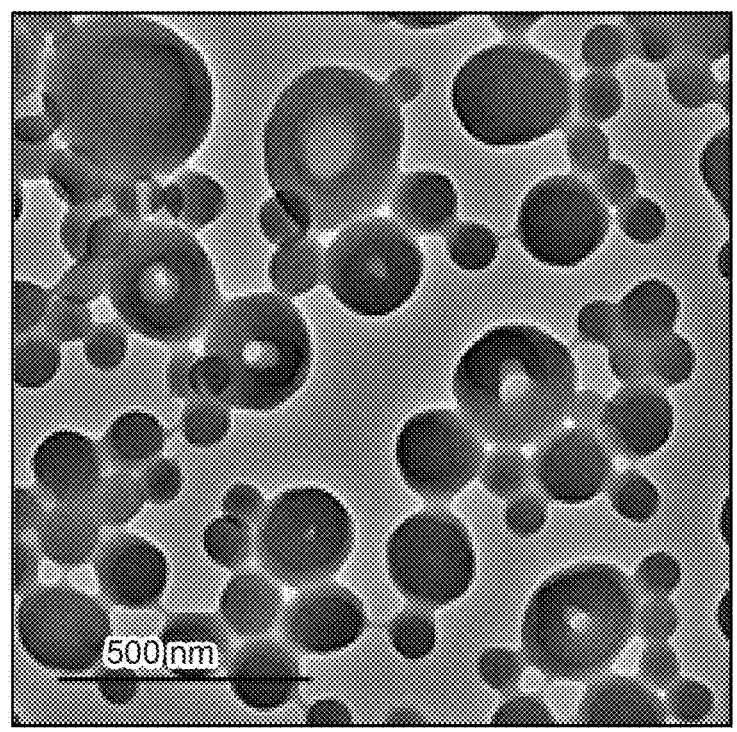

The DOSY spectrum of the isolated polymer showed a single coefficient diffusion, indicating the generation of PE-b-PNIPAM diblock copolymer. Hydrolysis of the diblock copolymer was again conducted to obtain the molecular weight of the polyacrylamide segment. DMF GPC analysis indicated a unimodal with Mn=90000, with a relatively broad molecular weight distribution (Đ=1.7). We attributed the observed high dispersity to the degradation of the TTC end-group under UV light at high conversion (82%) as previously suggested. To probe the PISA result, an aliquot of the crude reaction was diluted with toluene and analyzed with dynamic light scattering (DLS) and TEM. DLS data suggested the formation of nanostructured objects with an average diameter of 190 nm. One of the major advantages of PISA is its ability to provide access to higher-order morphology. In the presented case, TEM imaging revealed the generation of vesicles and donut-like structures (FIGS. 54 and 55).

Figure 56:
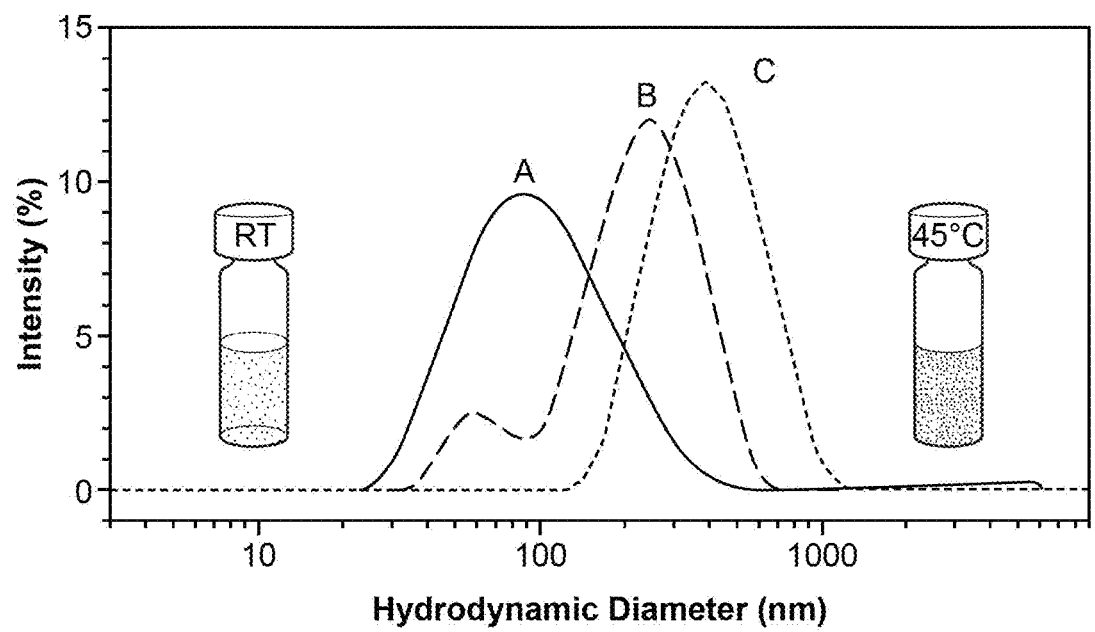
FIG. 56 is a graphical display showing DLS size distributions depicted the change in hydrodynamic volume of PE-b-PNIPAm diblock copolymer nanostructures of Example 15 when dispersed in water (0.5 w %).

Considering the water-soluble and thermoresponsive features of PNIPAM, we anticipated that the introduction of the PNIPAM segment would grant these appealing properties to the PE-b-PNIPAM diblock copolymers. The PE-b-PNIPAM can be readily prepared in water at 0.5 w % concentration by sonication at the ambient temperature, resulting in a transparent dispersion. The hydrodynamic volume as a function of temperature was monitored through DLS measurements per 2° C. interval. The particle sizes were approximately 80 nm in the range of 20-34° C., then increased rapidly, reaching ~320 nm at 45° C. (FIG. 56; A) 22° C., 84 nm, B) 36° C., 180 nm, and C) 45° C., 320 nm). This suggested the coil-to-globule transition and the formation of large aggregates due to hydrophobic interactions between PNIPAM chains. To the best of our knowledge, this study represents the first synthetic example of a diblock copolymer comprising PE and polyacrylamide (PA) as well as PISA involving PE and PNIPAM.

Example 16. Synthesis of Polyolefin Bottlebrush Copolymers Through Grafting Through ROMP

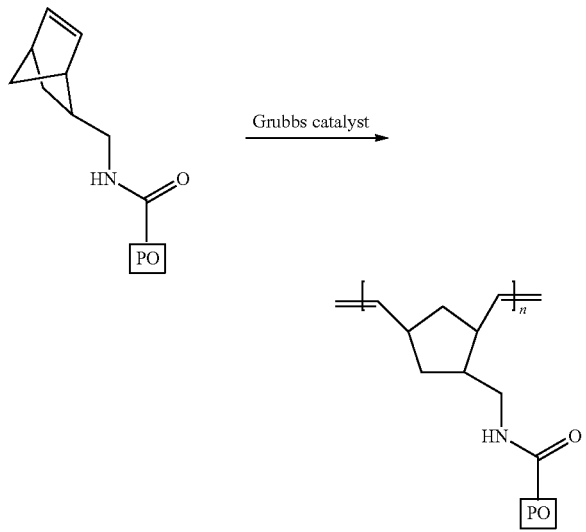

Figure 57:
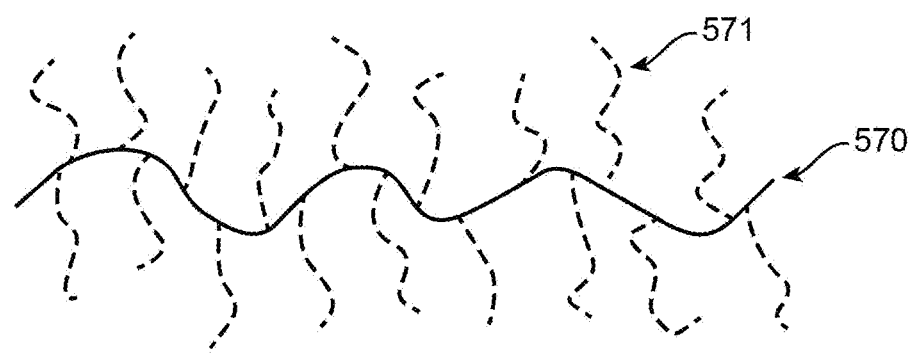
FIG. 57 is a schematic illustration of a bottlebrush copolymer formed according to Example 16.

In a typical experiment, polyolefin macromonomers (PO=polyethylene, poly-α-olefin, PE-b-COD, etc.), produced using a synthetic method similar to those described in examples 7-9, are dissolved in THF/toluene, followed by degassing by purging throughout with $N_2$. A stock solution of Grubbs catalyst in THF/toluene is then added quickly into the reaction to start the polymerization. After the allotted time, the polymerization is quenched with excess ethyl vinyl ether. Volatiles are removed under pressure and the polymer was precipitated in methanol and dried under vacuum. A schematic illustration of a bottle brush copolymer formed according to this example is provided in FIG. 57, where 570 is the polymerized backbone and 571 are the PO polymer groups.

Although the present invention and its objects, features and advantages have been described in detail, other embodiments are encompassed by the invention. All references cited herein are incorporated by reference in their entireties. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A polymerization catalyst having a structure according to formula (1):

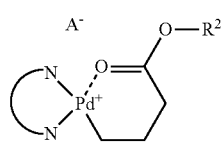 (1)

wherein

is a diimine ligand, $A^-$ is a counter anion, and $R^2$ is a fluorinated alkane, alkene or alkyne, a fluorinated aromatic, a fluorinated cycloalkane or cylcoalkene cycloalkene, a fluorinated heteroaromatic, or a fluorinated heterocyclic.

2. The catalyst of claim 1, wherein the diimine ligand has a structure comprising any one of a 1,4-diaza-1,3-butadiene backbone, a 2,2'-bipyridine backbone, a 2,2-bipyrimindine backbone, a 2,2'-bipyrazine backbone, 2,2-bibenzimidazole backbone, a bis(iminoacenaphthene) backbone, a 1,10-phenanthroline backbone, a dipyridoquinoxaline backbone, a 1,1'-biisoquinoline backbone, and a 2-(2-pyridyl)benzimidazole backbone.

3. The catalyst of claim 1, wherein the diimine ligand has a structure according to Formula (2):

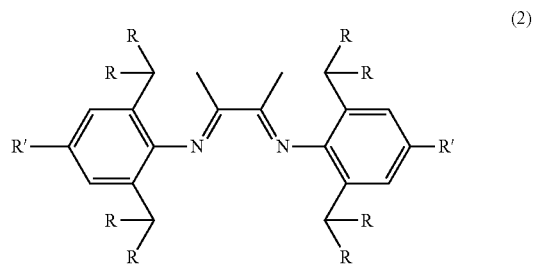 (2)

where R is an alkane, an alkene, an alkyne, an aromatic, a cycloalkane, a cycloalkene, a heteroaromatic, or a heterocyclic group, and R' is —H or an alkyl group.

4. The catalyst of claim 3, wherein each R is —$CH_3$, or each R' is —H.

5. The catalyst of claim 3, wherein each R is —$CH_3$ and each R' is —H.

6. The catalyst of claim 1, wherein $R^2$ is selected from the group consisting of —$CH_2CF_3$, —$CH_2CF_2CF_3$, —$CH(CF_3)_2$, —$CH_2CF_2CHFCF_3$, —$CH_2(CF_2)_5CHF_2$, —$(CH_2)_2(CF_2)_5CF_3$, —$(CH_2)_2(CF_2)_7CF_3$, and —$(CH_2)_2(CF_2)_9CF_3$.

7. The catalyst of claim 1, wherein $R^2$ is —$CH(CF_3)_2$.

8. The catalyst of claim 1, wherein $R^2$ is selected from the group consisting of —$C_6F_5$ and —$CH_2$—$C_6F_5$.

9. The catalyst of claim 1, wherein $R^2$ is —$C_6F_5$.

10. The catalyst of claim 1, wherein $A^-$ is $^-$BArF (tetrakis[3,5-bis(trifluoromethyl)phenyl]-borate).

11. A method of preparing a polyethylene homopolymer or a polyolefin homopolymer, comprising reacting ethylene or olefin monomers with a polymerization catalyst according to claim 1 to form the polyethylene homopolymer or the polyolefin homopolymer, wherein a terminus of the prepared homopolymer has a structure according to formula (3):

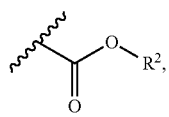 (3)

wherein $R^2$ is a fluorinated alkane, alkene or alkyne, a fluorinated aromatic, a fluorinated cycloalkane or cycloalkene, a fluorinated heteroaromatic, or a fluorinated heterocyclic.

12. The method of claim 11, wherein the polyolefin is a polypropylene, a polybutene, a polypentene, a polyhexene, a polyheptene, polydecene, a polyoctene, a polyisoprene, a poly(1,3-butadiene), a polyisobutylene, or a poly(4-methyl-1-pentene).

13. A method of preparing a polyethylene/olefin copolymer (P(E-co-O)), comprising reacting ethylene and one or more olefin monomers with a polymerization catalyst according to claim 1 to form the P(E-co-O) copolymer, wherein a terminus of the prepared copolymer has a structure according to formula (3):

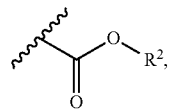

(3)

wherein $R^2$ is a fluorinated alkane, alkene or alkyne, a fluorinated aromatic, a fluorinated cycloalkane or cycloalkene, a fluorinated heteroaromatic, or a fluorinated heterocyclic.

14. The method of claim 11, wherein $R^2$ is selected from the group consisting of —$CH_2CF_3$, —$CH_2CF_2CF_3$, —$CH(CF_3)_2$, —$CH_2CF_2CHFCF_3$, —$CH_2(CF_2)_5CHF_2$, —$(CH_2)_2(CF_2)_5CF_3$, —$(CH_2)_2(CF_2)_7CF_3$, and —$(CH_2)_2(CF_2)_9CF_3$.

15. The method of claim 11, wherein $R^2$ is —$CH(CF_3)_2$.

16. The method of claim 11, wherein $R^2$ is selected from the group consisting of —$C_6F_5$ and —$CH_2$—$C_6F_5$.

17. The method of claim 11, wherein $R^2$ is —$C_6F_5$.

18. The method of claim 13, wherein $R^2$ is selected from the group consisting of —$CH_2CF_3$, —$CH_2CF_2CF_3$, —$CH(CF_3)_2$, —$CH_2CF_2CHFCF_3$, —$CH_2(CF_2)_5CHF_2$, —$(CH_2)_2(CF_2)_5CF_3$, —$(CH_2)_2(CF_2)_7CF_3$, and —$(CH_2)_2(CF_2)_9CF_3$.

19. The method of claim 13, wherein $R^2$ is —$CH(CF_3)_2$.

20. The method of claim 13, wherein $R^2$ is selected from the group consisting of —$C_6F_5$ and —$CH_2$—$C_6F_5$.

21. The method of claim 13, wherein $R^2$ is —$C_6F_5$.

* * * * *

UNITED STATES PATENT AND TRADEMARK OFFICE
CERTIFICATE OF CORRECTION

| | | |
|---|---|---|
| PATENT NO. | : 11,976,153 B2 | Page 1 of 1 |
| APPLICATION NO. | : 18/320101 | |
| DATED | : May 7, 2024 | |
| INVENTOR(S) | : Eva Harth et al. | |

It is certified that error appears in the above-identified patent and that said Letters Patent is hereby corrected as shown below:

In the Specification

After Column 1, Line 10 - Insert the following:
-- Statement Regarding Federally Sponsored Research or Development
This invention was made with government support under grant number 2108576 awarded by the National Science Foundation. The government has certain rights in the invention. --

Signed and Sealed this
Twelfth Day of August, 2025

Coke Morgan Stewart
*Acting Director of the United States Patent and Trademark Office*